US008806331B2

(12) United States Patent
Grosz et al.

(10) Patent No.: US 8,806,331 B2
(45) Date of Patent: Aug. 12, 2014

(54) SYSTEM AND METHODS FOR CREATING AND EDITING PHOTO-BASED PROJECTS ON A DIGITAL NETWORK

(75) Inventors: Aryk Erwin Grosz, San Jose, CA (US); Daniel Andrew Laffoon, San Jose, CA (US); Daniel Thanh Schultz, Milpitas, CA (US)

(73) Assignee: Interactive Memories, Inc., Palo Alto, CA (US)

( * ) Notice: Subject to any disclaimer, the term of this patent is extended or adjusted under 35 U.S.C. 154(b) by 383 days.

(21) Appl. No.: 12/838,347

(22) Filed: Jul. 16, 2010

(65) Prior Publication Data

US 2011/0167353 A1 Jul. 7, 2011

Related U.S. Application Data

(60) Provisional application No. 61/227,042, filed on Jul. 20, 2009.

(51) Int. Cl.
| | |
|---|---|
| *G06F 17/00* | (2006.01) |
| *G06K 9/62* | (2006.01) |
| *G06F 3/12* | (2006.01) |
| *G06F 17/21* | (2006.01) |
| *G06F 17/30* | (2006.01) |

(52) U.S. Cl.
CPC ............ *G06F 17/211* (2013.01); *G06K 9/6267* (2013.01); *G06F 3/12* (2013.01); *G06F 17/3028* (2013.01)
USPC ............ 715/243; 715/251; 715/252; 715/253

(58) Field of Classification Search
CPC ... G06F 3/1208; G06F 3/1253; G06F 17/211; G06F 17/212
See application file for complete search history.

(56) References Cited

U.S. PATENT DOCUMENTS

| | | | | |
|---|---|---|---|---|
| 7,461,353 | B2* | 12/2008 | Rohrabaugh et al. | 715/815 |
| 8,024,658 | B1* | 9/2011 | Fagans et al. | 715/730 |
| 2001/0042084 | A1* | 11/2001 | Seaman | 707/517 |
| 2002/0122067 | A1* | 9/2002 | Geigel et al. | 345/788 |
| 2003/0215136 | A1* | 11/2003 | Chao et al. | 382/176 |
| 2004/0041836 | A1* | 3/2004 | Zaner et al. | 345/751 |
| 2007/0043830 | A1* | 2/2007 | Housenbold et al. | 709/219 |
| 2008/0028323 | A1* | 1/2008 | Rosen et al. | 715/752 |
| 2008/0120535 | A1* | 5/2008 | Lynton | 715/243 |
| 2008/0304105 | A1* | 12/2008 | Moore et al. | 358/1.15 |
| 2009/0240688 | A1* | 9/2009 | Ohwa et al. | 707/5 |
| 2011/0167036 | A1* | 7/2011 | Liebman | 707/608 |

* cited by examiner

*Primary Examiner* — Stephen Hong
*Assistant Examiner* — Keith Bloomquist
(74) *Attorney, Agent, or Firm* — American Patent Agency PC; Daniar Hussain; Karl P. Dresdner

(57) ABSTRACT

A system for creating and editing image and or text-based projects includes a server connected to a data network, the server having access to a digital medium containing an executable graphics user interface (GUI) accessible by computer browser, at least one data repository residing on the network, the repository accessible to the server, the repository containing images, and product-related graphics, a print configuration engine implemented in software residing on and executable from the digital medium or another accessible medium, the print configuration engine for rendering image and or text-based products for printing, and at least one bi-directional communication channel established between a computing appliance running a version of the GUI while connected to the network and a server managing the data repository.

20 Claims, 29 Drawing Sheets

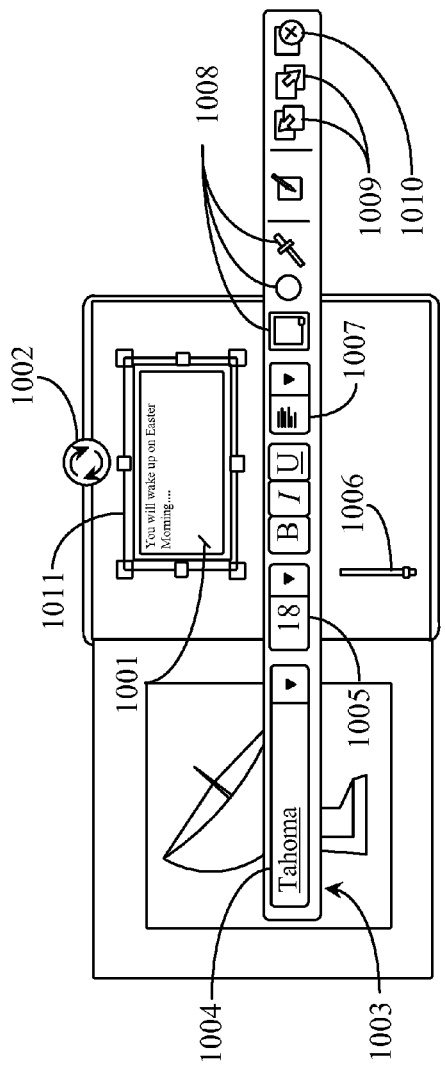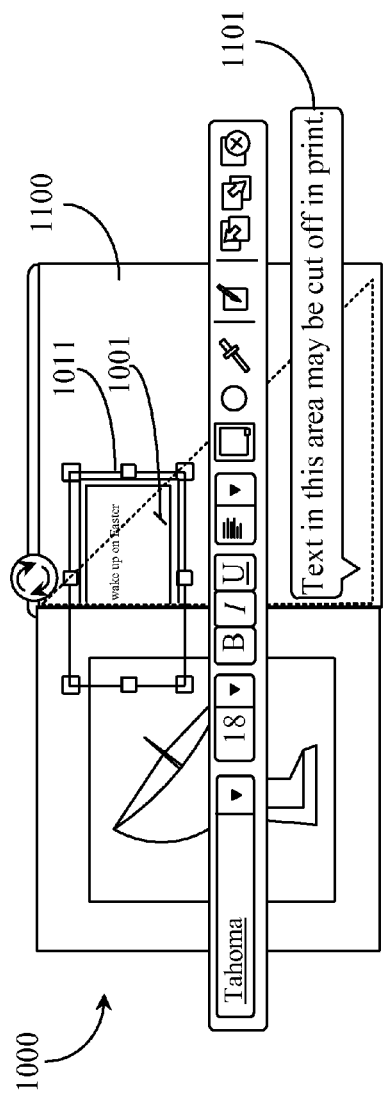
Fig. 10
Fig. 11

SYSTEM AND METHODS FOR CREATING AND EDITING PHOTO-BASED PROJECTS ON A DIGITAL NETWORK

CROSS-REFERENCE TO RELATED DOCUMENTS

The present application claims priority to provisional application Ser. No. 61/227,042 which was filed on Jul. 20, 2009. The disclosure of the prior application is incorporated herein in their entirety by reference.

BACKGROUND OF THE INVENTION

1. Field of the Invention

The present invention is in the field of electronic commerce and pertains particularly to methods and apparatus for creating and editing photo-based projects over a data network.

2. Discussion of the State of the Art

In the field of electronic commerce also known as ecommerce, there are project-oriented Websites where users may create and edit works including models, poems, art, and photo-based products. Websites catering to photo-based editing promote online publishing and online transacting relative to printed works. The current state of such electronic services leaves much to be desired. Many of these services have fixed templates and multiple interfaces for project editing, making it tedious to get the desired output.

Other problems with the current state of photo-based services include inflexibility of the editor interface relative to process steps for editing content. Most such processes are not transparent and could lead to errors in printing and therefore in the final output product. Furthermore, each typical project is initiated from scratch in a way that does not promote efficiency from start to finish of a project.

Therefore, what is clearly needed is system for creating and editing image and or text-based projects that is more efficient, flexible, and requires less overall computing resources to create and print finished products.

SUMMARY OF THE INVENTION

The problem stated above is that efficiency and flexibility are desirable in creating and editing photo-based projects over a data network, but many of the conventional means for photo editing, such as Photoshop type editors, also create inefficiencies and can result in error-prone finished products. The inventors therefore considered functional elements of a photo-based collage editing system, looking for elements that exhibit interoperability that could potentially be harnessed to provide a more efficient and flexible user experience but in a manner that would not create errors or more inefficiency.

Every networked collage editing system is driven by repeat and new users hoping to create products that preserve memories of family and friends, one by-product of which is a healthy demand for computing resources and data storage resources. Most such systems employ storage repositories and powerful servers to manage activity and data uploaded to the service by many users, and runtime servers, project editing software applications, and data storage facilities are typically part of such apparatus.

The present inventor realized in an inventive moment that if, at the point of project initiation and during editing, work could be reduced by streamlining processes and increasing transparency of those processes, a significant increase in efficiency and reductions in print errors might result. The inventor therefore constructed a unique editing system for photo-based projects that allowed users to quickly populate and print a photo-based product, but constrained time delays and potential errors to an absolute minimum. A significant improvement in the user experience results, with no impediment to the overall process created.

Accordingly, in one embodiment of the present invention, a system for creating and editing image and or text-based projects is provided and includes a server connected to a data network, the server having access to a digital medium containing an executable graphics user interface (GUI) accessible by computer browser, at least one data repository residing on the network, the repository accessible to the server, the repository containing images, and product-related graphics, a print configuration engine implemented in software residing on and executable from the digital medium or another accessible medium, the print configuration engine for rendering image and or text-based products for printing, and at least one bi-directional communication channel established between a computing appliance running a version of the GUI while connected to the network and a server managing the data repository. A user operating the computing appliance may utilize the GUI to create, edit, publish, and print one or more image and or text-based projects and wherein individual ones of the image and or text-based projects are presented in the GUI.

In one embodiment the data network is the Internet network. In one embodiment, the image and or text-based projects include but are not limited to a photo-book, a photo-calendar, and a photo-card. In this embodiment, project-related graphics include shapes, stickers, frames, text boxes, photo-slots, and backgrounds. In one embodiment, two or more users may access the same GUI version and edit an image and or text-based project at the same time.

In one embodiment, the data repository is managed by a third-party network storage provider. In one embodiment, the bi-directional data channel is an action script message format (AMF) channel. In one embodiment the GUI includes an application for messaging, and an application for creating an interactive list of friends of the instant user operating the GUI. In one embodiment, the GUI includes a message board interface allowing users to post viewable comments about the image and or text-based project. In one embodiment, individual ones of the image and or text-based projects are displayed at a core aspect ratio relative to width and height derived for a grouping of product sizes, each having different aspect ratios. In another embodiment, individual ones of image and or text-based projects may be translated from presentation at one core aspect ratio relative to one pre-defined grouping of products having similar aspect ratios to another core aspect ratio relative to a different pre-defined grouping of products having similar aspect ratios.

In one embodiment, individual pages of an image and or text-based project are scaled using relative numbers beginning from absolute center of the page. In one embodiment, individual pages of an image and or text-based project are auto-populated with theme-related shapes, stickers, text boxes, and photo-slots. In an embodiment supporting collaboration between two or more users, the server uses multiple open socket connections to monitor two or more users collaborating on the same project and to push activity data to all of the collaborators giving the a real-time view of the changes. In a preferred embodiment, the system is accessible through a secure Website.

According to another aspect of the invention, in a system for creating and editing image and or text-based projects, the system including a networked server and a data repository, the server having access to a digital medium with an executable graphics user interface (GUI), a method for creating an image and or text-based project comprising the steps (a) accessing the system, (b) selecting the basic product attributes, (c) invoking the editor to assemble and display the project, and (d) adding, removing, and editing project content.

In one aspect of the method, in step (a) access is through a Web site. In one aspect in step (b) product attributes may include a project title, a project description, one or more custom tags, a theme category, indication of who may view the project over the network, and any named collaborators who will contribute to the project over the network. In one aspect, in step (c) the project is represented at a core aspect ratio relative to the individual aspect ratios of a grouping of product sizes with similar aspect ratios. In one aspect, in step (c) the project is automatically populated with a background, shapes, stickers, text boxes, and photo slots.

BRIEF DESCRIPTION OF THE DRAWING FIGURES

FIG. 10 is an elevation view of a photo spread of a photobook project exhibiting a dynamically editable text box according to an embodiment of the present invention.

FIG. 11 is an elevation view of the photo spread of FIG. 10 with the text box moved to a position of conflict relative to a print parameter applied to a printing process for the photobook.

DETAILED DESCRIPTION

The inventors provide a unique network-based graphics-manipulation system along with a set of novel manual and automated methods and processes that enable users operating network-capable computing appliances to efficiently create a variety of image and or text-based products with or without collaborative effort. The systems and methods of the present invention are described in enabling detail using the following examples, which may represent more than one embodiment of the invention.

System Architecture

Figure 1:
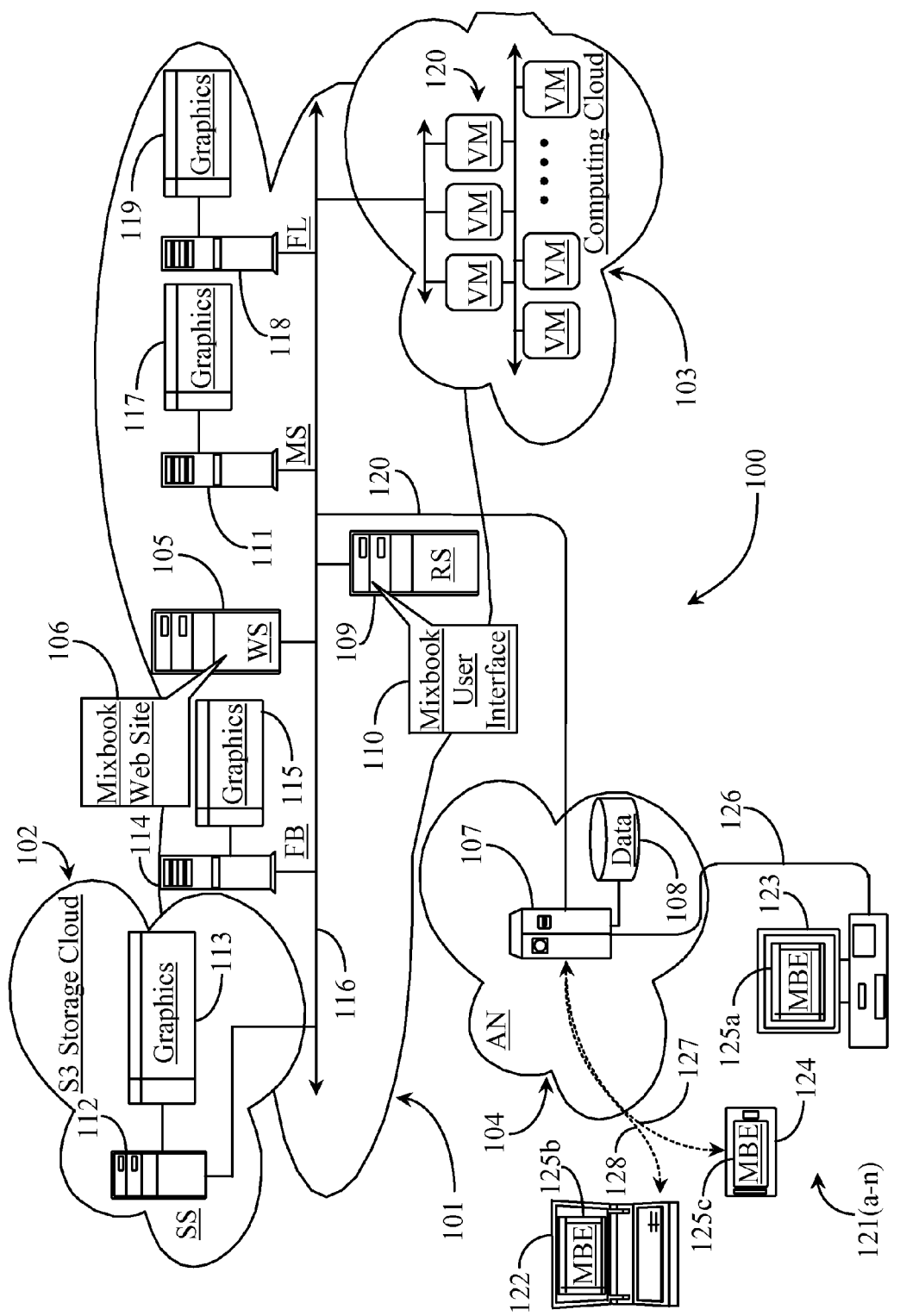
FIG. 1 is an architectural overview of a communications network supporting network-based graphics manipulation and production of image and or text-based products according to embodiments of the present invention.

FIG. 1 is an architectural overview of a communications network 100 supporting network-based graphics manipulation and production of image and or text-based products according to embodiments of the present invention. Communications network 100 includes a wide-area-network (WAN) that is in most embodiments the well-known Internet network. WAN 101 may be a private, corporate, or publicly-accessible data network without departing from the spirit and scope of the present invention. WAN 101 may be referred to throughout this specification as the Internet 101. Internet 101 is further illustrated by way of a network backbone 116, which represents all of the lines, equipment, and access points that make up the World Wide Web (WWW) as a whole including any connected sub-networks. Therefore, there are no geographic limits to practice of the present invention.

Internet backbone 116 supports a Web server (WS) 105. It is noted herein that all network-capable computing appliances such as physical computers, servers, and other computing machines discussed in this specification shall be assumed to contain, be coupled to, or otherwise have accessible thereto, one or more digital mediums adapted to contain the data and software required to support and enable the primary function or functions (in the case of multi-task machines) of the computing appliance.

WS 105 is an electronic information server connected to Internet 101 and adapted to server information pages or Web pages as they are known in the art. WS 105 may be maintained by a third party that provides a Website hosting service. In one embodiment a service provider providing the service of the present invention owns and maintains WS 105. WS 105 hosts a Website 106, through which, users may access elements of the present invention. Website 106 is adapted to provide authenticated access to users who create, publish, print, and purchase image and or text-based products such as photobooks, photo-cards, photo-calendars, photo-posters, and related products.

Because all of the products are image and or text-based and created using a graphics manipulation system provided by the inventors as a network-based software application, the relative term descriptive of the overall process and for the providing company is Mixbook™. The term Mixbook™ may be used throughout this specification to describe the overall image and or text-based product creation and editing process of the invention, the Website through which the process is made accessible to authorized users, and the service-providing company.

Communications network 100 also includes an access network (AN) 104, which may represent any data network adapted to provide access to Internet network 101. AN 104 may be a public-switched-telephone-network (PSTN) or some other public or private telephony network. AN 104 may be a local wireless network, a cellular time division multiple access (CDMA) network, a Wireless Fidelity (WiFi) network, or any other candidate access network through which one may access Internet 101.

User may access WS 105, more particularly Mixbook™ Website 106, through an Internet access facility 107 in access network (AN) 104 and an Internet access line 120. Internet access facility 107 may be maintained and operated by an Internet service provider (ISP) or by a wireless Internet service provider (WISP), which ever is appropriate for any particular Internet connection. Users who might access WS 105 are represented herein as network-capable computing appliances, more particularly, a laptop computer 122, a desktop computer 123, and a smart telephone 124. Each mentioned appliance may be assumed to be Internet-capable by way of one or more network browsing applications residing thereon and executable there from.

Desktop computer 123 is connected to an Internet-connection server 107 by way of an Internet access line 126. Desktop computer 123, once connected, may access Website 106 hosted on WS 105. Desktop computer 123 has one or more input devices (not illustrated) coupled thereto such as a keyboard, a mouse, and a microphone for (Speech-to-Text Commands). Smart phone 124 may connect wirelessly via a wireless link 127 to an Internet service provider (also represented by machine 107) that establishes a wireless Internet connection like public WiFi for example. Smart phone 124 may or may not include a keyboard input device. In one embodiment smartphone 124 has a touch-screen display. Laptop 122 is illustrated as connected wirelessly to Internet 101 via WISP 107 using wireless link 128. Laptop 122 includes a keyboard and/or other input devices as may be appropriate.

Laptop 122, desktop 123, and smartphone 124 each include an Internet browser application (not illustrated) for accessing and navigating network 101. Backbone 116 supports a runtime server (RS) 109 adapted to host a Mixbook™ user-interface 110. User interface 110 is accessible to all Website visitors for the purpose of creating, manipulating, and printing image and or text-based products such as a photo collage book, for example. Users accessing Website 106 who are ready to create a product may be re-directed to RS 109.

Each user authorized to create and publish an image and or text-based product using the site may receive a small download containing a compact editing package known as the Mixbook™ editor (MBE) to the inventors. MBE 125a is installed as a browser-based extension or plug-in in one embodiment on desktop computer 123. Laptop 122 has an instance of MBE 125b installed as a browser-based extension or plug-in. Smartphone 124 has an instance of MBE 125c installed as a browser-based extension or plug-in. An instance of MBE may be customized for any computing appliance that may access the Internet and through which a user may see and edit content. Therefore, MBE instances 125 (*a-c*), though the same basic extension or plug-in, may contain differences based on host requirements. In one embodiment of the present invention there are no software downloads required in order to practice the present invention. In this case the Mixbook™ editing SW may be server hosted only. In another embodiment, the Mixbook™ editing SW may be ported to a desktop application such as Adobe Air™ and thus be operated as a desktop application. In one embodiment the SW is included as an add-on feature to any suitable desktop application and may be installed on a computing host with that desktop application from a removable medium such as a CD ROM, for example.

Service provider facility 107 includes a connected data repository 108 labeled Data. Data repository 108 contains all of the customer contact and billing information for the Internet service provider. One with skill in the art will appreciate the many possible internet connection schemes. It is preferred in most embodiments that user have a high speed Internet connection for the purpose of manipulating and editing graphics, which can be bandwidth intensive. The inventors provide one or more innovative solutions for saving bandwidth while editing images and image products online making the entire experience more efficient and easier for users practicing the invention.

The Mixbook™ Website 106 establishes a community-based portal and social interaction site that revolves around creating, editing, sharing publishing, printing, and purchasing image and or text-based products created online by one or more user working in collaboration together. Users such as those operating appliances 122-124 connect online and navigate to WS 105 to access Website 106. When any user determines to create an image and or text-based product like a photo album, for example, they are directed to an appropriate portal server like RS 109 hosting Mixbook™ user interface (UI) 110. UI 110 is adapted to provide all of the assets needed to create and publish complete image and or text-based products. Image and or text-based products created through Website 106 include products containing images uploaded by one or more authorized users. Any work in progress or completed is termed a project. A project may be initiated by one user whereby other users are then invited by the initiating to join the creative experience in collaboration and those users may contribute their own photos to the project. Such a project may be published for viewing by all or some of the community. Finished projects may be printed and distributed as "hard products" available for purchase by members of the community.

In one embodiment persistent storage of graphics uploaded by community members to be included into projects is obtained (leased) through a third-party storage provider. In this example a simple storage service (s3) data storage cloud 102 is illustrated and made available for use by a third-party service provider such as Amazon™. A storage server 112 is illustrated within S3 cloud 102 and has connection to Internet backbone 116. SS 112 may be one of many servers including associated mass data repositories connected to SS 112 such as repository 113 contained within storage cloud 102. In this logical representation all of the graphics (photos) that are uploaded to insert into projects are stored in a repository such as repository 113 in storage cloud 102. Repository 113 may be an optical, magnetic, or some other type of data storage facility. In one embodiment the mass computations required for real-time and transparent editing and collaborating on multiple projects are performed by virtual machine instances 120 in a computing cloud 103. In another embodiment the service host may maintain one or more powerful computing machines and storage devices for performing computations and for storing graphics for users of the service.

In use of the present invention a user such as one operating one of computing appliances 122-124 connects online and accesses Mixbook™ Website 106 and logs into the site. If the user has already registered and created a project, a Web page personalized to that user is served that includes all of that user's projects in the latest states of progress. The user may enter any project for which she or he has authorization to contribute to and may review, edit, or otherwise work those projects. Photos uploaded by the user to include into projects may be stored in cloud 102 and served to the projects when needed by the system. Any computing such as editing resizing, alterations, and so on may be handled in cloud 103. A user may, through Website 106, authorize other users registered with the service of the invention to collaborate on a project initiated by that user. In one embodiment a user having a project initiated may invite other potential users to the site so they may, with permissions, enter the site and collaborate with that user.

In one embodiment of the present invention photos that are stored on the Internet can be represented in any online project provided the user has authorized access to those photos. For example, a user who has one or more accounts to third-party social interaction networks like MySpace™, Facebook™, Photobucket™, Flicker™, or similar sites may use photos of registered friends that they are allowed to access in their own personal projects. These photos do not have to be uploaded to the service of the present invention. Rather, these photos can be accessed from their present storage locations anywhere on the Internet provided that the storage system is online.

Internet backbone 116 supports a Facebook™ server (FB) 114 coupled to a data repository 115 for storing images and other graphics. Internet backbone 116 supports a Myspace™ server (MS) 111 coupled to a data repository 117 adapted to store images and other graphics. Backbone 116 supports a Flicker™ server (FL) 118 coupled to a data repository 119 adapted to store images and other graphics. Any of these images can be served to an active project by the respective servers directly from their storage locations. Any of these images that are altered during project work or collaboration may be subsequently saved to third-party s3 storage cloud 102 in repository 113 controlled by SS 112.

In one embodiment of the present invention Mixbook™ Website 106 includes or has working access to a SW print engine (not illustrated here) that is adapted to render any Mixbook™ project for professional printing. In one embodiment printing is performed by a third-party provider who may also ship or distribute finished products for a price. In one embodiment a user may access the service through Website 106 and may initiate and complete a project that will be printed for that user for a static price for that particular product.

It is noted herein that a project created on Mixbook™ may be efficiently gathered for print in virtually any print format. Likewise, content originally laid out in one format or aspect ratio may be efficiently converted to another layout before printing in an automated process that incorporates the typical size and layout changes necessary to convert from one layout to another automatically. Furthermore, content assembled for a particular layout and product type may be automatically converted for print output in another layout and product type. These and other unique advantages over current systems will be made apparent in the following examples.

Figure 2:
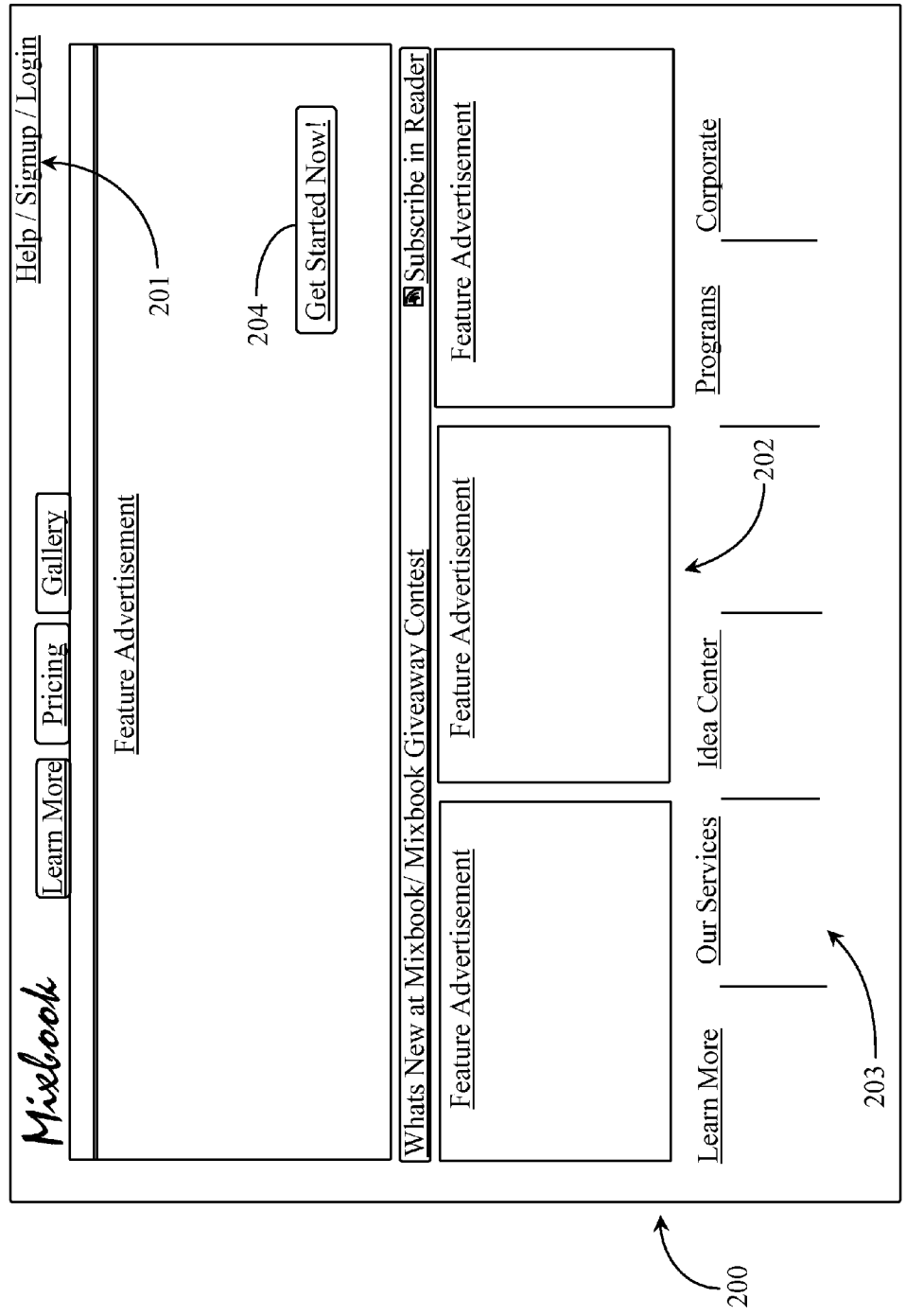
FIG. 2 is an exemplary screen shot of an introduction page of Website of FIG. 1 according to an embodiment of the present invention.

FIG. 2 is an exemplary screen shot of an introduction page 200 of Website 106 of FIG. 1 according to an embodiment of the present invention. Introduction page 200 includes interactive indicia 201, which includes an option for retrieving help, signing up for service, and for logging into the service. On the same title bar containing the interactive indicia 201 for signing up or signing into the process, there are the navigation options Learn More; Pricing; and Gallery. The option "learn more" leads to additional information about the services provided, such as product quality, use cases, etc. The pricing option brings up one or more complete pricing structures for the available products that can be created and printed. The option Gallery is an option that provides access to completed projects authorized for public viewing.

Page 200 contains more than one feature advertisement 202. Each feature advertisement may comment or provide some input, access to, or information about a feature of the service or fact about the providing company. In the first feature advertisement (center top) there is an interactive option 204 for getting started now. Invocation of this interactive link may launch a registration or sign-up process followed by an opportunity to begin a Mixbook™ project. Hyperlinked information is provided on introduction page 200 under categories such as Learn More, Our Services, Idea Center, Programs, and Corporate.

In one embodiment, page 200 includes an option "try it now", which may be replace option 204. Invoking such an option may take the "guest" to a Mixbook Editor™ without requiring them to login or have an account with the site. Transparent to the user, the system creates a temporary account for them. If the new guest user attempts to save any work on the site they are asked to register as a user.

Figure 3:
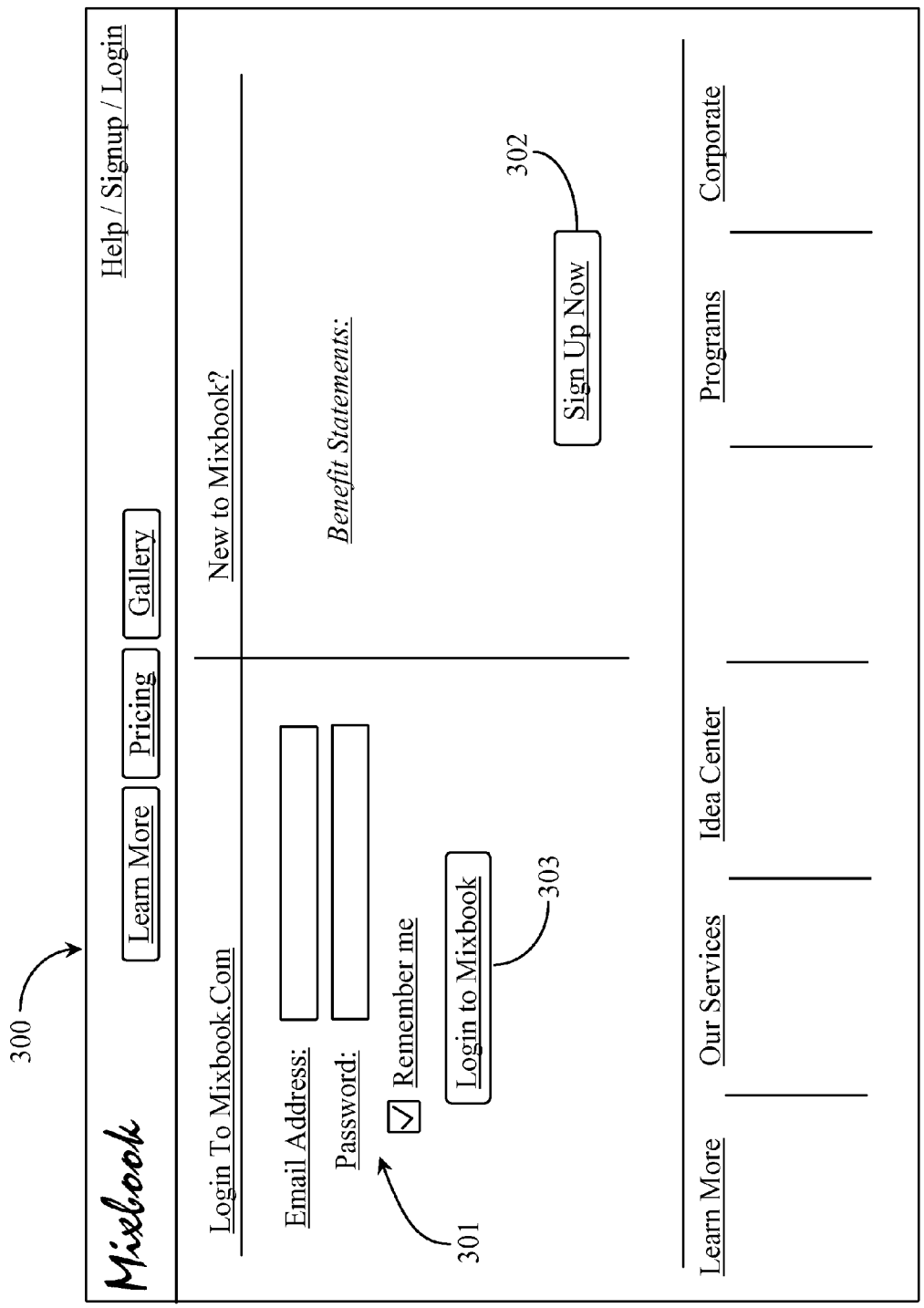
FIG. 3 is an exemplary screen shot of a login/sign-up page presented to a user as a result of interaction with the introduction page.

FIG. 3 is an exemplary screen shot of a login/sign-up page 300 presented to a user as a result of interaction with the introduction page. Login/sign-up page 300 includes a log-in interface 301 for entering an email address and password for authenticating the user to use the site. A login button 303 is provided for submitting the authentication data and logging onto the site. If a user has reached page 300 and has not yet signed up for the service of the present invention, the user may be presented with various benefit statements and a signup now button, which when invoked calls up a registration interface.

Figure 4:
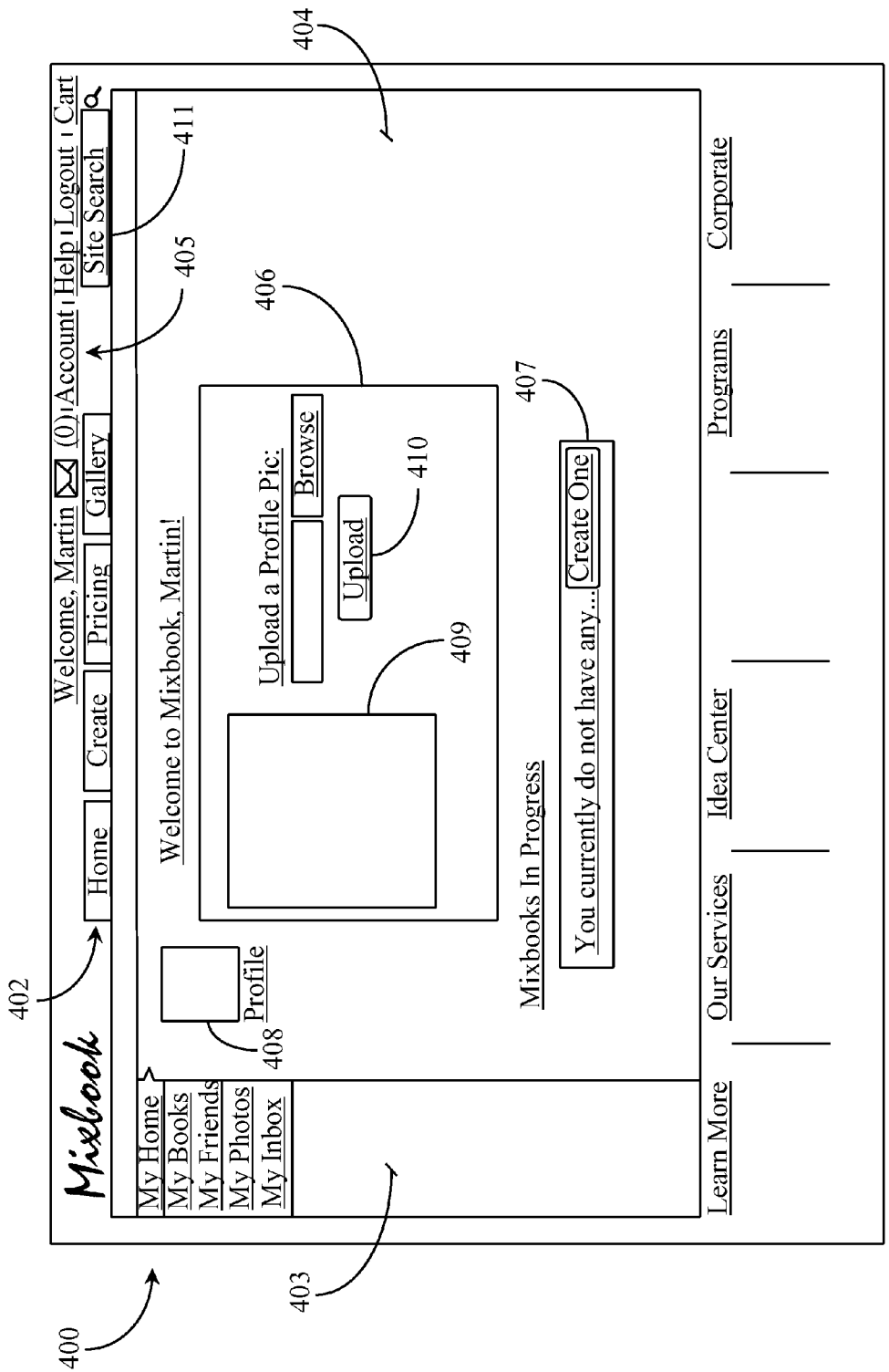
FIG. 4 is an exemplary screen shot of a welcome page presented to a user as a result of successful login to the site.

FIG. 4 is an exemplary screen shot of a welcome page 400 presented to a user as a result of successful login to the site. Page 400 is a welcome home page personalized for the user. Page 400 includes navigation options 402 including the locations Home, Create, Pricing, and Gallery. The link Pricing takes a user to a pricing page detailing different prices for ordered products. The Link Gallery take a user to a gallery of public Mixbook™ products created by community members who have given permission to view their created products.

Page 400 includes a personal welcome and may also include information 405 including status indication of an email account provided to the user as part of the service. Information 405 also includes account information, a Help option, an option for logging out, and a link to a shopping cart for purchasing Mixbook™ products. A user may purchase products created by that user or products created by others that the user is authorized to purchase. Page 400 includes a sidebar area 403 that includes several navigation links such as My Home, My Books, My Friends, My Photos (uploaded) and My Inbox (provided mail account).

Page 400 includes a workspace window 404 that contains an interface 406 for uploading a picture for creating a profile. Interface 406 includes a data entry field to enter the path of a picture or the user may browse the commuting appliance for a profile picture. An upload button is provided to effect upload of a profile picture. A place holder 409 is provided to display the uploaded picture. After creating a profile and uploading a profile picture, the profile picture appears as a profile link 408. Page 400 has a site search button 411 adapted to enable that user to search the Website using a keyword or phrase.

Page 400 includes a status report or listing 407 that tells the user what projects are active or available to the user. This may include projects created by the user and any projects initiated by others that the user has authorized access to. In this example, the user has yet to create a Mixbook™ product. Listing 407 includes an interactive command option (Create One) for creating a product such as a photo-book for example.

Figure 5:
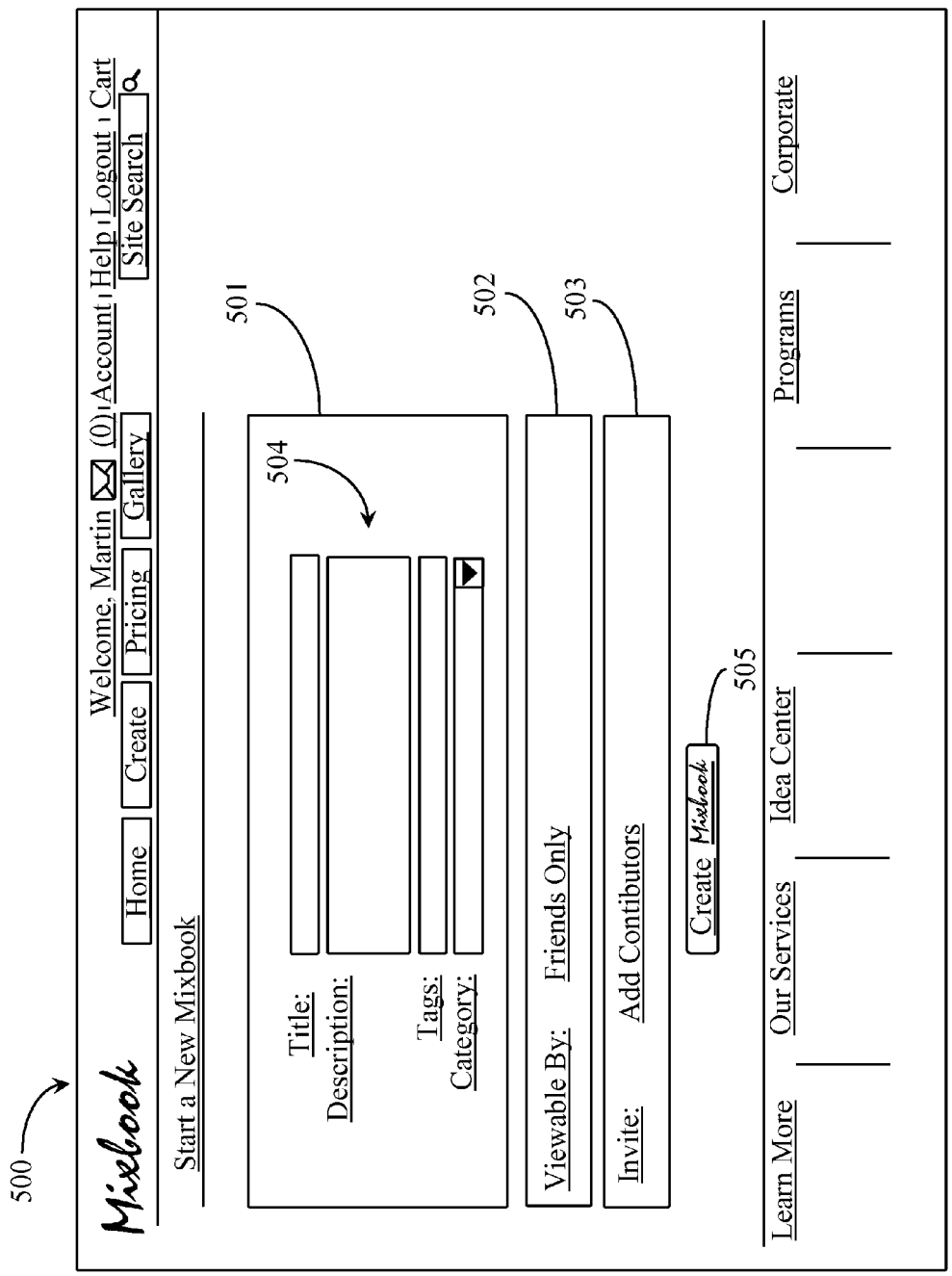
FIG. 5 is an exemplary screen shot of a project configuration page presented to the user as a result of interaction with the Create option of the page of FIG. 4.

FIG. 5 is an exemplary screen shot of a project configuration page 500 presented to the user as a result of interaction with the Create option of the page of FIG. 4. Page 500 includes a workspace window 501 for entering information about a project that a user wants to initiate. Information fields 504 include a project title field, a project description field, a field for entering tags for the project, which may be used later by friends of the user or by other community members to search for the project. Fields 504 also include a category field for selecting a category of a project.

A configuration option 502 is provided for electing who may view the proposed project. In this example the project will be viewable by friends of the user. An invitation window 503 is provided for enabling the user to invite or add contributors to the project. A contributor is any of the user's friends or any other community member that the user invites to contribute. In one embodiment a project may be initiated by a user and may be designated open to all contributors or all of the site's community members. Online community members represent an active network established to aid book creation.

The inventors emphasize the idea of a community that develops around creating projects such as photo book. More importantly the system streamlines the act of starting projects by creating a social interaction network on the site to help propagate book creation. For example, by linking with friends and family on the site, the user can utilize the platform for inviting other site users to collaborate on a project such as a photo book with them, rather than having to enter their email addresses. Members of this network are community members termed "Friends" from the perspective of an inviting user.

When the user begins a project such as a photo book and enters book information, the user is enabled to select members from his network (friends) already registered with the site to help work on it. This allows the user to quickly select the appropriate members to contribute material to the book without having to enter their email addresses.

The system of the present invention enables real-time collaboration. Users may interact with one another in real time as they collaborate on a project. A user may be a contributor without necessarily collaborating in real time with the creator or other users on a project. The transparency of collaboration is such that users may communicate with each other while working on a particular book and may also view real-time editing and creation of that book while it is happening.

As multiple contributors work on a multi-page project such as a photo-book for example, they are able to view the edits made by other users in real time such as adding, changing, and removing pictures and text. For example, a user that is viewing a page that a contributor is working on will see a picture move or some other changes happening on the page in real time.

The system supports presence reporting so any user can see real-time status of all the other current contributors or editors of the project and may invite any of them to collaborate on the page(s) the user is working on. When two users are on a same page, they can annotate and change the page in real time, and see each other's mouse cursors in real time as they move across the screen. When a user selects friends and/or family to contribute to a project such as a photo book at the time project initiation or by selecting the collaborate feature after the book as been started, those selected friends or family will be sent automated invitations to contribute to the selected book. Once a friend or family member accepts such an invitation they will automatically be approved as become a contributor of the book.

Members of the network who are contributors to a project will be able to add various materials to the project including but not limited to photos, videos, text, and pages that have already been created on the site. When a new project is created the creator and/or contributors of the new project such as a photo book may take pages from other existing photo books on the site and may use them in the new book. In this way, many different projects may use the same project pages. When members become contributors to a book they have the option of adding any pages that they have previously created on the site in addition to pages of their friends that they have permission to use and any publicly available pages on the site. Adding pages from other projects can be done two different ways.

In one embodiment a same page added to a project that exists in one or more other projects may be referenced so that any changes made to that page affect every project that has this page present. In another embodiment a same page found in another project and contributed to the new project is copied so that any changes made to the copy will not propagate to the original page. Members of the site may search public projects and pages and may use any public pages they find on the site. A public page is a page created by a member of the site that is allowed to be used by any member in any book. Users will have the option to use these pages in any book that they create or contribute to. In one embodiment part of a project may be public while other parts of the project are held private. A public page may be embedded in a project that has pages private pages not made public.

A server such as RS 109 of FIG. 1 facilitates transfer of information between users collaborating in real time on a project. For example, if five collaborators are in the process of editing a book, the server can use open socket connections to read when each user is making a change and then push the change data in an unobtrusive way to the other collaborators. The Mixbook™ editor (MBE) enables live messaging between users or friends that are currently collaborating on a project whereby all of the users are using the MBE. In this way users may exchange ideas, tips and other information as they edit a project together.

Invitation window 503 may be expanded to enable a user to view any of the user's friends that are registered with the service as "friends" of that user. In one embodiment those friends are flagged as being "Online" or "Offline" using a suitable presence protocol. In both instances, a user may invite any of the "online" or "offline" friends to contribute or collaborate in real time on a project. One invitation may be sent to multiple users. When a user receives an invitation to collaborate on a project, the invitation may appear as a pop-up window, or some other visual that identifies the sender and the nature of the project. An invitation may also contain a text body describing the project and what type of collaboration is desired. A create Mixbook™ button is provided to continue the process of book creation. Invoking button 505 calls up a next screen adapted to enable the creator to select the size (form factor) of the project.

In one embodiment users may form groups around areas of interest. In this embodiment a user that belongs to a group created around a subject of interest may start a new project such as a photo book relating to the subject around which the group was founded by clicking on a "start new book" button on a main page established on the site by the group. The group project initiation automatically included the group members as collaborators. This represents yet an additional way the community network is leveraged as way to propagate more project creation.

Figure 6:
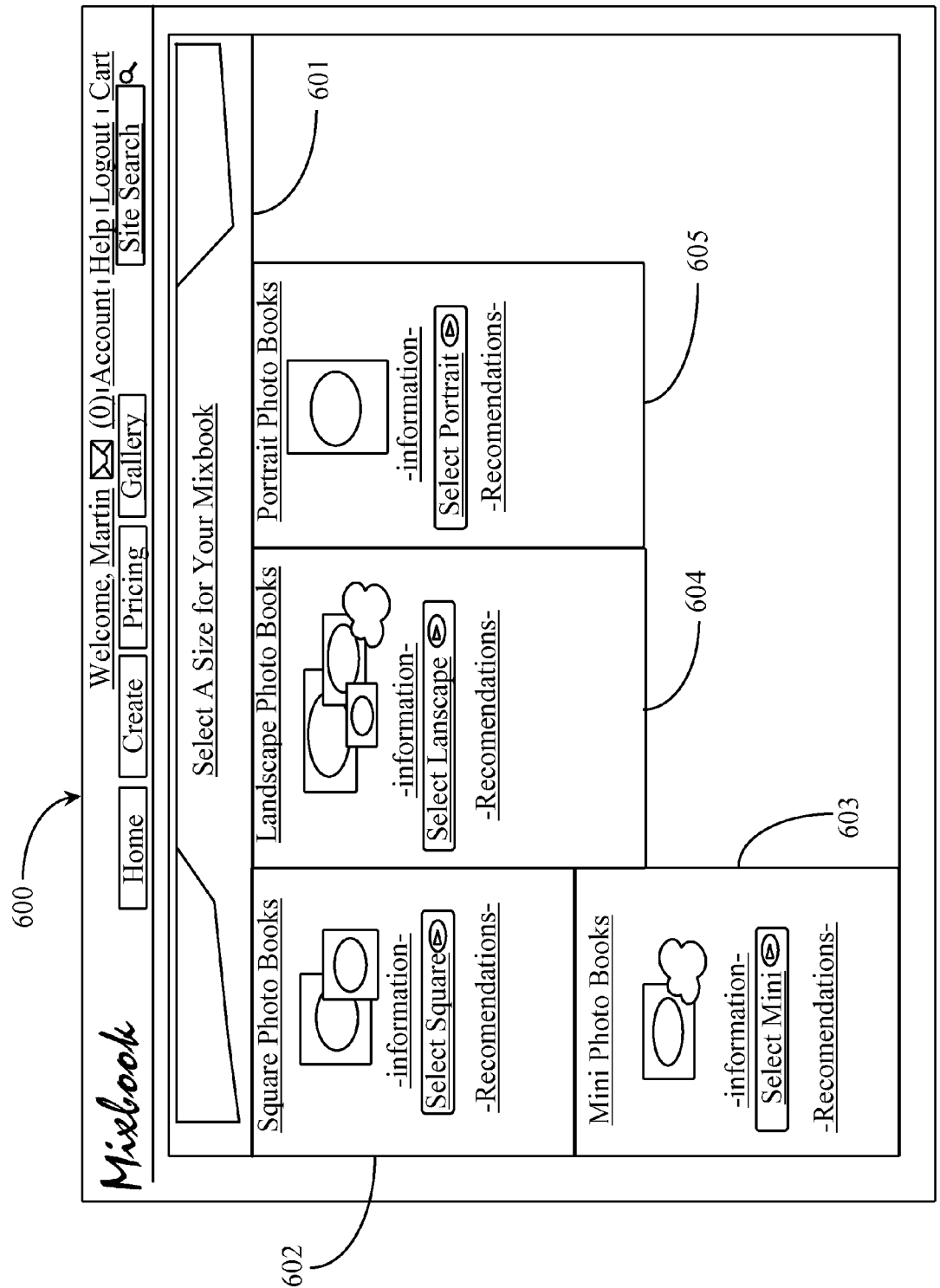
FIG. 6 is an exemplary screenshot of size-selection page for selecting an initial orientation and size for a project.

FIG. 6 is an exemplary screenshot of size-selection page 600 for selecting an initial orientation and size for a project. In this example, all of the project options are for multiple page photo books. Other project options may be made available to a user without departing from the spirit and scope of the present invention such as a photo card, a poster board, or some other type of publication that utilizes photos and/or and text.

A banner feature advertisement 601 states the intent of page 600 of helping the user to select a size for a Mixbook™. The feature advertisement may include text information (not illustrated) that informs the user that the service is free for creating and publishing a project and that printed materials begin at a specific price range. A user may also click on "Pricing" at the top of the page to determine what the current prices are for printed projects.

Page 600 includes an option 602 for selecting a square photo book that can be printed in two available sizes. Although not illustrated, the exact sizes which are exemplary only are twelve inches square and eight and one-half inches square for a square photo book. Other sizes may be offered for a square book without departing from the spirit and scope of the present invention. Option 602 includes information that the book may be ordered in soft or hard cover. Option 602 includes recommendations that are not specified in this example but may include what the system recommends selection of a square book is best for such as, best for a storybook (baby), a digital scrapbook, or a photo book that is shared online.

Page 600 includes an option 603 for selecting a mini-photo book that is a landscape orientation and that is only available in one printed size. Although not illustrated here the exact size of the mini photo book is six inches by four inches. Option 603 includes information that the book may be ordered in soft cover only. Option 603 includes recommendations that are not specified in this example but may include what the system recommends selection of a mini book is best for such as, family brag book, portable photo album, or gifts. An additional piece of information is represented by an information cloud adjacent to the mini-book sample. In one embodiment this additional piece of information may be pricing information. The information contained in the information cloud may also be some other type of useful information without departing from the spirit and scope of the present invention.

Page 600 includes an option 604 for selecting a landscape photo book that can be printed in three available sizes. Although not illustrated here the exact sizes which are exemplary only are fourteen inches by eleven inches, eleven inches by eight and one-half inches, and eight inches by six inches. Option 604 includes information that the book is available in hard cover or in soft cover. Option 604 includes recommendation by the system that selecting a landscape book is best for wedding photo books, guest photo books, or a photography photo book. An additional piece of information is provided in an information cloud associated with the medium sized landscape sample illustrated in option 604. In one embodiment the information in the cloud designates the sample as the most popular size of landscape book. Other types of information may be tagged to the samples using an information cloud without departing from the spirit and scope of the present invention.

Page 600 includes an option 605 for selecting a portrait photo book that can be printed in one size of eight and one-half inches by eleven inches. Option 605 includes recommendation by the system that selecting a portrait size is best for creating a class yearbook, a team or group yearbook, or a child's storybook. It should be noted herein that the offered sizes in the different orientations are not intended to be limiting in any way. A number of other sizes might be envisioned for print for any orientation without departing from the spirit and scope of the invention.

Figure 7:
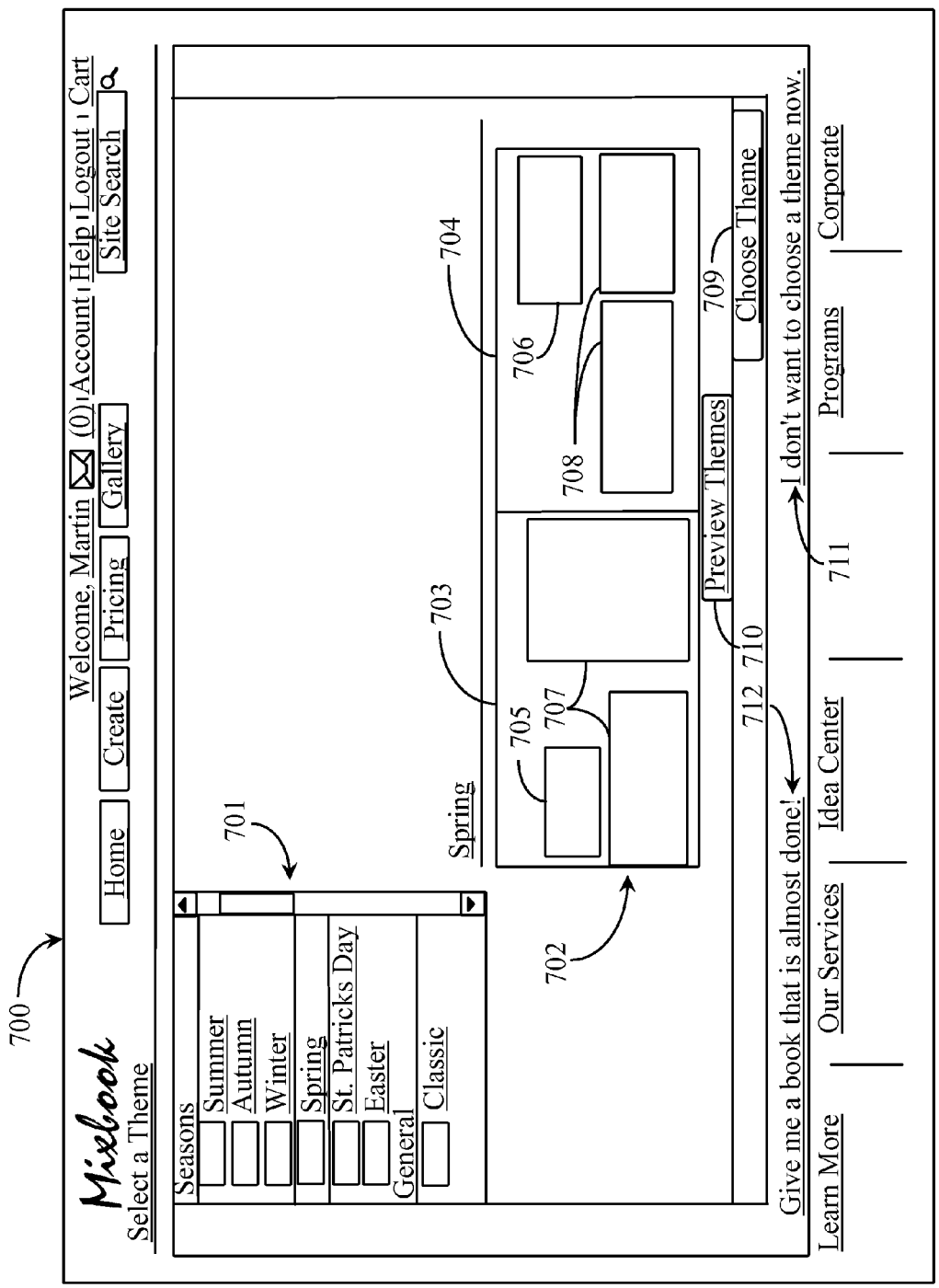
FIG. 7 is an exemplary screen shot of a theme-selection page for selecting an initial theme for a project.

FIG. 7 is an exemplary screen shot of a theme-selection page 700 for selecting an initial theme for a project. Theme-selection page 700 includes a scroll menu 701 that contains a number of themes that a user may select from for use in a project. In typical order, theme selection may take place immediately after size and orientation selection when configuring project parameters. Illustrated in the visible portion of the window are themes for "Season" including Summer, Autumn, Winter, Spring, Saint Patrick's Day, and Easter. Themes listed under "General" include Classic. Other theme categories might include Wedding, Travel, Baby, Family, Occasion, Holiday, Romance, and Education among many other possibilities. In one embodiment a user may create a new theme.

In this example the theme Spring under the category Seasons is selected. Page 700 includes a preview pane 702 adapted to show the theme layout suggested for the size and orientation of the project being created. A layout in the preview pane 702 includes a page 703 on the left and a page 704 on the right. On page 703 there are two photos 707 and one text box 705. On page 704 there are two photos 708 and a text Box 706. All of the photos are those that come with the sample that the user has selected from menu 701 (sample photos).

A user may select preview theme by invoking option 710 to view a theme in the form of the intended product. The user may then select another theme from theme pool 701 for preview until the user selects a theme they want. A user may choose a theme by invoking a choose theme button on the Website. When the user invokes this option the theme will be incorporated into the project template. A user may invoke option 710, which is an option not to select a theme. A user may also invoke an option 712, which requests that the system load a project of the selected size orientation and theme with suggested stickers, backgrounds, and photos (if applicable). Invoking the choose theme option 709 moves the project to the editing stage.

Figure 8:
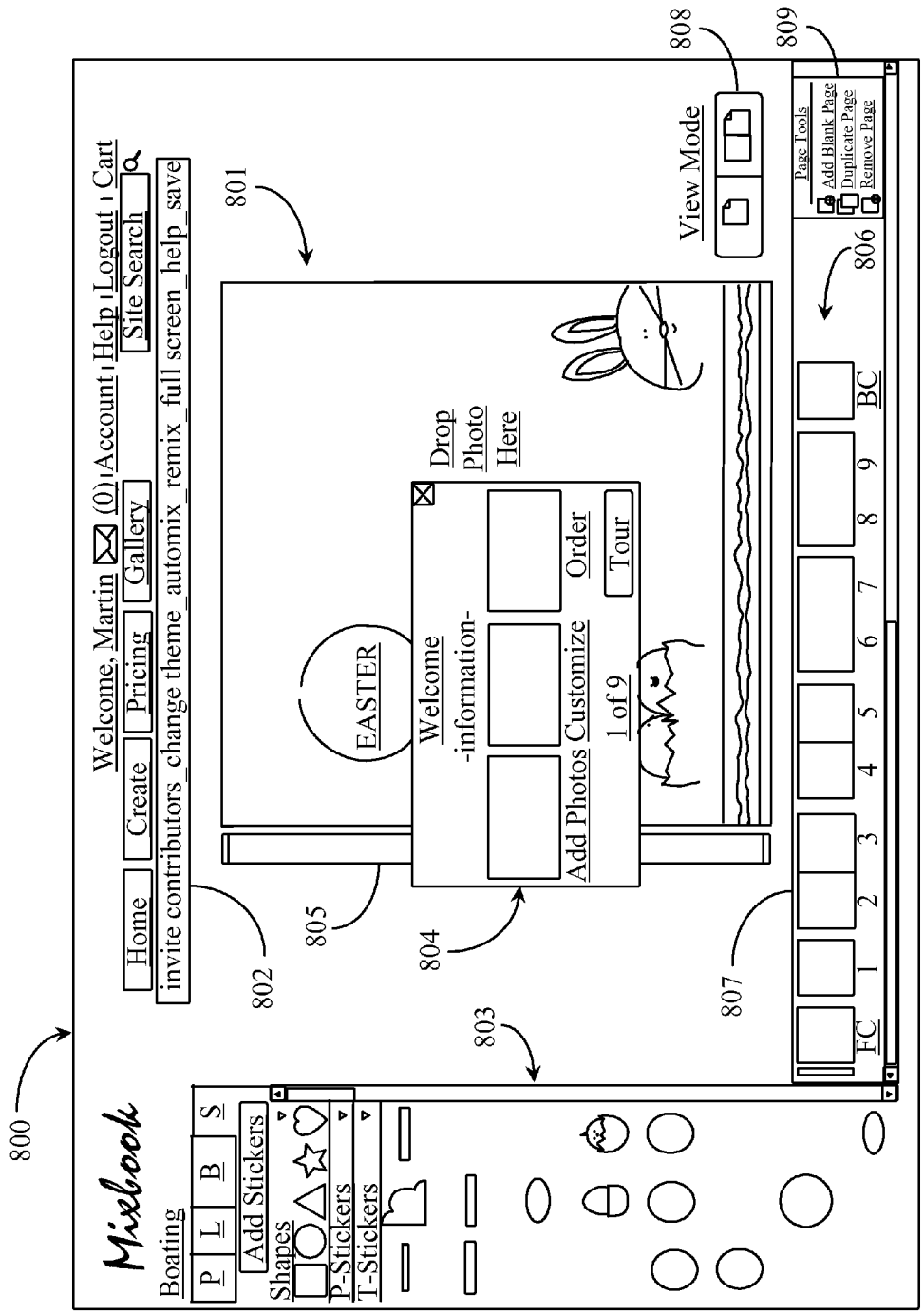
FIG. 8 is an exemplary screen shot of a Mixbook Editor™ (MBE) user interface (UI) for editing a project in progress according to an embodiment of the present invention.

FIG. 8 is an exemplary screen shot of a Mixbook™ Editor (MBE) user interface (UI) 800 for editing a project in progress according to an embodiment of the present invention. UI 800 includes some of the options presented on previous pages including a personalized welcome, an inbox mail indicator, an account option, a help option, a logout option, and a link to a shopping cart. Also present from previous pages are the navigation links to Home, Create, Pricing, Gallery, and Site Search.

An information bar 802 contains an array of selectable options invite contributors, change theme, automix, full screen, help, and save. It is noted herein that the system of the present invention initiates and completes auto saves to a user's Mixbook™ project at opportune moments such as when the user changes pages within the project when editing. In this way the most data a user may lose is data on one project page.

By triggering a save event on specific actions the system mitigates a user's loss of data in the event of software crashes and other catastrophic events. This system works by persisting the canvas (page) data to the runtime server from the client via a client/server communication channel such as an ActionScript Message Format (AMF) remote framework, which transfers AMF data between the client and the server. This pull system mitigates the amount of work a user could potentially lose on a project to just one canvas page worth of data. It also drastically simplifies the process of creation by removing a recurring step.

In one embodiment, the auto-save feature activates whenever a page is swapped out in the viewing window or "viewport" of the GUI editor. Various other auto-save triggers may be configured and triggered according to established rules. In one example, the auto-save feature triggers when a specific amount of time elapses while they are working within the editor. In one embodiment the auto-save feature triggers when a pushed event is received by the client that informs the client that the site is going down or for any reason. In one embodiment the auto-save feature triggers when a specific copious amount of changes are made on a single page without save, a threshold established to define the amount or weight of the changes made.

The automix option in information bar 802 is an automated process driven by an algorithm. Automix takes the user's photos and dynamically creates new pages based on the project's theme and the size, orientation, and metadata of the user's photos. UI 800 has a side bar area 803 that contains assets that may be used in creating the project. Sidebar 803 is scrollable and includes at least four interactive presentation controls, each representing a category of assets, which when invoked provide access to certain assets under each category represented. The control furthest to the left of the Fig. labeled P for photos. Invoking Photos loads all of the user's uploaded photos into the scrollable area for use in the project. The next control to the right labeled L is for layouts.

A layout is a page or spread configuration containing photo slots and text boxes along with shapes and stickers that go with the theme of the project. Under layouts, there are sub-categories for project layouts, theme layouts, and recommended layouts. A layout may be a system provided layout or one that is created by a user from scratch elements. A next control over to the right is labeled B for backgrounds.

A background is a page background that underlies the added content. When a background image is stored by the system, the system, in one embodiment, creates a mirror image of that background by default. This unique process is termed background "flipping" by the inventor. By default, all background images are stored as "mirrored images" (original and flipped version). In this way when a user selects a particular background image for two adjacent pages, the flipped image is used as the second background image and may be auto-inserted onto the page. For assets that display one or more asymmetric aspects, background flipping provides a more aesthetic look to a two-page photo book spread. Flipping of assets (storage of mirrored images) may be practiced by default on backgrounds, layouts, photos, and stickers without departing from the spirit and scope of the present invention.

In one embodiment, an algorithm drives the background flipping process by first identifying a background image that is asymmetrical in characteristic such as having an asymmetric coloring, texture, pattern, etc. Any images that qualify are flipped meaning that a mirrored-image copy of the original is created and stored alongside the original. In addition, the system automatically serves a "flipped" image where useful such as when a two-page photo book spread will use the same background image. The left canvas would contain the original background image while the right canvas would contain the mirrored image auto-inserted when the background was selected by the user for application to the spread.

The next control furthest to the right is labeled S for stickers. The system maintains clip-art called stickers comprising shapes and other clipart images used as content to dress a layout on a page. The category of stickers includes shapes, project stickers and theme stickers. Project stickers are those that are currently being used in a given project and theme stickers are those that are considered relevant to a project theme. Sidebar area 803 serves as a content interface within UI 800 that provides access to all content whether it is system-provided or user-provided.

In one embodiment the system of the invention includes a recommendation engine driven by several different algorithms that intelligently recommends content according to several different criteria. For example, certain theme-related stickers might be recommended to a user based on the theme selected for a project. If the project theme is babies, then baby related stickers known to the system would be displayed to the user ahead of any other sticker types. In another embodiment a hierarchal recommendation system is provided whereby the system makes suggestions or recommendations of content based on number of times the content is used by others, commented on by others, ranked by others, and so on. Using a recommendation system helps expedite the project creation process by displaying the most relevant or used content assets to the user first so that the user does not have to search or browse for relevant content assets to include in a project.

In one embodiment a method for selecting a photo from a plurality of photos placed in the project by a project contributor for recommendation includes (a) accessing the contributor's project photos stored in the database, (b) weighting data associated with each photo used in the project against one or more business rules, (c) selecting one or more photos based on the weighting results of step (b); and (d) recommending one or more photo products containing one or more photos selected at step (c) to the contributor at an appropriate time.

In a preferred embodiment, stickers such as shapes may be adapted as photo-viewing windows or "photo-slots" complete with all of the unique properties of a photo-slot such as access to the photo panning tool, photo-edit tool, and other tools for editing. Shapes may also be used as text boxes. There are many possibilities.

UI 800 includes a content storyboard 807 that displays all of the pages and, or "spreads" 806 of a project in sequence at the current edited states of those pages or spreads. A spread is simply two or more single pages connected as a spread of pages. Storyboard 807 is scrollable and may contain as many pages as are included in any project. A user may click on any of the pages or spreads in storyboard 807 to bring it up for active display and editing. A user may select a viewing mode 808 (bottom right) for viewing a single page or for viewing a page spread. A page tools interface 809 is provided in UI 800 to enable simple page manipulations such as adding a blank page, duplicating an existing page, and removing an existing page from the storyboard.

In this example the front cover 801 and the spine 805 of a photo book are displayed for edit in UI 800. The front and back cover are considered pages but are not numbered in this example. Spine 805 is also considered a page. Interface 800 includes a welcome message 804 that may appear on display when the user invokes the editing process. The welcome message includes a warm welcome to the user followed by some general information about the service and expectations. The pop-up may prompt a user to add photos to the relative project, customize the project and when satisfied with the project, order one or more printed copies of the project. In one embodiment a themed page already containing stickers and photo-slots can be added.

In one embodiment a user may remix a project that is in progress or finished. A page may be remixed by interacting with a remix option provided in toll bar 802. Remixing can be undertaken to change the various aspects of a page including but not limited to changes in layout of the page, changes to the background of the page, changes to the fonts of the page, and changes to the styles of items on the page. Remixing a page may also include adding or removing page items like stickers, photos, text boxes, and shapes. Remixing a page may also include changing effects or the current cropping of items on the page.

In one aspect all of a user's remixing efforts are undoable by clicking on an editing undo button or dialog box. A user may remix any number of pages any number of times. During the remix operation, a user may be enabled to include photo effects such as B&W, sepia, antique, and so on to all page photos. The user may also be enabled to include mean brightness and contrast adjustments on all of the photos in the remix and application of font on the page may be included to match as well. A layout change may source from a pool of layouts stored by the system. A layout change may also originate from an automated layout algorithm that automatically lays out all of the items on a page.

The automated layout algorithm described above may select a special layout and then may convert a group of photos into a canvas page. A specific layout may be chosen based on the corresponding photo group data by the algorithm which further minimizes the amount of zooming or scaling that must be afforded the photos. By minimizing the amount of scaling required, the resulting canvas page fits the photos into photo slots of similar orientation and subsequently requires very little zooming of the photos. This lends to higher quality output once a user chooses to purchase a created project in a high-dot per inch (DPI) output.

In one embodiment a flash tool for creating books is embedded in the editing system of the present invention. The flash window expands automatically to fill up the user's browser space when the user increases the size of the window. The flash window contracts to fit as well if the user decreases the size of the browser space. Using JavaScript on Resize events, the page creation canvas is adjusted in size to either zoom in to or out of the created book page as the user resizes their browser.

In one embodiment the system may access data quickly for display while uploading a bandwidth intensive file like a high resolution photo. Bandwidth is a precious resource on the Internet. Photos typically use a lot of bandwidth during transfer from one network location to another. While a user uploads photos, the system has the capability of accessing enough of the data using FP 10 to create stand-in thumbnails of the uploading photos so that a user does not have to wait before resuming the editing process. Once the photos are uploaded, they automatically replace the thumbnails and take on all of the attributes applied to the thumbnails in the absence of the real photos. In this way user will be enabled to work on a group of uploaded photos immediately using the thumbnails as a stand-in.

Figure 9:
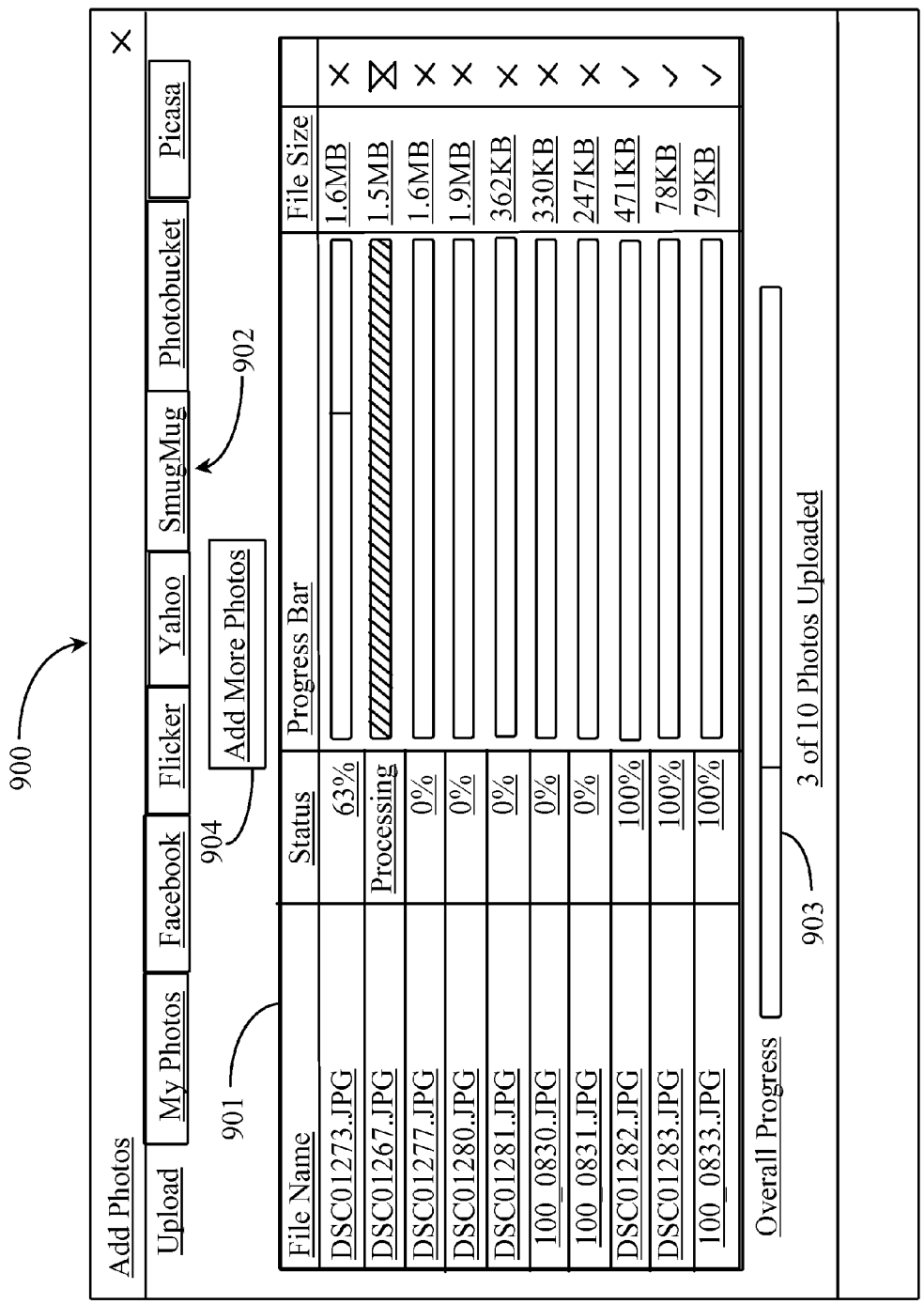
FIG. 9 is an exemplary screen shot of an add-photo page for acquiring photos to add to a project according to an embodiment of the present invention.

FIG. 9 is an exemplary screen shot of an add-photo page for acquiring photos to add to a Mixbook™ project according to an embodiment of the present invention. Page 900 appears as a result of the user clicking on "add photos" within the Mixbook™ editor UI. Page 900 functions much like an interface for downloading songs from a music site with the exception that the user is uploading and/or physically referencing photos stored at a remote location accessible to the service provider. An option bar 902 is provided within page 900 and includes many separate links to popular network service locations where photos may be acquired for a project.

At the far left of the options bar, the option upload is invoked. In this case the user is uploading photos from a local hard drive or from some other digital medium accessible to the operating appliance hosting the activity. Photos may be uploaded from any internal memory or from any external memory such as a connected thumb drive, a connected compact disk, a connected camera, or through some other removable memory that can be coupled to the user's computing appliance. In one embodiment the system may "capture" photos from media such as a video clip that is played back on the user's computing appliance. In one embodiment the system may also upload any photos that are scanned into the user's computing appliance using any type of image scanning device.

Page 900 includes a status window 901 that is divided into columns and rows. From left to right, the columns in status window 901 are labeled File Name, Status, Progress Bar, and File Size. An unlabeled column at far right contains either an X or a check mark indicating that the associated photo is not yet uploaded (X), or that the photo is already uploaded (check mark). There are ten rows illustrated in this example indicating that ten photos are to be uploaded. A user may upload one photo art a time or the user may upload a group of photos by using group selection techniques such as control click or using a shift and hold option.

It can be seen in this example that three of the ten photos being uploaded are completely uploaded into the system as indicated in the status column (100%) and by an overall progress bar 903 at the bottom of the window. One photo (DSC01273.JPG) is 63% complete while another (DSC01267) is being processed just after upload to determine optimal display size and perhaps other factors for the UI. In one embodiment photo-add page 900 is a window that appears within the UI of the Mixbook™ editor. In this embodiment as the photo status for a particular photo indicates that upload and processing are complete for the photo then it will display within the side bar area of the UI under the category Photos.

Add-photo page 900 includes links for acquiring photos from a plurality of photo hosting locations on the Internet. The location My Photos is the collection of all of the photos that the user has already uploaded to the service. The user may click My Photos to view those photos and select one or more of those photos for transfer to the current project. A user may acquire photos from virtually any Internet-connected repository that the user has authorized access to directly or through a hosting service account. Examples of such accounts where photos may be located include Facebook™, Flickr™, Yahoo™, SmugMug™, Photobucket™, and Picasa™. There may be fewer or more photo-location options (Hosts) referenced within page 900 than are illustrated in this example without departing from the spirit and scope of the present invention.

If a user has a Facebook™ account that user may acquire any photo that user has authorized access to including those photos of family and friends on Facebook™. The same is true for all of the other photo-locations listed in bar 902. A user may, if desired, physically download photos from these third-party-controlled photo-hosting services. However, the inventors provide a unique data structure for photo data transfer that permits use of the photo in online and in printed projects but does not include a requirement for literally possessing the photo. The data structure represents a photo and enables partners to transfer photos without performing a physical upload.

The generic data structure includes an array of photo sizes. Each image size has at least three fields. These are a value for the photo width in pixels, a value for the photo height in pixels, and the network location (URL/URI) of the image or photo. The address is the address where the photo is stored. In a preferred embodiment each of the selectable photo sizes for a single photo has the same aspect ratio. The term aspect ratio refers to the ratio of width to height of a photo. If a partner site has three sizes for a photo like small, medium, and large, these sizes must have the same aspect ratio for selectable representation of the image without requiring physical upload of the photo.

An algorithm enables the system to determine the best photo-display size from the available partner-configured photo sizes for use in Mixbook™ projects. The algorithm loops through the available photo sizes in the generic image data structure describing the remote photo. The system leverages an algorithm for photo display of the remote photo that automatically selects the optimal photo size to display out of the array of partner-configured sizes provided the photo display on the partner site. For example, if the service of the invention has three available photo sizes (small, medium, and large), and the platform partner, such as Facebook™ for example, has only two image sizes available (medium and large), the algorithm considers the two available sizes in the best light. The result may be that the small photo size allowed by the service would be replaced with the medium photo size allowed for the photo at the partner site.

The algorithm automatically fits the image into the photo slot. To do this the algorithm determines the limiting dimension either the width or the height. To find the limiting dimension, the algorithm takes the first element in the size array and creates two ratios. The first ratio created is a width ratio which is equal to the width of the first element in the size array divided by the width of the display slot. The second ratio created is the height ratio which is equal to the height of the first element in the size array divided by the height of the photo slot. If the width ratio is greater than the height ratio, then the limiting dimension is the height. If the height ratio is greater than the width ratio the limiting dimension is the width.

The algorithm orders the sizes by the limiting dimension, which is ascending order. Beginning with the first and second sizes, the algorithm compares the sizes on their limiting dimension with the size of the photo slot on its limiting dimension. If the size of the display slot is bigger than the second size, then the algorithm continues on to the next size grouping, the second and third sizes. The algorithm continues until one of two sizes is greater than the size of the display slot. At this point, the algorithm will intelligently choose which size to display.

The photo is displayed in the same manner as other photos that were physically uploaded to the service with an exception that the photo is accessible only when the link from the service to the photo is active. A user could potentially build and print a photo book that contains only remote photos that are never uploaded physically to the service. In one embodiment option bar 902 is scrollable in the case that more partners are listed than can be displayed at one time in the window.

The system of the invention includes a partner platform and application programming interface (API) that enables partners to integrate their applications (desktop or web-based applications) with the service of the present invention. This platform allows partners to implement code within their applications that can transfer data to and from Mixbook™ servers including, but not limited to user data, photos, and project data (books, calendars, posters, prints, mugs, mouse pads, and other photo gift or collage items). In one aspect of the present invention the system includes an application program interface API for enabling partners to access user accounts and make contributions to those user accounts. Usage of partner aliases helps to distinguish such partners from other users when they are on the site. The system creates an "alias" for each object that a partner application needs to access within the collage editing platform. The created alias will be stored within the system to enable quick and easy access to objects stored in the system. Aliases can be defined by the partner, so that the partner can use existing data in their own system to reference data in the Mixbook™ partner platform. The system will automatically detect attempted duplication of a partner alias. If a partner attempts to create a duplicate partner alias, the alias will not be created. Rather, the existing alias may be updated with any change in information passed in the associated action.

In order to create an alias for a given object, a partner must have access through that user by having authenticated access to that user account. If a partner does not have an alias connected to a given object, there is no way for it to access that object. This makes it easy for a given partner to create and manage "private" and "secure" data through the partner platform without worrying about having others accessing that same data.

Partners may create user accounts on Mixbook by passing an alias with which they will be able to access the user in the future. If the email address is already registered on Mixbook, the partner must authenticate the user by sending that user to a Mixbook log-in interface and to their account. Once the user logs in, the alias relationship will be created with that user for the requesting partner.

FIG. 10 is an elevation view of a photo spread 1000 of a photo-book project exhibiting a dynamically editable text box according to an embodiment of the present invention. FIG. 11 is an elevation view of photo spread 1000 of FIG. 10 with the text box moved to a position of conflict relative to a print parameter applied to a printing process for the photo-book.

Referring now to FIG. 10, photo spread 1000 is exemplary of any photo spread or project page that may be used in a project. In this example photo spread 1000 is part of a photo-book project. Photo spread 1000 includes two pages whereby the page on the right of the spreads includes a text box 1001. Text box 1001 is an asset provided by the system for users to insert text information relative to project theme and photos. In this example, a user has clicked on the text box 1001 to dynamically edit the text within.

A sizing frame 1011 is visible about text box 1001 in this example. When a user clicks on text box 1001 anywhere on or within the boxed area a text box re-sizing frame 1011 dynamically appears. A text editing tool bar 1003 and a text box rotation tool 1002 also appear in synchronization with the text box re-sizing frame. Frame 1011 enables a user to resize textbox 1001 by grabbing any one of the corner handles or side handles and dragging the handle to change the box footprint. Text box 1001 can be stretched taller or stretched wider by grabbing and dragging a top/bottom resize handle or a left side/right side resize handle on frame 1011. Text box 1001 may be made larger or smaller while retaining the same aspect ratio using any of the corner-located resize handles on frame 1011. In one embodiment resizing the text box after text is inserted into the box results in stretching of the text. In another embodiment resizing the text box with inserted text does not change the font size.

Text box rotation tool 1002 appears dynamically when the user clicks on box 1001 or anywhere within the box. Rotation tool 1002 may be grabbed and manipulated by the user to rotate text box 1001 about its center to the left or to the right at any angle desired. In one embodiment an additional window may be visible that provides the amount of rotation in degrees in real time as the box is rotated by the user. Text editing toolbar 1003 includes a font style selection menu 1004. Menu 1004 contains a field that can be used to type in a known font style or a drop-down feature in the menu may be leveraged to select from a list of included styles available to the editor.

In live editing, an auto-preview feature is provided whereby a user may mouse over a font style exposed from the drop down menu and see the font change in text window 1001. When the user slides the mouse pointer off of the selection, the font reverts back to the original font. The user may type over or type a font within the font window of menu 1004 and see the font change within text window 1001 once the system recognizes the font selection. Auto-preview is also provided for other types of edits including but not limiting to font size, font color, font presentation (italics, caps, bold, etc), and font justification (left, right, center). A user generally selects or highlights a text item within a project. This action may cause automatic display of a text editing toolbar, the toolbar including controls for at least editing font style, font size, font justification, and font color; and selecting one of the controls of step (b) and mousing over a menu option. For auto-previewing graphics the user selects or highlights a graphic within the project. As a result of this action, the system automatically displays a graphics editing toolbar, the toolbar including a styles interface having controls for applying at least, shadow effect, reflective effect, border style, blur effect, transparency effect, shapes effect, color saturation, hue, brightness, and contrast. The user selects one of the presented controls and mouses over a menu option to preview the option.

Toolbar 1003 includes a font sizing menu 1005 that is adapted to enable a user to efficiently select an optimum size for the font in text window 1001. Like the font style menu, the font sizing menu contains a field and a drop down list feature. A user may click the downward arrow causing a font list to be presented to the user. This list contains all of the allowable font sizes. A user may mouse over a font size in the list and see the size change take place in real time within window 1001 (auto-preview). When a user selects the font resizing tool 1005, a separate slider bar 1006 appears adjacent to the menu.

A user may grab the slider handle of the bar 1006 and move it up or down (vertical slider) or left and right (horizontal slider) to make the font in window 1001 larger or smaller according to the allowed font size increments that can otherwise be selected or ordered in menu 1005. Auto-preview enables a user operating slider bar 1006 to see the font changing in real time within window 1001 as the user moves the slider handle. In one embodiment of the present invention, a user may operate a set of directional arrows to change the font size. For example, clicking on the up arrow may increase font size by allowed increments while clicking on the down arrow may reduce the font size by allowable increment. Altogether there are four ways of manipulating the size of the font in text box 1001. These four methods include moving a slider, clicking sizing arrows, entering a number into a field, and selecting a font size from a drop-down menu. Auto-preview is supported by all of the text resizing methods and interfaces.

Toolbar 1003 includes a text Bold, Italicize, and Underline tool and a paragraph/justification formatting tool for adjusting the way the paragraph is presented. Anytime the text parameter controls such as Bold, Underline, and Italicize are moused over, the user can see the effect on the text in text box 1001 in real time using the auto-preview feature. Toolbar 1003 includes a font color management interface 1008 that includes three different ways to manage the color of the font within text box 1001.

Interface 1008 includes a rectangular color grid control that calls up a thumbnail selection interface containing all of the allowable theme colors in the form of selectable thumbnails when invoked. Interface 1008 includes an annular color palette control that calls up a system color palette that enables a user to pick a color from a field of blended colors or from a color bar of blended colors. Interface 1008 includes a color picker tool that when selected and or invoked provides a pixel color reader to the user's input device in the form of a color dropper that can be placed over any color manifested on the user display monitor to read a color.

The color of the text in text box 1001 may be changed to any color visible in the user interface that is read from a pixel by the color input tool. A user may operate the color selection tool to perform operations such as save a color, apply a color to all of a specific type of item, and so on. Moreover, an extension may be provided to the color picking tool to enable a user to blend or mix colors, or to select multiple colors in order of priority and save the colors to a personal color swatch or palette.

The method can be practiced by selecting or invoking a color reading tool; moving the tool over the display monitor to read and preview colors using mouse movement; and selecting a color read by the tool. The selected color may be applied to a single item or to multiple items. In one embodiment the color picking tool is used to select colors to save to a color palette or to a color mixing tool. In one embodiment a recommendation system is in use during color picking and can make recommendations to the user as to the popularity of any color read by the tool at the time of reading.

Such a category may be segmented according to various criteria such as by collaboration group, by friends of the user, by all site users, and so on. Other interesting statistical data may also be provided to the user relative to a selected or read color in the form of a pop-up or other visible message. For example the color picker may read a specific color and in preview mode a message appears that ranks the color and mentions one or more other colors that go well with the read or selected color. There are many possibilities.

Each of these font color application tools of interface 1008 is supported by auto-preview so that the user may see the text color changing before saving the text in a particular color. More detail about application of colors to font is described further below.

Toolbar 1003 includes a layering tool 1009 containing two controls. One control brings an item forward to overlay another item and the other control operates to send an item back one layer behind another item in the window. A unique aspect of interface 1009 is that the system "remembers" what layers items reside on and assumes that all items on the canvas that do not overlap are on the same layer. The tool will skip intermediate layers if an item is selected to "move forward" to overlap or "move backward" to hide behind another item that is more than one layer away from the item moved. In this way the user always sees the visual effect of moving an item forward or sending an item backward relative to the other items. The layering system is driven by algorithm and also detects which items are being intersected with and replaces depth level values attached to those items. In one embodiment, items or assets may be grouped on a page and may be incrementally brought forward or sent backward as a group of items. Toolbar 1003 includes a delete control 1010 for removing any items on the page or canvas.

Referring now to FIG. 11, text box 1001 has been inadvertently moved toward the gutter area of the spread by grabbing onto frame 1011 and dragging it toward the center of the spread. The system of the invention includes a user alert system for warning a user anytime a text box is moved to a position where some of the text might be cut off because it intersects or overlaps a print boundary such as print boundary 1100 made visible to the user as part of the alert process. A visual dialog box 1101 appears while the user is in process of moving text box 1001 in real time. The dialog box contains a warning to the user that the movement of the text box into the print boundary may result in a cut off of text during printing.

The print boundaries are based on the output dimensions for the printed output boundaries. The boundaries and text dialog alert box appear only when the user has moved text too close to a boundary edge. A buffer boundary area might be observed in some embodiments to cover outputs in slightly different aspect ratios. hat is to say that the warning would occur if a user brought the text box across the buffer boundary even though text did not cross the actual print boundary of a particular output format. Much work is reduced by providing this early warning system way back in the editing process and well before the printing process.

Figure 12:
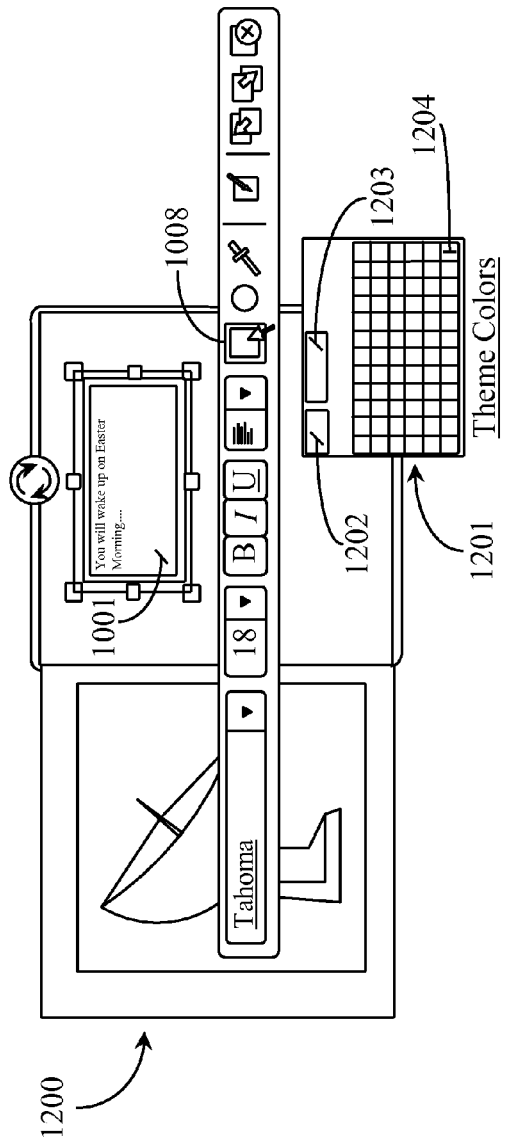
FIG. 12 is an elevation view of a photo spread of a project illustrating real-time text color application using theme colors.
Figure 13:
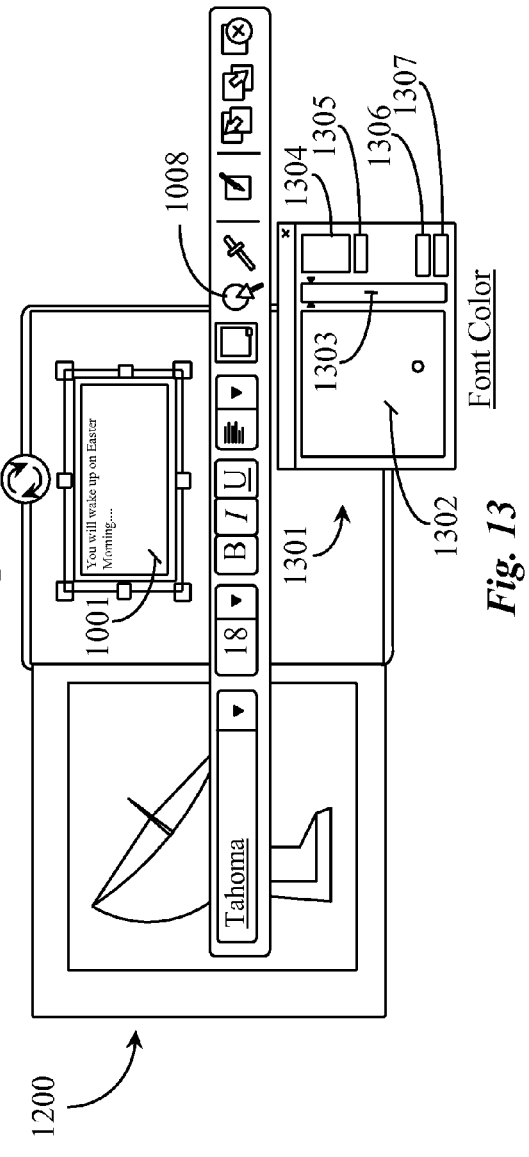
FIG. 13 is an elevation view of photo spread of the same project illustrating real-time font color change using system colors.

FIG. 12 is an elevation view of a photo spread 1200 of a project illustrating real-time text color application using theme colors. FIG. 13 is an elevation view of photo spread 1200 of the same project illustrating real-time font color change using system colors.

Referring now to FIG. 12, as described further above, font color management may be accomplished using a font color management interface 1008. In this example a user has selected the theme colors control of interface 1008 as evidenced by the illustrated mouse pointer during a process of changing font color of the font in text box 1001. A theme color grid 1201 immediately appears upon selection of the control. Theme color grid 1201 contains all of the theme colors 1204 that are generic to the theme the user or the system (in some cases) has selected for the project. In one embodiment, the theme color grid may include colors that the user has previously used in the project or colors that the user has saved to his or her account on Mixbook. Color pallet 1201 includes a color swatch containing the current font color of the text in text box 1001. An adjacent box 1203 includes the code name for that particular color. Auto-preview allows the user to see the font color change as the user mouses over any of the theme colors before actually committing to any one color.

Referring now to FIG. 13, as described further above, font color management may be accomplished using a font color management interface 1008. In this example a user has selected the system colors control of interface 1008 as evidenced by the illustrated mouse pointer during a process of changing font color of the font in text box 1001. A system color palette 1301 immediately appears upon selection of the control. System color palette 1301 contains all of the system colors 1302 that are available to the user by moving a pixel reading icon (circle, square, etc.) over the area of the palette to read the colors.

In addition to color palette 1302, a color strip 1303 presents all of the same colors from the top to the bottom of the strip. Color strip 1303 has a slider bar that a user may grab and drag over the blended color strip to determine a best color for the font. Like theme color grid 1201, interface 1301 includes a color swatch 1304 that contains the current color that is being moused over or selected and an information box that contains the code name for that color. An interactive option 1306 for cancelling a color selection is provided as is an interactive option 1307 for accepting the new color for the font in text box 1001.

Figure 14:
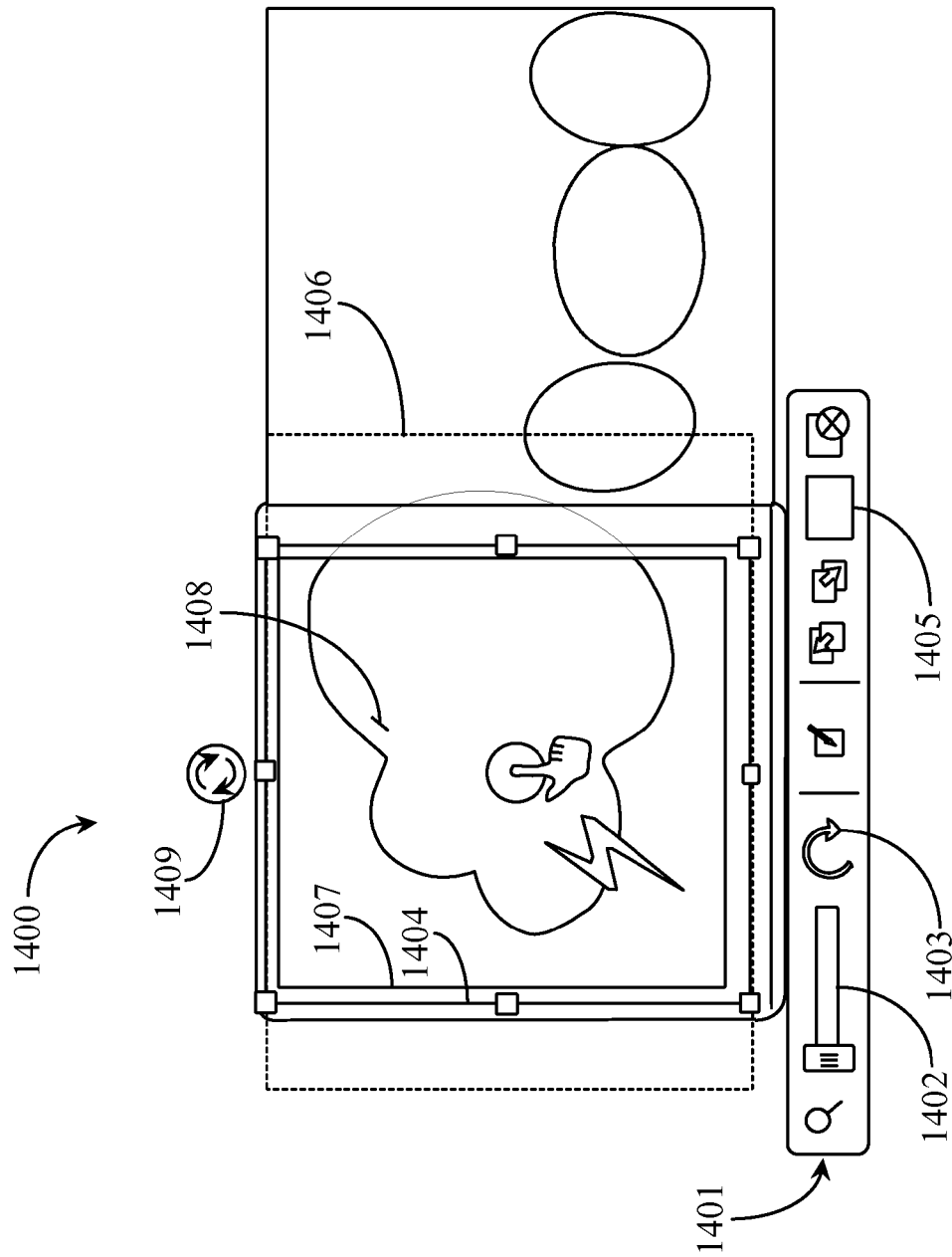
FIG. 14 is an elevation view of a photo spread illustrating a photo-editing frame and intuitive photo panning interface according to an embodiment of the present invention.

FIG. 14 is an elevation view of a photo spread 1400 illustrating a photo-editing frame and intuitive photo panning interface according to an embodiment of the present invention. Photo spread 1400 contains a photo slot 1407 on the left page of the photo spread. A photo 1408 has been inserted into photo slot 1407 by a user building the project. Photo slot 1407 automatically hides any part of photo 1408 that extends past its boundaries. The portion of the photo extending past the boundary is invisible to the user until the user grabs the photo for the purpose of panning the photo to improve the position of the photo within the photo slot.

The above process is illustrated by a mouse grab-hand controlled by computer input device (mouse). When the user drops photo 1408 onto photo slot 1407 an algorithm automatically sizes the photo so that its top and bottom edges or its left side and right side edges align exactly with the corresponding boundaries of the photo slot in accordance to whichever dimension of the photo is a closer fit to the corresponding dimension of the photo slot (width or length). In this example the top and bottom edges of photo 1408 align to the top and bottom edges of photo slot 1407. A user may then grab photo 1408 in the center using a grab operation and move or "pan" the photo to the left or to the right. The rest of the photo extending past the slot boundaries (left edge and right edge) is visible at some level of transparency as photo boundary 1406. When the user lets go of the photo, the portion of the photo 1406 is hidden completely providing a convenient and innovative virtual photo cropping capability.

In one embodiment the photo slot is an image display window of a predefined geometric configuration disposed on a project page for containing and displaying an image that has been placed thereon. In this example the user may grab the photo by interacting with an image handle associated with the image container, the image handle visible on highlight or selection of the image within the image container or display window. Again if one or more dimensions of the image exceed the dimensions of the image container or photo slot, a user may grab the contained image by the image handle and may move the image about within the container in any direction to present the best view of the image. Parts of the image that are hidden behind the page canvas become visible to the user when the image is grabbed enabling the user to see what parts of the image are cropped by the predefined geometry of the image container as described further above.

A photo sizing frame, similar to the text box sizing frame described further above includes side grab handles and corner grab handles to facilitate sizing. A photo-slot rotation tool 1409 is provided above the photo resize frame for rotating the photo clockwise or counter clockwise. Optimal sizing constraints are applied in the algorithm used to optimally fit photo 1408 to photo slot 1407 such that photo zooming or scaling requirements are kept to a minimum to increase the efficiency of the overall process of building a project.

A photo-editing toolbar 1401 is provided to enable a user to make edits to photo 1408. Toolbar 1401 appears along with the sizing frame 1404 when the user selects photo 1408 for editing. Toolbar 1401 contains a photo zoom interface 1402 for enlarging and reducing the photo size. Zoom interface 1402 is a horizontal slider. The photo placed in the photo slot is optimally sized so that the bar on zoom slider 1402 is all the way to the left. A user may grab the bar on slider 1402 and drag it to the right to enlarge or "zoom in" the photo. Enlarging a photo causes the unseen portion of the photo outside the photo slot to expand beyond the boundary edges of the photo slot. After enlarging a photo, a user may re-pan the photo to ensure that the best part of the photo is viewable through the photo viewing window or photo slot.

Photo editing tool 1402 includes a rotation tool 1403 that rotates the photo counter clockwise by an angle of 90 degrees. Photo editing toolbar 1405 contains a spread feature for extending a photo over onto the next page of the spread. A user may place the photo in the gutter portion of the spread and click onto control 1405 to facilitate a view of the photo spanning across the two pages of the spread. Another click on the control cuts off the content of the photo that is bleeding over onto the second page. In this case the second page is simply the page that the photo was initially absent from before proceeding to span the photo.

Figure 15:
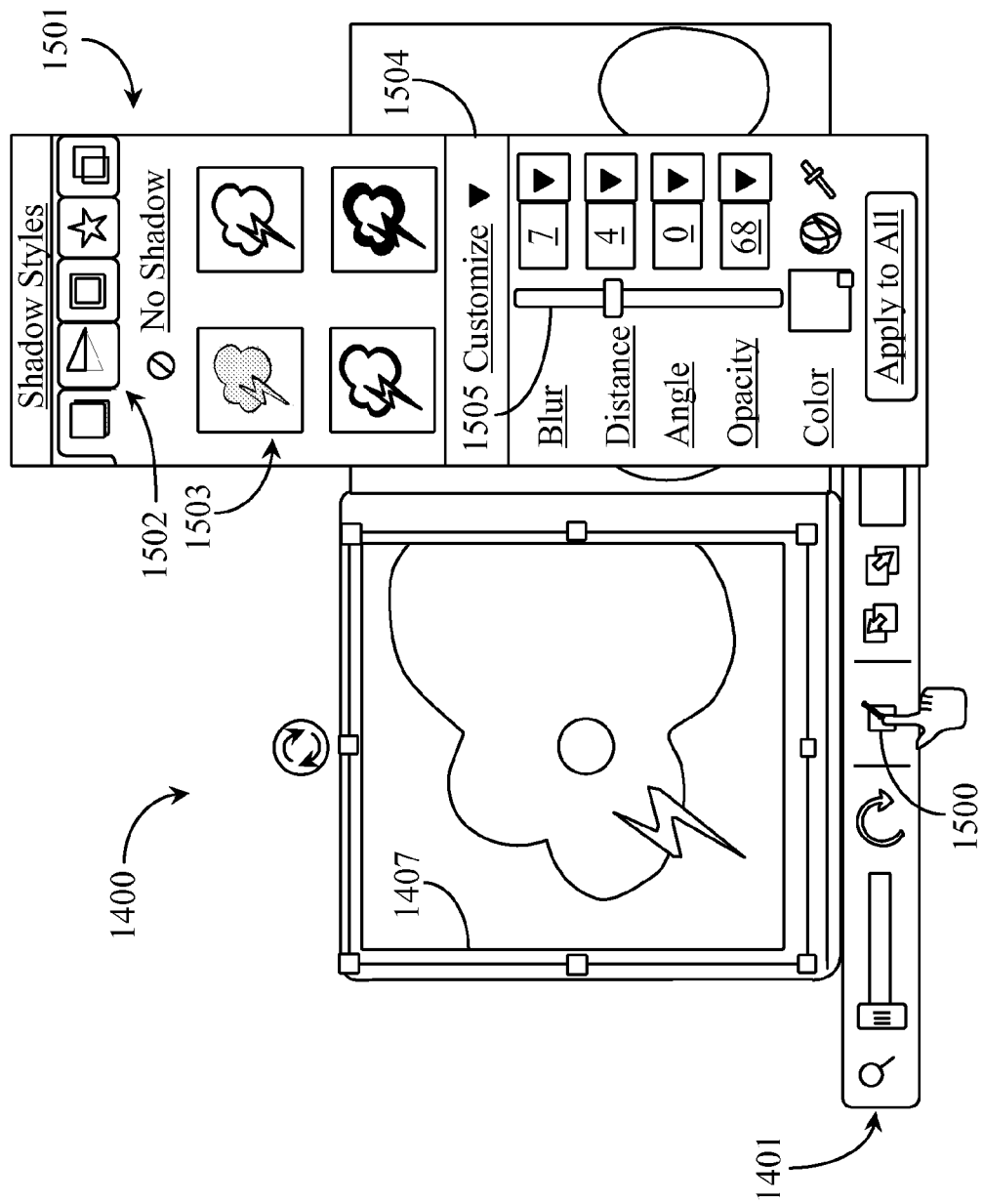
FIG. 15 is an elevation view of the photo spread of FIG. 14 with a style editing interface 1501 invoked from photo editing toolbar according to an embodiment of the present invention.

FIG. 15 is an elevation view of photo spread 1400 of FIG. 14 with a styles editing interface 1501 invoked from photo editing toolbar 1401 according to an embodiment of the present invention. A user may invoke a styles editing interface 1501 by clicking on a control 1500 as illustrated via a mouse or other input method. Styles interface 1501 is an extension of tool bar 1401. Interface 1501 is also available on text editing toolbar 1003 described further above in the description of FIG. 10. Styles editing interface 1501 includes effect application options 1502 for enhancing photos.

Options 1502 visited from left to right include a shadow selection interface control that when invoked produces shadow levels 1503 from no shadow to heavy shadow. Next to the right is a control option that when invoked calls up a reflection interface to apply a level of reflection to the photo. A border control is provided to the right of the reflection interface and provided a variety of borders to select from for bordering photos and text boxes. Next to the border control is a shape control. The shape control provides a menu of shapes (stars, hearts, etc) that can be used as innovative photo crops by dropping them into a photo-slot. The final styles option is a transparency interface control that brings up a transparency level interface where a user may select from different levels of transparence for a photo.

It is noted herein that all of the same style editing controls are present in the styles editing interface for text boxes that can be executed from toolbar 1003 described further above. Those controls produce the same selections for shadow, reflection border, shapes, and transparency. Further all of these controls include auto-preview options so the user may see the effect in the photo or text before saving the effects. In addition to the effects listed as options 1502 in styles editor 1501, other photo effects and editing tools might be included as options in the interface without departing from the spirit and scope of the present invention such as a brightness control, contrast control, color saturation control, hue control, and other standard photo editing options.

Automatically previewing edits to graphics items within the image-based project involves selecting or highlighting a graphic within the project to automatically display photo-editing toolbar 1401 inclusive of styles editing interface 1501, which may include controls for applying at least, shadow effect, reflective effect, border style, blur effect, transparency effect, shapes effect, color saturation, hue, brightness, and contrast. A user may select any of the controls and mouse over the menu option to preview an effect.

Before applying any effect to a canvas component like a photo or sticker a user may preview how the effect may appear on an object in the styles editor. The items current effects are considered saved effects. When a user desires to change the effect or style of an item they first select the item on the canvas, which automatically opens a toolbar with the styles and effects editing interface. In one embodiment a display of the selected item is provided in preview mode where the display is of the actual item or a representation of the item.

In one embodiment a user may click on an effect for an item and then mouse over the item in preview mode to see how the effect will appear on the item. Mousing off of an item returns the appearance of the item back to its saved state. If the user clicks on one of the preview displays in the case of multiple displays as in the styles editing interface, the styles or effects represented by that display will be applied to the selected item and those styles or effects will be saved, such that the saved state now includes those settings.

Interface 1501 includes a customize option that incorporates a slider bar 1505 that is shared relative to a plurality of editing options including Blur; Distance; Angle; and Opacity. A user may select any one of the just-mentioned options and then use slider bar 1505 to scale the level of effect of the selected option. Furthermore, each listed option has a text value menu where a user may type in a desired value, or select a listed value from a dropdown menu. At the very bottom of styles editing interface 1501, a color editing interface similar or identical to interface 1008 described previously is provided that includes a control for bringing up a grid of theme colors, a control for bringing up a color palette and/or a color strip, and a control for picking a color using a pixel color reader in the form of a ink dropper that replaces the mouse pointer when picking a color. Any pixel that is visible in the user display may be read and its color may be used to recolor any item of the photo book. At the bottom of interface 1501 an interactive option is provided enables the user to apply a change to all items on photo spread 1400.

Figure 16:
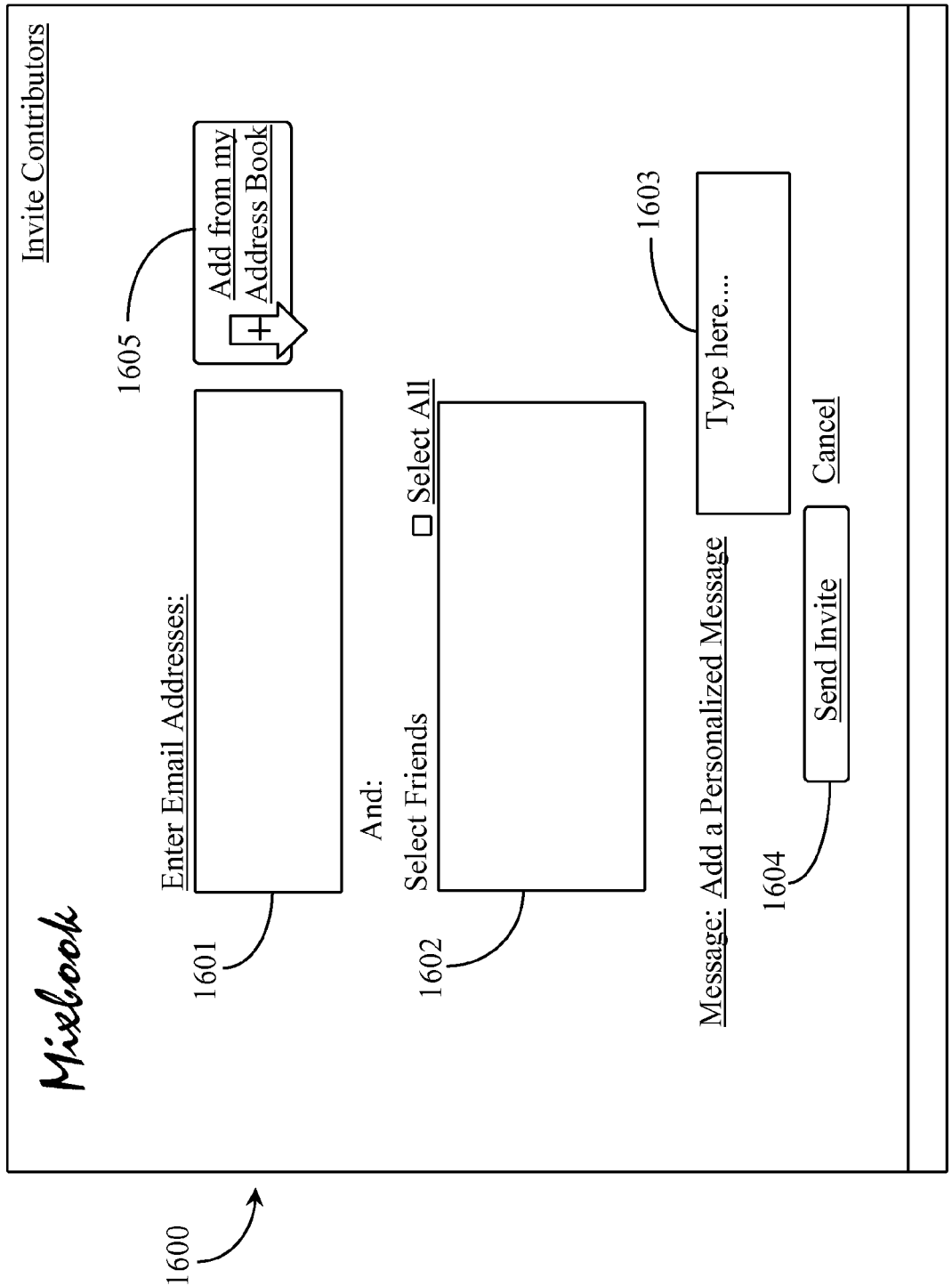
FIG. 16 is an exemplary screen shot of a contributor invitation interface according to an embodiment of the present invention.

FIG. 16 is an exemplary screen shot of a contributor invitation interface 1600 according to an embodiment of the present invention. The system of the present invention enables a user to initiate a project as a creator or project host and then to invite other users to help work on the project or contribute assets to the project. Interface 1600 appears as a result of the user clicking on "add contributors" when first starting a new project as described further above with reference to FIG. 5.

Interface 1600 includes a text field 1601 for entering the email addresses of other users that the hosting user wishes to invite to contribute to the project. These other users may already be registered on Mixbook™ or they may not be community members yet. Users who are invited to contribute to a project but are nor members of the service may be directed to a membership page to register as a user before being allowed to contribute to a member's project. Interface 1600 includes a second text field for selecting friends from a list of friends that are already known to the system. If the friends are already known, the list is presented each time the user clicks on the feature. An option for selecting all of the listed friends is provided at the top right corner of text field 1004.

Once the invitees are selected, the user may elect to provide a personal message to the group of friends invited. A text field 1603 enables a user to type in a text message, which will be sent to the users. Such a message may explain the project and the reasons for establishing or at least inviting contributors. For the purpose of term definition as it applies to this specification, a contributor to a project can be any person that is able to contribute creative assets to an existing project either in collaboration or singularly. A contributor may be a friend or family member already registered to the site. A contributor may also be a family member or friend that is treated as an invited guest that has not yet signed up for the service.

Once the contributors are identified either by email address and name or both, the invitations are automatically sent as email, short message service (SMS), Instant Message (IM) or some other invitation message to those users. Interface 1600 includes a widget 1605 for enabling a user to browse an address book to add users. Once friends are registered with the site, the user need not enter any email address information to invite them to be contributors. Contributors may also be collaborators that help the user work on a project in real time. In this case, the collaborators may already be online as detected by presence reporting or monitoring. The user simply selects those that are online from the list in text field 1602. An icon may be provided next to the name of a friend to indicate whether that friend is online or offline.

The inventors emphasize that the system of the invention is designed to make it easy for multiple users to work on and share projects with one another in a manner that promotes use of pages from different projects to contribute to a project in the works. In this way users may contribute pages from other projects to one they are currently collaborating on. An option for making a project open to all community members registered with the site is provided at the start of a project. In some cases projects created by one or a group of community members may be copied by another user whereby the new creator edits the original work to make it personal to the new user. In this scenario many different projects may contain many of the same photos and other creative assets that were originally copied.

Figure 17:
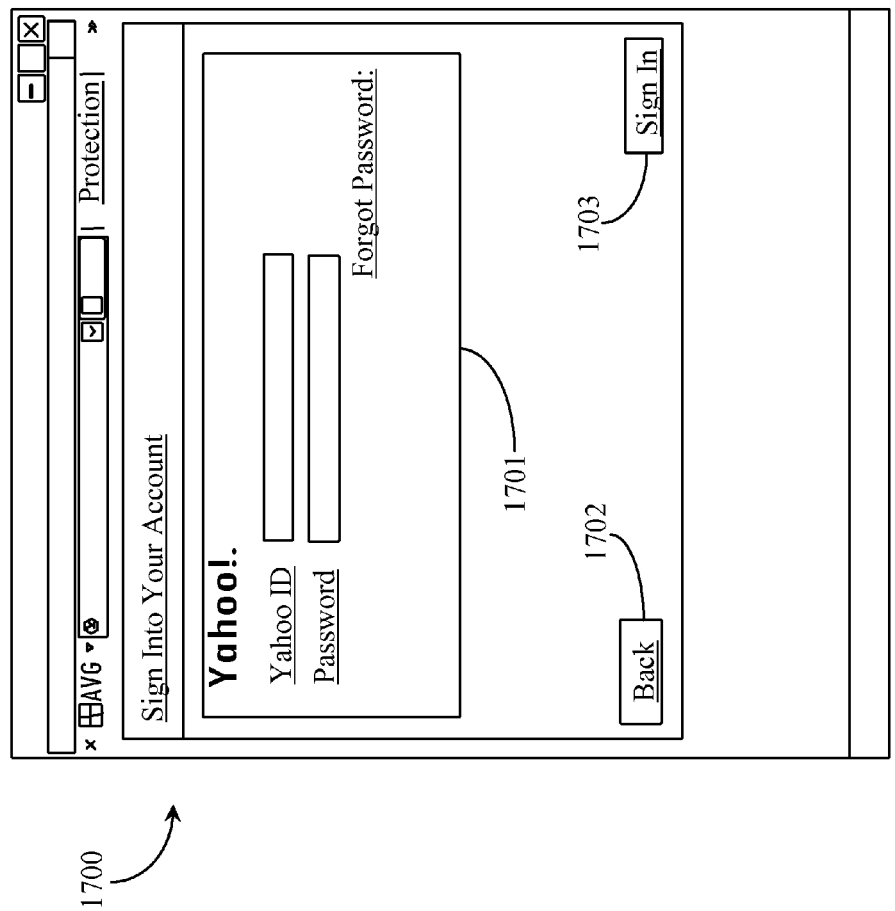
FIG. 17 is an exemplary screenshot of a proxy-login interface that enables a user or contributor to gain access to a personal account to link to or otherwise acquire access to photos available through the personal account.

FIG. 17 is an exemplary screenshot of a proxy-login interface 1700 that enables a user or contributor to gain access to a personal account to link to or otherwise acquire access to photos available through the personal account. In this example, the login interface is for logging into a Yahoo™ account where that user may have access to photos stored remotely at the service. Interface 1700 includes the traditional fields for entering a user name or email and password pair. A back button 1702 is provided on interface 1700 for navigating back to the previous page. A sign in or login button 1703 is provided for submitting the information.

Navigation to the user's personal account takes place through the Mixbook™ server by proxy. Once logged in to the account, the system finds the photos associated with the account and allows the user to select and transfer a photo or simply establish an active link to the photo so that the photo may be used in a project without a physical upload to the service. This is accomplished by a data structure that includes a URL to the photo as described previously. It is noted herein that the exact look of the log-in page may vary and may include a sign-up option for signing up with the service through Mixbook™.

Figure 18:
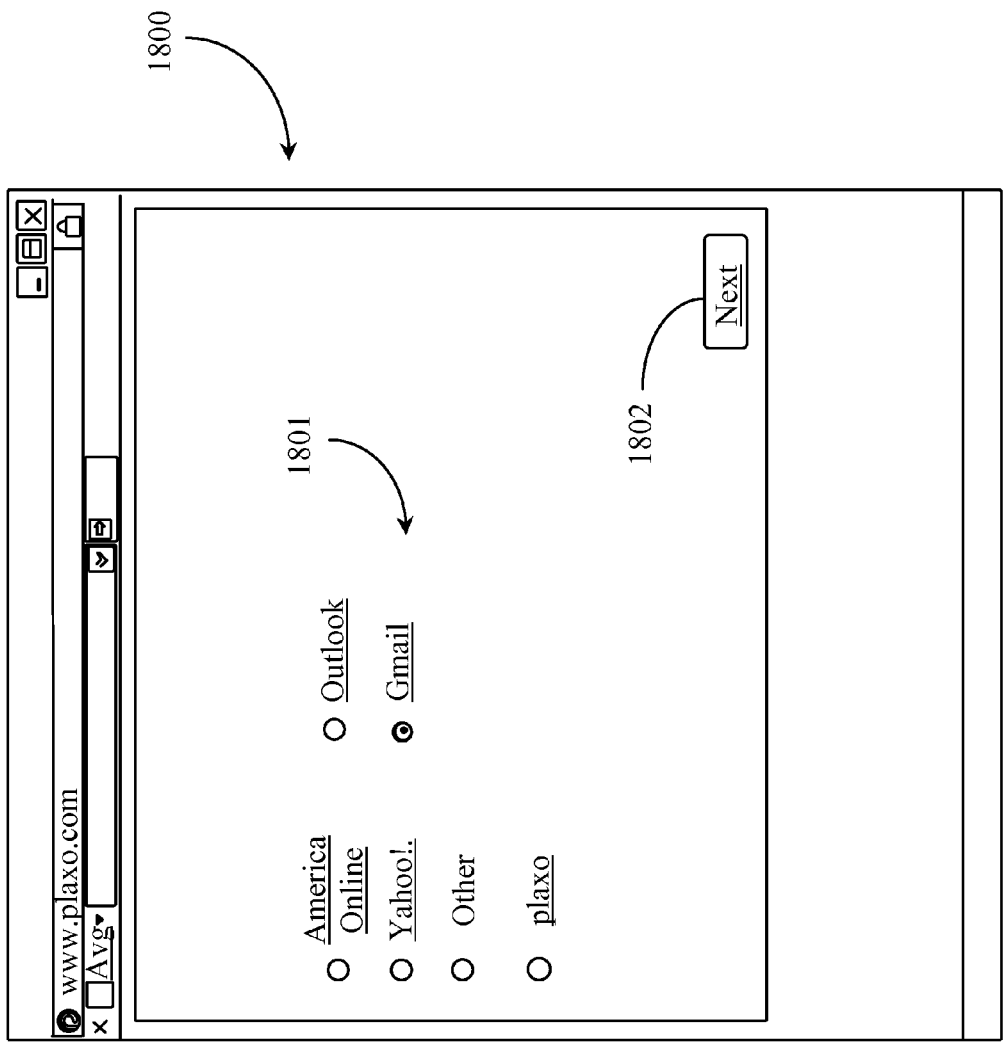
FIG. 18 is an exemplary screen shot of an add friends interface for adding friends to the service of the present invention.

FIG. 18 is an exemplary screen shot of an add friends interface 1800 for adding friends to the service of the present invention. Interface 1800 includes a plurality of email services 1801 that a user may have accounts with. The user may select any of these services to locate contacts of the user that the user may wish to invite to become friends on the Mixbook™ site. As previously described the service of the invention collects a list of invitees and sends emails, IMs or SMS messages to invite them to the service on behalf of their friend. Once the invitees have registered for the service they are included as friends of the inviting user and members of the Mixbook™ community as a whole.

Once a user has indicated one or more services to access contacts from, the user may select the next button 1802 to proceed to gather the email contacts of each of the selected services. In one embodiment the contacts are in a list resident on the user's computing appliance. In the case of Instant Messaging Access Protocol (IMAP) accounts such as Gmail for example, the proxy log-in interface of FIG. 17 might be used to access the contact list for that service.

Figure 19:
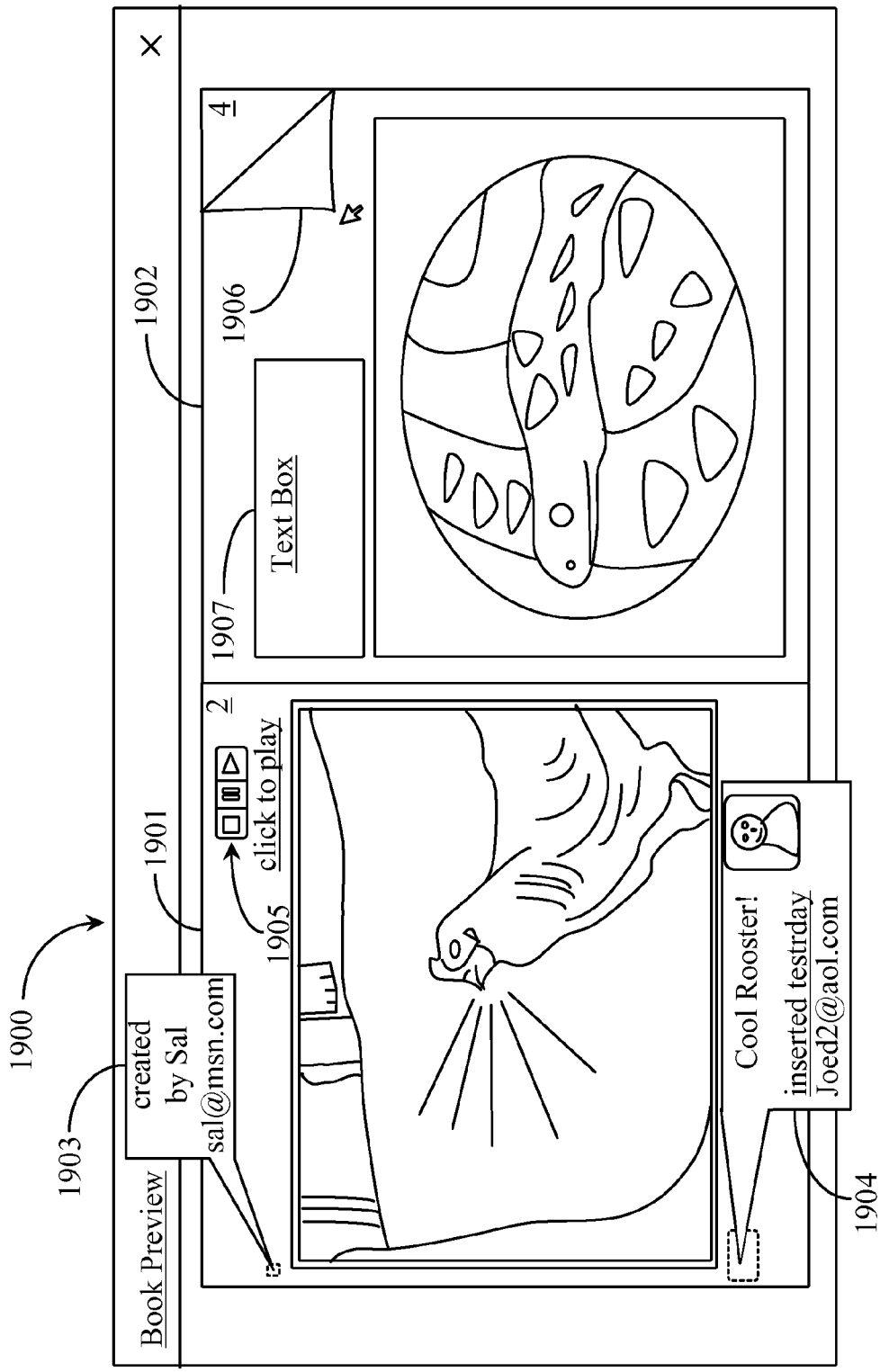
FIG. 19 is an exemplary screen shot of a preview interface for previewing a finished project according to an embodiment of the present invention.

FIG. 19 is an exemplary screen shot of a preview interface 1900 for previewing a finished project according to an embodiment of the present invention. Interface 1900 enables a user to preview an online project or other users to view a project they might have access to on the system. In this example the preview interface is in the form of a book that has multiple pages with photos and text. In one embodiment a play book widget is provided that enables viewing of a photo book in the form of an interactive slide show or a form correct book preview as is illustrated in the example.

Interface 1900 includes a number of pages in addition to a front cover, back cover and spine (not illustrated). Pages two and three of the photo book are visible and are given the element numbers 1901 (page 2) and 1902 (page 3). Referring now to page 1901, a user may configure a slide show or automated presentation of a Mixbook™ that includes comments such as comment 1904 made by other users. Comment 1904 includes the user's email address and time that it was inserted. The system enables users to view their books as an online slideshow that displays all the pages of the book along with additional multimedia content that can be added. Users will have the ability to add music or any type of sound track to one or more pages within the book or to the widget to play in the background while the book is being viewed as a slide show.

In one embodiment interface 1900 enables automated panning and zooming of the pages of the previewed book. A small information box 1903 shows the user that created page 1901 with a very simple statement and email address. If more than one user contributed to a single page, then two information balloons might be presented, each citing one of the creators. It is noted herein that a user may turn off automatic display of user information related to contributors. Interface 1900 enables users who have viewed the project to leave comments embedded on pages of the book. In this example a comment is present on page 1901 from a user Joed2@aol.com. A profile picture of the commenter is illustrated in text balloon 1904. If many comments are present, they may not all display at once so as not to obstruct viewing.

In one embodiment of the present invention, users may add music or soundtracks to the system and may associate those to particular projects or to particular pages of a project. In one embodiment the granularity of adding multi-media content extends to a photo. For example if a photo in a project themed as a barnyard is a rooster, then a multimedia clip of a rooster crowing might be provided and embedded on the page containing the photo of the rooster. When the page showing the user is played, the clip of the rooster crowing automatically plays as well. In another embodiment the entire slideshow might be set to some background music that would play or loop back for the entire time the slideshow is running. In one embodiment a static clip associated with a page or a photo on a page might include a small control panel such as control panel 1905, which enables the user to stop the clip, play the clip again manually, or pause the clip momentarily. In one embodiment a user would be able to interact with items on the page to trigger multi-media "actions" including but not limited to playing a video, playing an animation, moving various items around the page, playing a sound or music, or moving to another page in the project.

In one embodiment of the present invention, a preview interface such as interface 1900 and a slideshow window for viewing an automated presentation of the book are two different interfaces. In another embodiment both the playback widget and slideshow widget are one in the same. In this respect the interface "look" may be different depending on which process the user is engaging, previewing a book or viewing a finished book in the form of a slide show. There are many possibilities. In one embodiment a photo slot might be associated with more than one photo such that each photo slot in a slideshow could be a small slideshow of two or three photos for example.

In an embodiment where a slideshow of a book is to be viewed through a single presentation window having a footprint smaller than a two-page book spread, an algorithm analyzes the content of each page of the book and dynamically generates a path of traversal through the page content including photos, text, and other media. Page transitions between the last traversed content on one page and the first traversed content on the next page may be statically ordered or dynamically selected by the algorithm from a pool of possibilities.

In one embodiment the algorithm considers for each page of the book, the state of the previous page and the state of the next page relative to the location or position of the navigable content and then determines the optimal mode of traversing the page using the single presentation window used to present the slide show and subsequently determines the best available transition option to get to the next page. The algorithm creates a tree of possibilities and selects the best fit path of traversal for a page and the best transition to the next from the tree of possibilities. The traversal path over a page of a project book may be defined by the current X and Y coordinates of the window on the page and the current zoom level of the window. It is noted herein that in slideshow presentation mode, which may be different from book preview mode, the playback widget is able to zoom in and out and pan the content of the pages during the presentation.

In one embodiment where a slideshow of a project book is viewed, the playback widget will allow the dynamic display of user comments about the book. While the Play Book Widget is traversing a page, comments made on that area of the page, or comments that are relevant to a particular area of a page will be displayed, along with information about the user including but not limited to a profile picture, first name, last name and headline or quote.

In one embodiment of the invention the system incorporates a persistent message board for each photo book project termed a book wall by the inventor. A book wall allows users to post messages to each other about an entire project. When a user makes a note on a page of a photo book the note will be posted to the book wall as well and may include a link to the page. A book wall may be opened from anywhere in the book. The book wall may be a section that may be navigated to and opened from within a Mixbook™ editor. In one aspect an additional section might be created where a user working on a project with multiple collaborators could propose ideas and suggestions for collaborators. Collaborators may be allowed to comment or edit the creator's comments.

Figure 20:
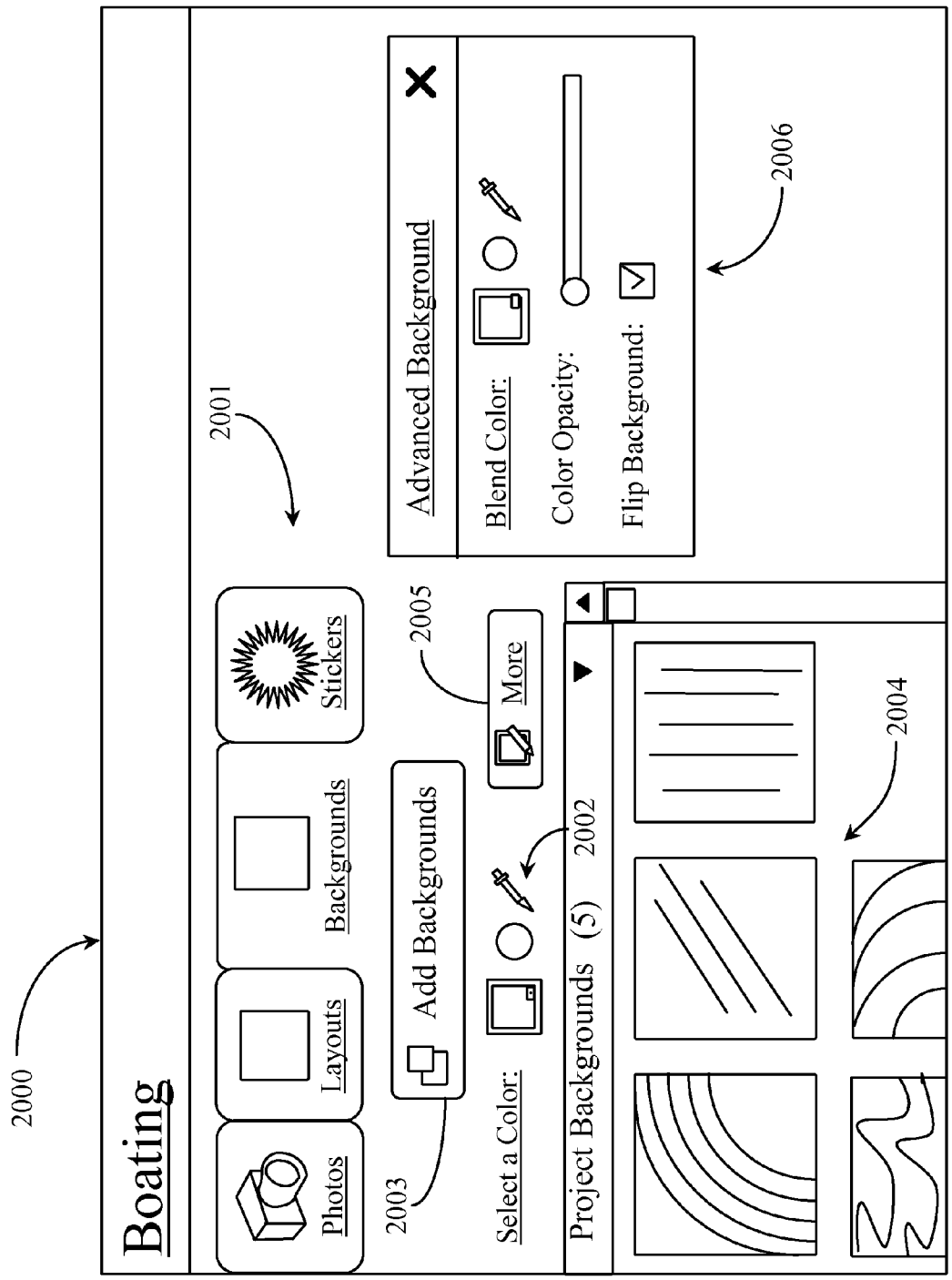
FIG. 20 is an exploded screenshot of the background selection portion of the user interface of FIG. 8 including an advanced background touch-up section according to an embodiment of the present invention.

FIG. 20 is an exploded screenshot of the background selection portion 2000 of the user interface of FIG. 8 including an advanced background touch-up section according to an embodiment of the present invention. The system of the present invention provides a unique color touch-up interface 2006 for modifying pre-existing or newly created backgrounds that can underlie page content in a project. Color interface 2006 appears when a user clicks on interactive control 2005 labeled more.

An interactive control 2003 for acquiring backgrounds is provided. Control 2003 opens a navigation window that the user may use to browse background images stored on the user's system for upload to the service of the present invention. The navigation window also provides access to any backgrounds the user has previously saved as personal backgrounds (My Backgrounds) and other backgrounds from other project themes (Theme Backgrounds).

Many backgrounds might have some textured surfaces like backgrounds designed to emulate paneling materials, brick and mortar, wood grain, and the like. Many backgrounds have asymmetric characteristics that can be flipped so that a pair of background images is created where each image is a mirror of the other in the pair.

Color interface 2006 provides advanced background coloring, color opacity adjustment, and color blending. One unique aspect of color blending in the system of the present invention is that pre-existing background images created by system designers and by some Mixbook™ users that exhibit textural characteristics such as wood grains or brick patterns, for example, can be enhanced with application of pure and blended colors to enhance and personalize them to newer users. The applications do not overwrite the original files such as system-provided theme backgrounds for example.

Figure 21:
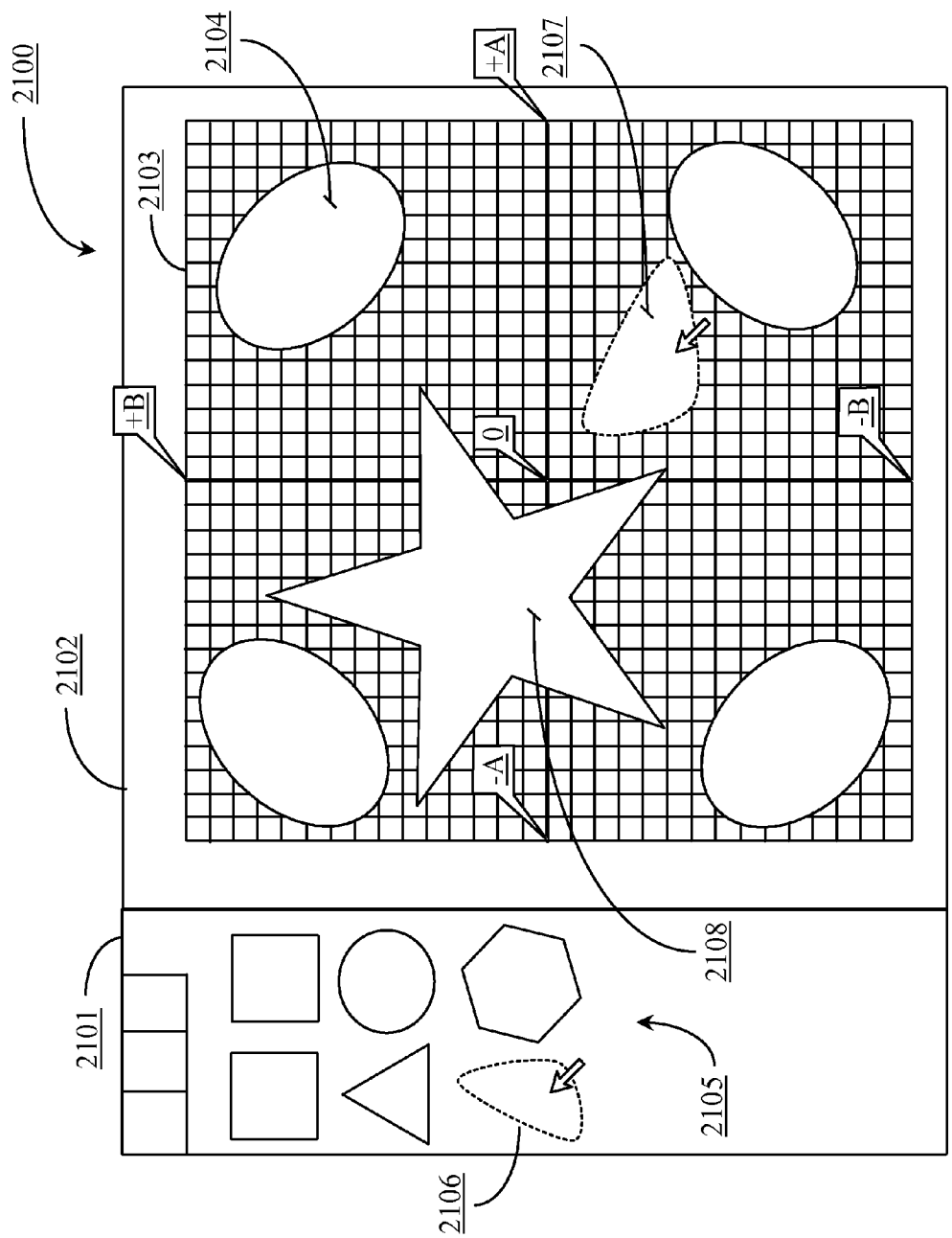
FIG. 21 is a page-on-canvas view illustrating a relative page coordinate system according to an embodiment of the present invention.

FIG. 21 is a page-on-canvas view illustrating a relative page coordinate system according to an embodiment of the present invention. Interface 2100 logically represents a single page 2103 on a canvas 2102. Page 2103 is square in this embodiment so it has an aspect ratio of 1:1. Page 2103 has a page size that is stored using relative units. For landscape or portrait pages the length of the shortest edge is assumed to be 1 and the length of the longest edge is equal to the value derived by dividing the length of the longest edge by the length of the shortest edge. For example, if the aspect ratio of a page is 4:3, then the height has a measurement of 1 unit and the width has a measurement of 1.33333 (landscape). The page also uses a relative coordinate system that originates from the absolute center of the page.

The grid pattern of the relative coordinate system may be rendered visible to a user or may remain invisible to a user. In one embodiment the grid pattern may be displayed to the user, but at some level of transparency. The 0 point on the grid is the absolute center point of the page.

The coordinate system is used for describing the position, size and orientation of inserted items like photos, text boxes, stickers, shapes, and so on. Other information about the content like display styles and effects on those items including but not limited to border, shadow, glow, fill, rounding of corners, reflection, photo cropping, font size, and font style is also stored relative to the position, size and orientation of the items.

Page 2103 has a plurality of elliptical shapes (2104) placed thereon generally located one per page corner. A star shape 2108 is located left of center and slightly above the midline of page 2103. All of the described shapes could be photo slots that are used as photo viewing/panning windows. Shapes might be used in other ways on page 2103 as well, such as stickers, or text boxes in one embodiment. The page size in this example is square so it is described by the relative coordinate system as −A to +A for width and −B to +B for height.

To establish a relative coordinate system on a page the 0 point or absolute center is established first. From the absolute center of the page, the system scales a number of relative units along the width direction and height direction from 0 to a negative limit and from 0 to a positive limit for both dimensions wherein a unit is an equal division of the total value from the negative limit to the positive limit for width and height.

Canvas 2102 includes a sidebar area 2101 containing the options for adding creative assets to the project like photos, layouts, stickers and backgrounds. Additional shapes 2105 are displayed for selection by the user. The system is aware at all times of the most current state of each page of a project. Logic is provided that enables the system to map the sizes, positions, and orientations of all of the items on a given page. This information is available to the system in real time as a user continues to add shapes to page 2103.

A shape 2106 may be a next shape selected for insert onto page 2103 as is illustrated in this example by a broken border and input device arrow. As the shape is dragged off of the sidebar and dropped onto the canvas as is illustrated in this example, an algorithm automatically sizes the shape and places it on the page in an optimum position based on the real-time data about the current positioning, orientation and sizes of the assets already on the page. The inserted shape is shape 2107 having undergone a resizing and reorientation before being placed on page 2103.

In one aspect of the invention a user may auto flow content onto a page using a unique grouping algorithm adapted to fit a plurality of photos in the project into logical groupings. The algorithm creates logical photo groupings based on timestamp information and other metadata information from each photo. Using a wide variety of mathematical distributions (i.e. normal, beta), the algorithm determines which photos are related and then logically groups those photos on one page. The metadata may include date and time that the photos were taken, titles, and other types of data. Additional inputs into the function include, but are not limited to, the average and standard deviation of the number of photos in a group and priorities and weightings of various metadata information for use in grouping.

At various times throughout project creation, display, and output processes, it becomes necessary to convert the relative coordinates in the page data structure described above into physical measurements. The conversion process allows the display of the content at any size, either on a display such as a computer monitor, mobile device such as a phone or tablet, or television display, or in a physical printed format such as a printed photo book or poster. By allowing for the translation of the relative coordinates and values into physical measurements, the system enables notification to users if any items on a page might not look acceptable in print. For example, the system can detect if a photo will display at a size in print that is too large based on the size that was originally uploaded or added via partner site integrations or otherwise. By storing the data in an abstract data structure with relative positioning and coordinates, created content can be used across a plurality of products and sizes.

Figure 22:
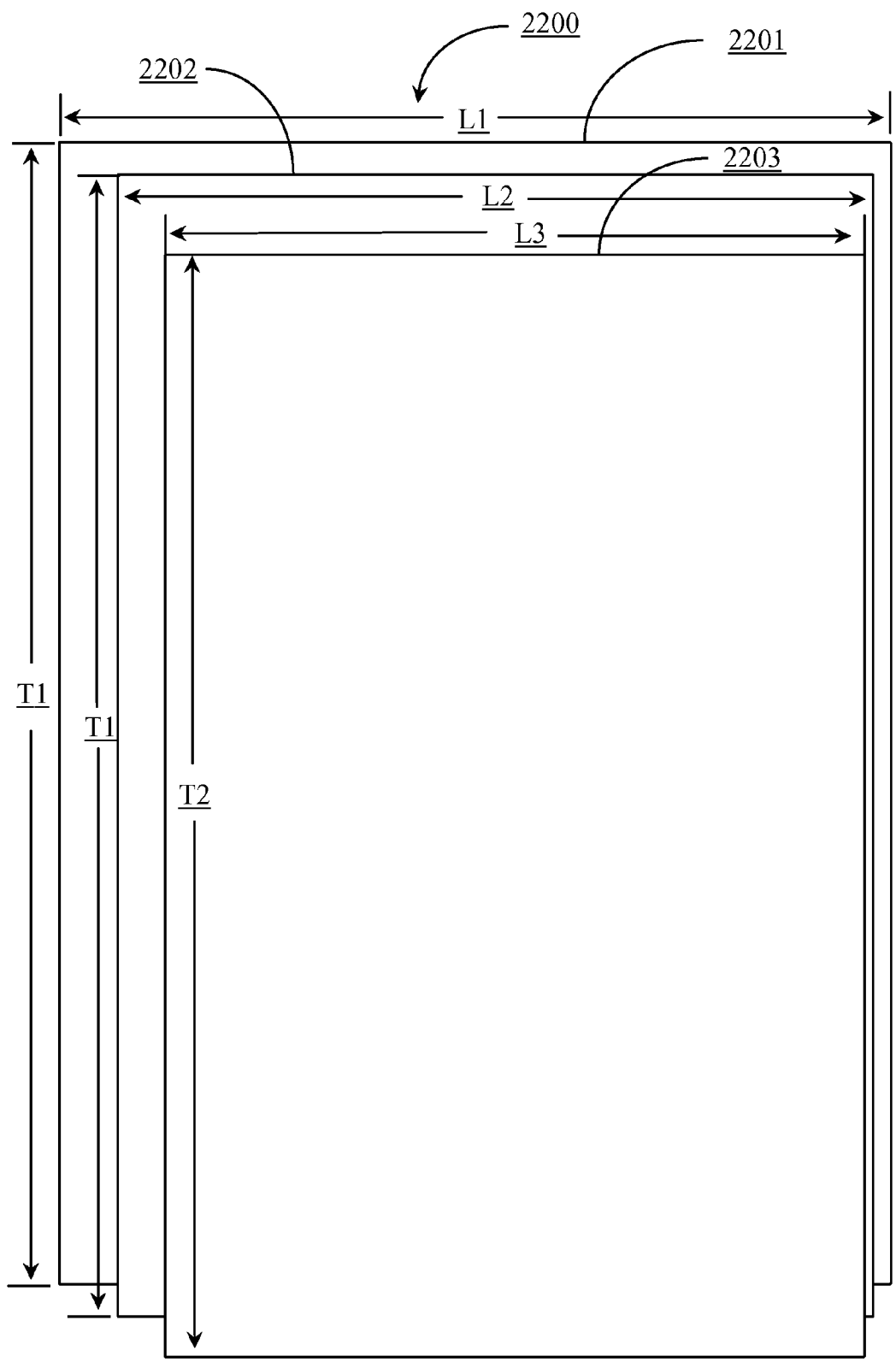
FIG. 22 is a block diagram illustrating a grouping of portrait page sizes exhibiting similar aspect ratios.

FIG. 22 is a block diagram illustrating a grouping 2200 of portrait page sizes exhibiting similar aspect ratios. An aspect ratio grouping (ARG) is a paradigm or pattern whereby two or more output or print sizes in a given orientation are grouped together to form a grouping. A grouping of similar aspect ratios for a given orientation includes the available specific output sizes that a project may be printed in without requiring any content editing by the creator before print. This innovative aspect of the system enables users to output a project to a print size within the grouping that is consistent with the orientation of that grouping.

Grouping 2200 includes three portrait-oriented page sizes in this example. These are a page 2201 having a width of L1 and a height of T1; a page 2202 having a width of L2 and the same height of T1; and a page 2203 having a width of L3 and a Width of T2. Grouping 2200 comprises pages of portrait orientation. Another grouping is available for landscape orientation and still another grouping is available for square orientation. The aspect ratios of each of the pages are very similar. An algorithm assigns a "core" aspect ratio to a project for display that is formulated as a core aspect ratio value derived from analysis of the aspect ratios of the pages in group 2200. All page content in the same orientation as an aspect ratio grouping is displayed at the core aspect ratio. More particularly, all page content intended to be printed at a specific page size (say 2201) will be displayed at the core aspect ratio of that specific page size's aspect ratio grouping.

In a preferred embodiment an algorithm is provided for displaying content at a core aspect ratio that may be printed to output end products like books, posters, calendars, and so on in the same orientation without any explicit resizing steps or data repositioning steps required of the user. A canvas described herein as an output canvas has a width and a height, bleed areas, and in most aspects, a gutter area. The page content is presented online in display during project creation using a "core" aspect ratio that is derived from analyzing the different aspect ratios in grouping 2200.

The algorithm determines from the canvas measurements what the optimum aspect ratio of the page content will be to ensure a minimum loss of content that would be cut off in the printing process. If the page content aspect ratio is taller than the available output canvas aspect ratio, content will be fit to the canvas such that the left and right edges of the page content fit exactly into the viewable area (left and right edges) minus a gutter allowance. The area on top and bottom of the page content will be cut off. On the other hand, if the page content aspect ratio is wider than the available output canvas aspect ratio, content will be fit to the canvas such that the top and bottom edges of the content fit exactly into the viewable area. The page content is positioned on the canvas such that the left or right content edge (depending on which page) is aligned to the gutter edge and content on the opposite edge which would include the bleed area of the page is cut off. In this way, page content can be optimally fitted to a variety of different output formats like two or more different portrait sizes for a portrait aspect ratio or two or more different sizes for landscape aspect ratio. In general, for an aspect ratio grouping that contains square-formatted output sizes, the ratio is ~1. For an aspect ratio grouping that contains portrait-formatted output sizes, the ratio is <1. For an aspect ratio grouping that contains landscape-formatted output sizes, the ratio is >1.

The algorithm translates the core aspect ratio of the project to one of the selected sizes in a related aspect grouping. For example, a user might create an eight by six (landscape) pocket photo book using the SW of the present invention. The user may opt to print and purchase a photo book that is a classic landscape size like eleven by eight and one-half. The algorithm places the original page content for each page of the book onto the output canvas as the correct 11×8.5 classic landscape print size without requiring the user to edit any of the original content or to manually position the original content on the page. The algorithm performs the sizing adjustment during the output process in the background transparent to the user and no hard changes to stored data are necessary.

In practice, the system, aided by algorithm, determines for each page size in the group, the viewable area of each page, the aspect ratios of the viewable areas are recorded. The total amount of error present amongst the available aspect ratios relative to comparison with a given aspect ratio may be determined or quantified. Using a mathematical program, process, or automated calculation tool, the effective aspect ratio that minimizes the function and hence the total error value is found. The project page may then be displayed at the effective core or effective aspect ratio.

In one embodiment, the system determines to "find" an effective aspect ratio (EAR) for display during editing. EAR shall be analogous with core aspect ratio (CAR) in this specification. Both acronyms carry the same meaning. Given the following three candidate aspect ratios of 1.5, 1.38, and 1.65, the problem is to derive the aspect ratio that would best fit each of the candidate aspect ratios. In this case R shall equal EAR. R will fall somewhere in a range bounded by 1.38 and 1.65. The total error E can be represented using the following equation $$E = \sum_{i=1}^{n} E_i$$

where n=the total number of output sizes and where i=1. $E_i$ can be represented a number of different ways. In one example, $E_i=\min(E_{iw}, E_{ih})$ wherein $E_{iw}$ and $E_{ih}$ represent the error when the effective aspect ratio (EAR) denoted as R in this case, fits the height exactly, but spills over in the horizontal direction and wherein the reverse is also true, namely that R fits the width exactly but spills over in the vertical direction. R will best fit the aspect ratio in one of the two ways identified. $E_{ih}$ can be represented by $$E_{ih} = \left|\frac{w_i}{R} - H_i\right|$$

and $E_{iw}$ can be represented by $E_{iw}=|H_i R - w_i|$. Therefore, using the original equation $$E = \sum_{i=1}^{n} E_i$$

we get . . .

$$E = \sum_{i=1}^{n} \min\left(\left|\frac{w_i}{R} - H_i\right|, |H_i R - w_i|\right).$$

In other embodiments $E_{iw}$ and $E_{ih}$ may be represented in other ways as well. In one embodiment a constant could be added to the derived equation and the system could multiply through the errors. In this case we might have an equation like $$E = \prod_{i}^{n} \left(\min\left(|H_i R - w_i|, \left|\frac{w_i}{R} - H_i\right|\right) + K\right)$$

where K could be any number>1. In one embodiment the algorithm fires automatically any time a new product grouping of available output sizes is established. All projects electing a group of output product sizes are displayed at the CAR for that group.

Figure 23:
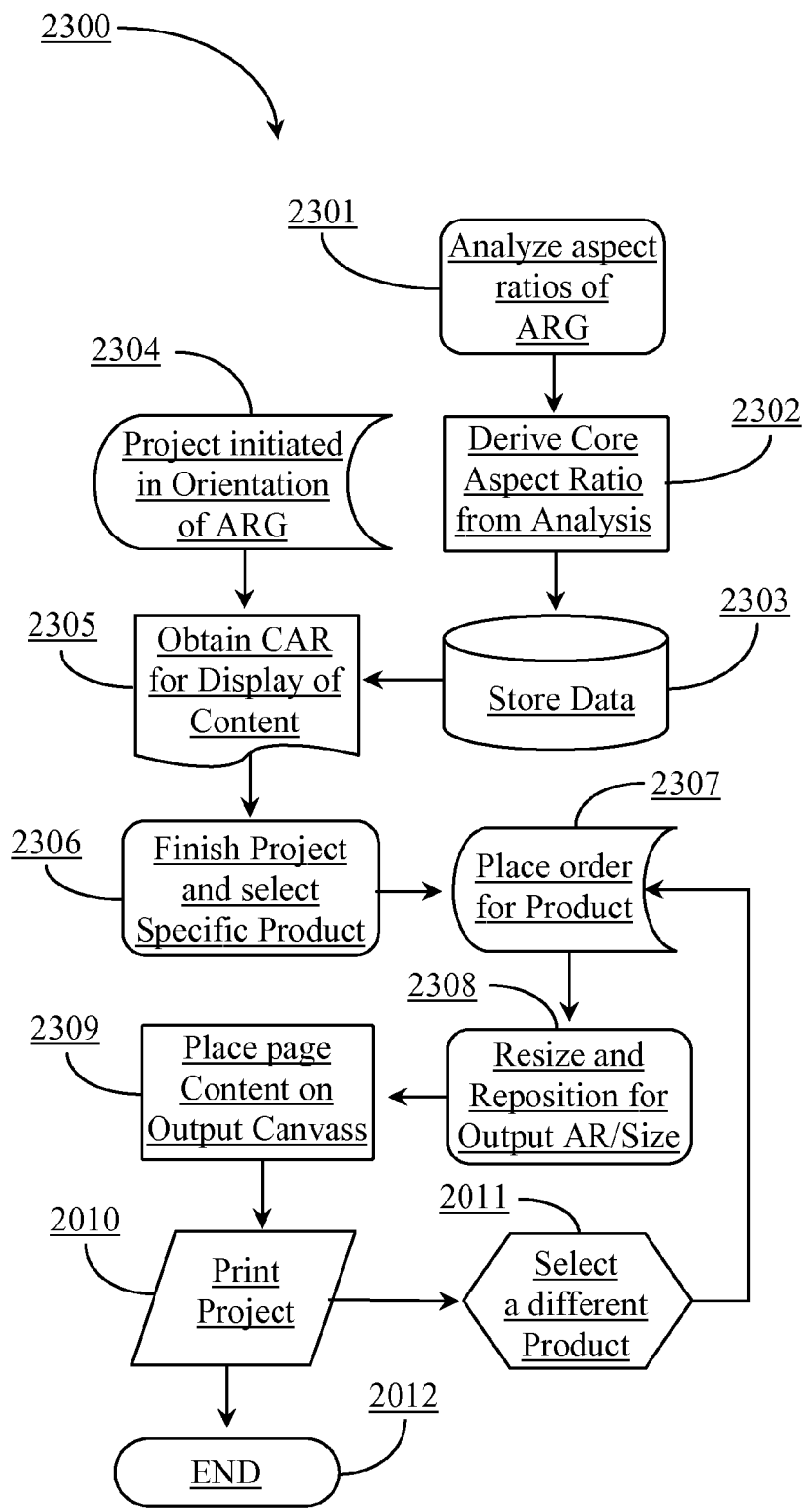
FIG. 23 is a process flow chart illustrating steps for displaying project page content at a core aspect ratio and optimizing the content for printing at a specified size.

FIG. 23 is a process flow chart 2300 illustrating steps for displaying project page content at a core aspect ratio and optimizing the content for printing at a specified size. As described further above, an algorithm drives the process of optimally sizing and placing content onto an output canvas of a specific size and orientation for printing. Products that may be purchased and printed are grouped by orientation (landscape, portrait, or square) and by similar aspect ratios that translate to specific output print sizes. The content that is displayed online during editing and content viewing or previewing has a core aspect ratio derived from the differing aspect ratios of the specific products in a grouping.

At step 2301 the aspect ratios of the specific products in an aspect ratio grouping (ARG) are analyzed. The core aspect ratio value can be derived by first defining a set list of end product sizes for a specified aspect ratio grouping. Each end product in the grouping has a viewable page area after allocation is made for the gutter area. For example, 0.5 inches may be allocated for the gutter making the viewable width area 8 inches for a page width of 8.5 inches. Therefore an 8.5×11 inch page has a viewable area of 8×11 inches.

The above definition is made for every product in the same ARG. Once a width and height dimension of the viewable area for each end product in the group is established the system can mathematically determine a best core aspect ratio for the group. The core aspect ratio is the aspect ratio that best fits all of the viewable areas (width and height pairs) in the group. To determine a best fit CAR, in one embodiment, the system runs sample CAR values against the group values (2301) to quantify mean percentage overlap errors for the group for each sample value input into the formula. At step 2302 the algorithm derives a core aspect ratio from the analysis of step 2301. The sample CAR exhibiting the smallest mean error is the best fit CAR for the group. As each end product is considered the system determines a percentage of overlap (left/right and/or top/bottom) for the difference between the sample ratio and the end product ratio. The system squares the resulting error value for each product in the group giving each product an error value and then takes the mean error value for the group for that sample CAR value. The sample resulting in the smallest mean error value becomes the accepted CAR for the group. All content is displayed at this CAR while editing, previewing, or viewing. The data is stored for latter access in step 2303.

In an independent thread, a user initiates a project at step 2304 (create project) in the same orientation of the ARG of step 2301. The product data in that grouping includes the output format data for all of the sizes included in that grouping. An ARG may include two or more than two products with similar but differing aspect ratios whereby all of those products are of different print sizes. At step 2305 the user MBE obtains the correct core aspect ratio (CAR) from storage for the content display that was derived at step 2302.

By step 2306 the user has finished the project and places an order for the project at step 2307. The order will include a specific output size that is available in the grouping of products, which are all of the same basic orientation. At step 2308 the same or a different algorithm performs a content resize and reposition if necessary for the exact aspect ratio and size of the selected output product. This step is transparent to the creator of the project or to any user ordering the output format of the project.

At step 2309 the algorithm loads the page content or "places the content" on the output canvas. At step 2010 the project is printed. In one aspect of the invention printing is carried out by a third-party service where the final output is delivered to the printer in a format that is print ready so not configuring need be performed at the printer. If no other products are to be printed from the output at step 2010, the process may end at step 2012. If the user decides to select a different product to print from the same ARG for the same project, the process may loop back to step 2307 for placing the new order for the different product included in the ARG product data. Steps 2308, 2309, and 2310 are then repeated in sequence and the process may end at step 2312 unless a different product is then selected from the grouping for print.

Figure 24:
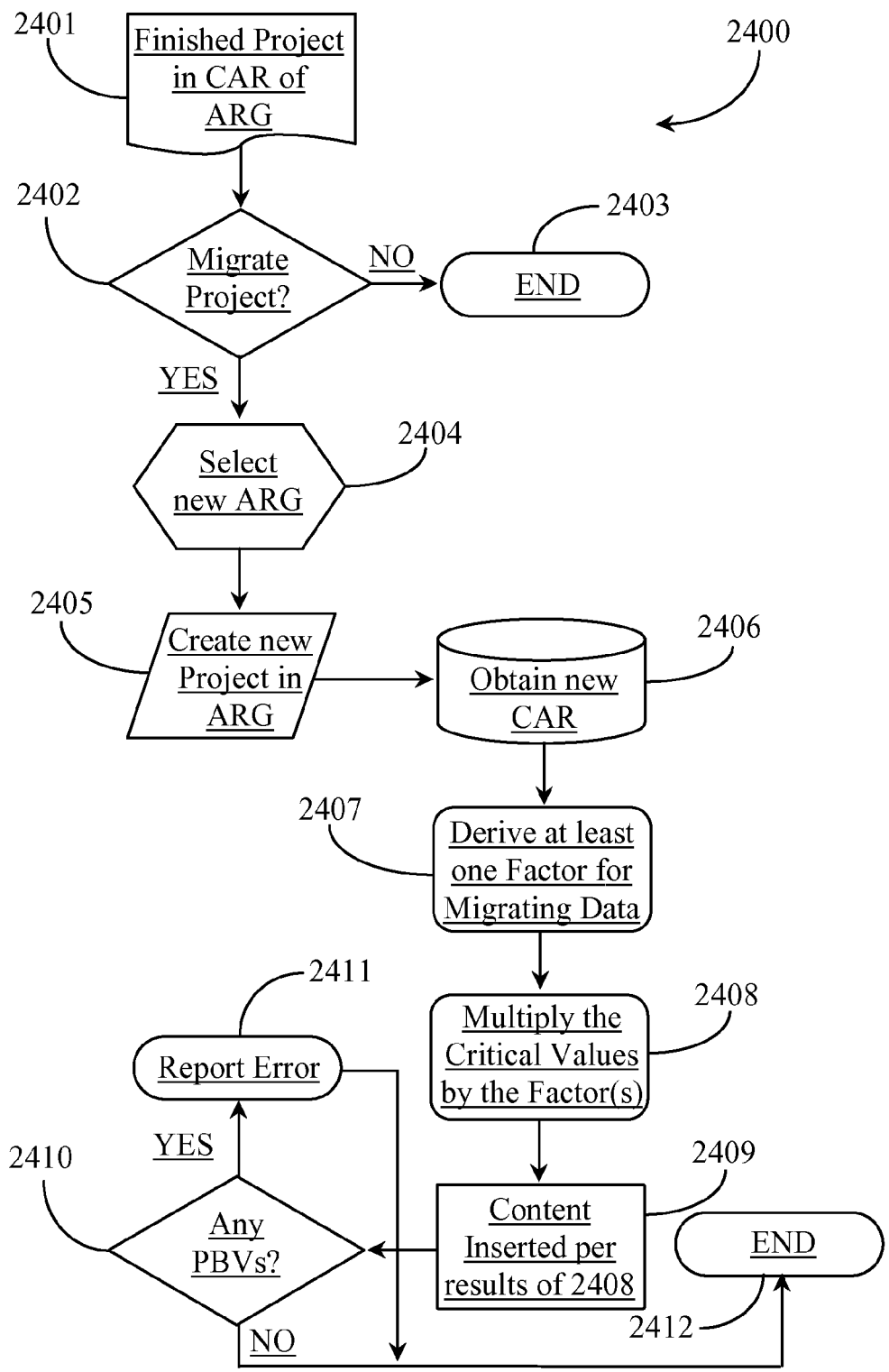
FIG. 24 is a process flow chart illustrating steps for migrating content from one aspect ratio grouping to another aspect ratio grouping.

FIG. 24 is a process flow chart 2400 illustrating steps for migrating content from one aspect ratio grouping to another aspect ratio grouping. The system of the present invention has a mechanism driven by algorithm for migrating project data from one aspect ratio grouping to another. Project data migration from one aspect ratio grouping to another is performed in a manner that ensures that no created content is lost because of boundary issues in the process.

At step 2401, a user has a finished project created for a specific aspect ratio grouping (ARG) and displayed using a core aspect ratio (CAR). At step 2402 a user decides whether or not the project data will be migrated to a new project in a different ARG. For example, the original project may be presented as a portrait book and the user wants to create a landscape book using all of the same information and effects.

If at step 2402 the user decides not to migrate an existing project, the process does not start and simply ends at step 2403 with no action taken. If the user determines to create a new project in a different ARG then the user may select a new ARG at step 2404. As previously described, an ARG is a grouping of projects of different sizes but the same page orientation.

At step 2405 the user creates a new project in the new ARG. This is accomplished working within a project editing interface (Mixbook™ Editor). In one aspect an option for migrating project data between differing formats might be made available to users as a static option accessible from the Web page or on a toolbar or drop-down menu of the interface.

At step 2406 the algorithm obtains a new core aspect ratio (CAR) from the destination ARG and creates a new project space observing the CAR of the ARG. The algorithm then derives at least one multiplication factor in step 2407 for translating the current project data in the original CAR to the project workspace under the new CAR. The algorithm multiplies the original project data critical values by the derived multiplication factor or factors at step 2408. This may include project data and content data including the width and height of the pages, the width and height of items, the position of items on the pages, and many different pieces of data for effects on the items on the page.

At step 2409, the content is inserted per results obtained at step 2408 according to the new CAR. The result is that all of the original project data gets translated to the new format without losing any content due to intersection of content with a print boundary. At step 2410, the system determines if any of the new content has violated any of the print boundaries (print boundary violation (PBV) in the new format. If the process runs successfully and no conflicts occur, then the process ends at step 2412. If there is a boundary violation (PBV) detected at step 2410, then the process may move to step 2411 whereby the system reports an error in the translation, which may be conveyed to the user.

In a preferred application if there are any PBVs that occur they are detected during the translation process and shown to the user in an auto-preview information alert that informs the user of the exact nature of the issue such as what the issue is and what page if not on all pages the issue is present in the new format. The algorithm is designed to ensure that no violations will occur during the translation of content to the new format so a determination of a violation at step 2410 would be rare given the controlled environment for translating the data. Auto-preview mode ensures that any error would be detected in real time during the translation process and the process would suspend or pause before the offending error were realized in the new format giving the user the best opportunity to resolve the error.

Figure 25:
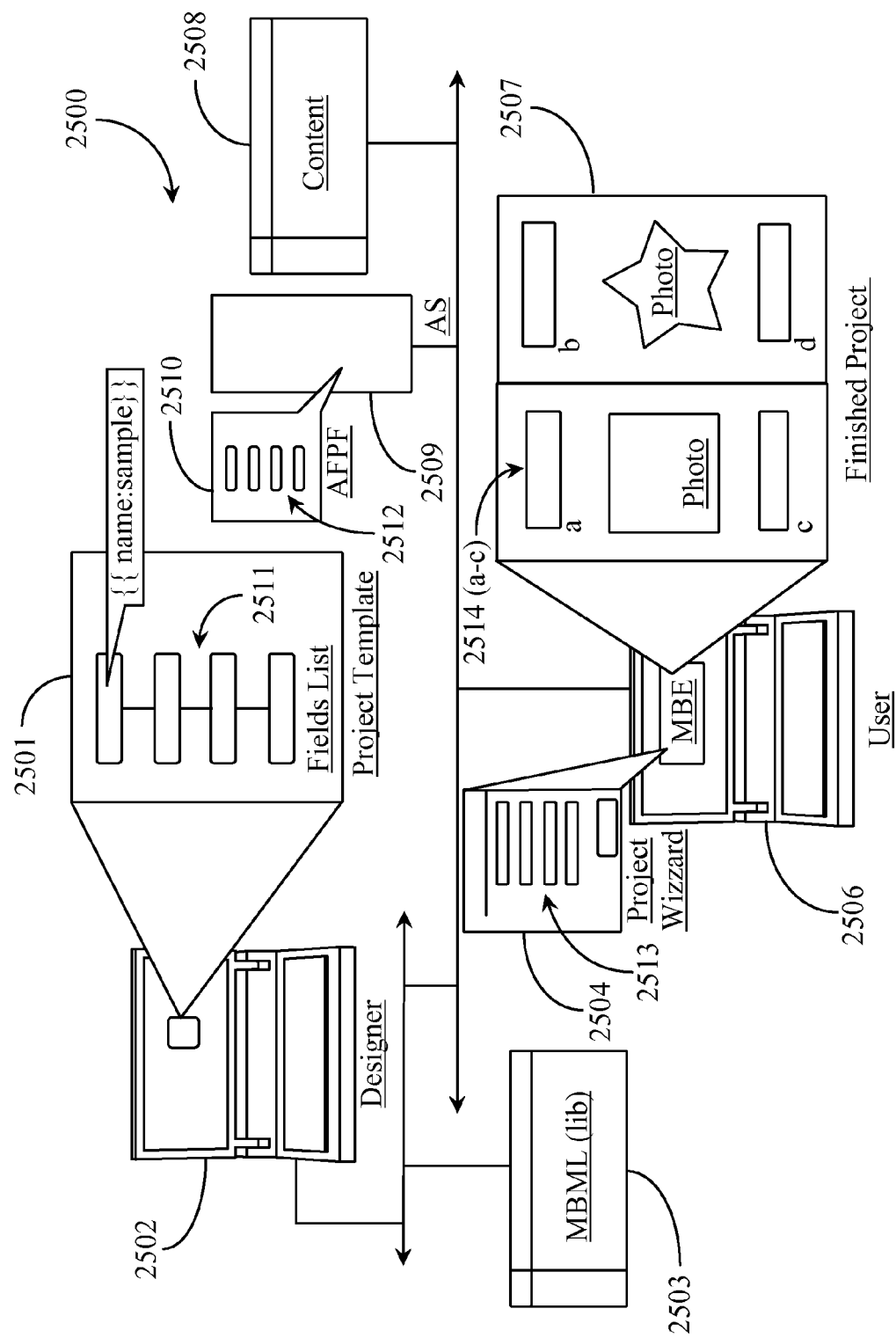
FIG. 25 is a block diagram illustrating system architecture for interpolating sample and default data into a project template using a special markup language according to an embodiment of the present invention.

FIG. 25 is a block diagram illustrating system architecture 2500 for interpolating sample and default data into a project template using a special markup language according to an embodiment of the present invention. Custom photo-based projects that are theme oriented contain text boxes that are ordered based on a pre-designed project template such as a project template 2501 that is created for a theme by a designer 2502.

Designer 2502 is connected via network to runtime server (RS) 2509, which may be analogous to AS 109 of FIG. 1 above. Server 2509 has access via data network to a data repository 2508 adapted to contain content such as pre-designed project templates, themes, and other components that are integral to the process of the present invention. Any finished project such as project 2507 is created from a project template like template 2501. Template 2501 includes a fields list 2511 that identifies all of the system-provided fields that are part of project template 2501. At the onset, all of these fields are blank with no content data, field definition data, position data, location data, orientation data, or size data included. The designer may provide all of the descriptive data about these fields in template 2501 so that when a project is opened for editing all of the stock fields are located in the proper places in the project. The field sequence (order of appearance of the fields when navigating the project), and field default or sample text, which are instructions prompting the user to add a specific piece of information to the field when editing a project.

In this example, the designer defines each dedicated field including what type of data should be inserted into each field by an eventual user of the theme-based template. The designer has access to a proprietary markup language termed Mixbook™ Markup Language (MBML). Designer 2502 may use MBML supported by a MBML (lib) 2503 connected to the designers network to define and dedicate text fields 2511 and to automatically populate end product fields that correspond to these template fields with default or sample text. Defining a text field may be accomplished by tagging the field with MBML. MBML allows designers of templates to input "default" or "sample" text that will guide the user on what to enter in a given field.

MBML is used in one application by inserting double brackets ("{{") to start the MBML, followed by the name of the field being defined. Optionally, the name of the field may be followed by a colon (":"), with the "Prompt Text" that will be displayed to the user in a project wizard such as project wizard 2504 in order that the user to understand what should be entered in each field. The MBML tag may be closed for a specific data field by double closing brackets ("}}"). It is noted herein that differing syntax may be used to define MBML markup fields or variables other than double brackets without departing from the spirit and scope of the present invention. For example, in one embodiment the MBML fields could be represented by HTML-type tags rather than double brackets. Furthermore, a user-friendly designer interface (not illustrated here) could be provided for convenience as is the case with other markup such as Dreamweaver™ for HTML, for example.

Two or more MBML tags may be associated to one field box without departing from the spirit and scope of the present invention depending on what the nature of the definition of that field box is. A date and time MBML tag pair can be used to mark baby birthdates in a baby photo book. A designer might specify a date and a time using two associated tags, for example, {{date:Date Baby Was born}} at {{time:Time Baby Was Born}}. MBML is extensible, such that new field "types" could be defined that perform other functions, such as inserting a page number, the current date and time, the name of the user, the title of the project, and so on.

In one embodiment, an automatic field population form (AFPF) 2510 running on AS 2509 is invoked by default whenever a user invokes a project template by initiating a specific project. In this embodiment AFPF 2510 takes the appropriate MBML embedded field list 2512 and auto-populates the fields 2513 of project wizard 2504 in display before a user with the prompt text that tells the user what data should be entered into each field. The user may then enter the appropriate data specified by the MBML "prompt" data of each field into project wizard field boxes 2513, which results in auto-population of the data in the corresponding project fields 2514 (*a-d*) of finished project 2507. It is noted herein that one template field might correlate with two or more project fields in a finished project. Repeated fields in a finished project that are adapted to contain the same data are represented by a single field in the project wizard and template.

In this example AFPF 2510 may be generated at the point of the user invoking project wizard 2504 to enter data into project 2507. AFPF 2510 auto populates fields 2513 with the correct prompt text. Another AFPF like AFPF 2510 may be generated to auto-populate fields 2514 (*a-d*) in finished project 2507 when the user finishes entering all of the correct data in fields 2513 in project wizard 2504. In one embodiment an auto-preview feature similar to that described further above is provided to project wizard 2504 that informs user 2506 if any data is entered incorrectly into any of fields 2513. In another embodiment no project wizard is necessary and AFPF 2512 auto-populates fields 2514 (*a-c*) with the sample or prompt text that informs user 2506 what type of data should be entered into each field. In all embodiments the entered field data are persisted along with the project as part of the project.

It is noted herein that MBML defines variables such as different data strings that are interpreted as sample or instructional text that lets the user or the system understand what data is supposed to be inserted in the end project field. A project field shall be defined as any feature on a project being edited that may accept text as input and display the text. A project field may include but not be limited to a text box, a title bar, a photo caption, a number field, a date field, an address field, a header, and footer. Moreover, such project fields that may be automatically populated include those residing in any portion of any type of project whether the project is in the form of a book, a card, a calendar, a mouse pad, or any other product.

Figure 26:
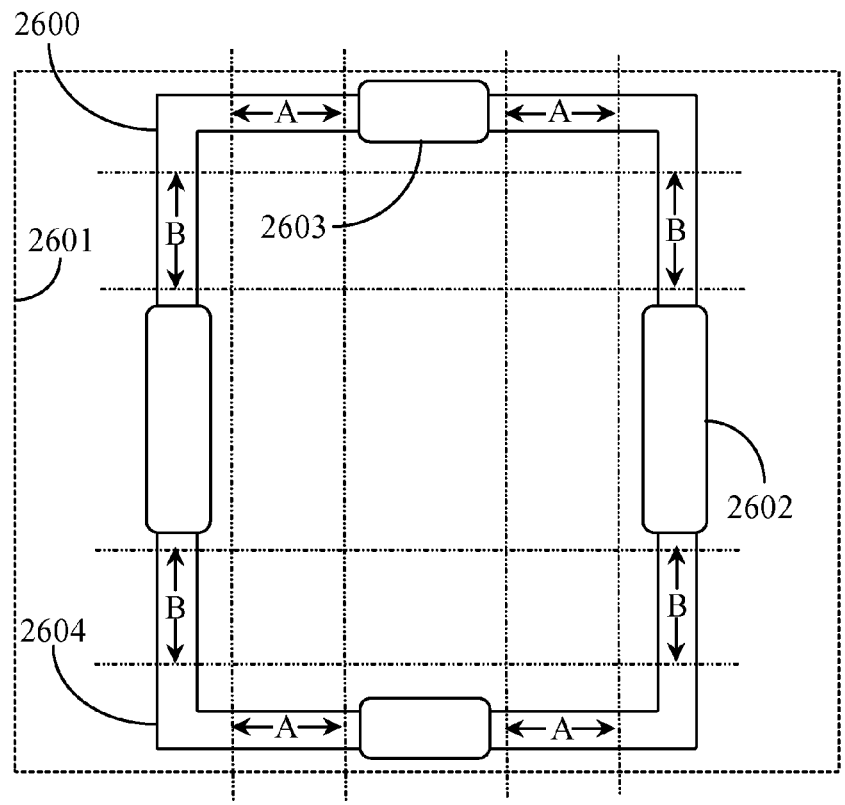
FIG. 26 is a front view of a photo frame that can be automatically sized to fit a photo according to an embodiment of the present invention.
Figure 27:
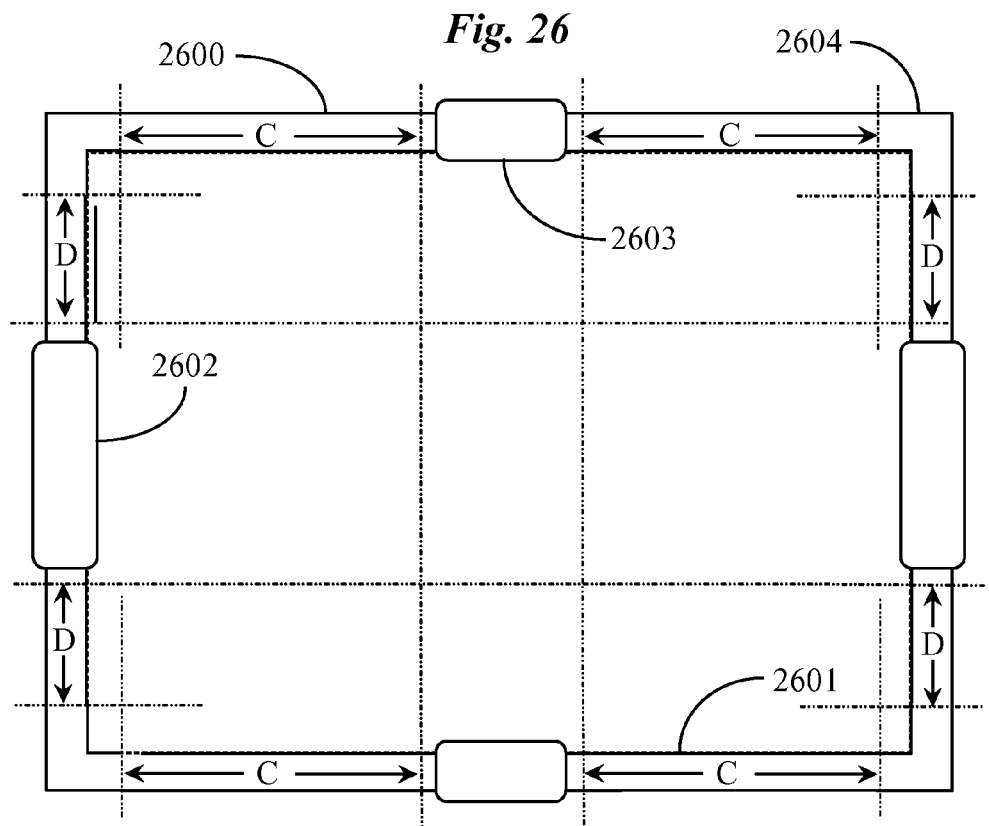
FIG. 27 is a front view of photo frame automatically-sized about a photo.

FIG. 26 is a front view of a photo frame 2600 that can be automatically sized to fit a photo according to an embodiment of the present invention. FIG. 27 is a front view of photo frame 2600 automatically-sized about a photo. Referring now to FIG. 26, photo frame 2600 may be stored using relative size units and may be automatically sized about photos of differing aspect ratios and sizes. In this view photo frame 2600 is not sized for fitting a photo 2601 illustrated herein as a broken rectangle. Typical resizable photo frames have four static components (corners) on the frame that do not change when the photo is resized. Photo frame 2600 includes four static corners 2604 and four static ornamental components 2602.

A one image photo frame cannot be expanded outside of the frame's original aspect ratio without stretching and distorting the frame. Frame 2600 has expandable regions A and B. Expandable regions A and B are areas on the frame that may be expanded by repeating dimensionally in the same direction. Added static components 2602 (right and left sides) and 2603 (top and bottom sides) represent ornamental attributes of the frame that would not look right if distorted by stretching or expanding. Therefore, the system determines the current size and aspect ratio of photo 2601 and calculates the amount of dimensional expansion required in each of the expandable areas of the frame.

Referring now to FIG. 27, photo frame 2600 is automatically fitted about photo 2601 in this example. Static components 2604 (corners), 2602 and 2603 are not changed in the auto-fitted frame. Expandable areas previously described as areas A and B are illustrated in this example after expansion as areas C and D. In this example frame 2600 has been automatically sized to fit photo 2601 with no sizing change required of the photo. By adding symmetrical expandable areas on all sides of the photo frame the system may use more complex ornamental photo frames without distorting the ornamental aspects or characteristics of those photo frames. The static portions of the frame remain the same in any size or aspect ratio. Only the expandable areas C and D are changed during the process. The system detects the photo size and current frame size before the process and then an algorithm determines the calculations required to produce the correct sized frame for the existing photo. When auto-flowing or remixing content in a project, the frames accompanying the photos are also automatically incorporated into the process.

Figure 28:
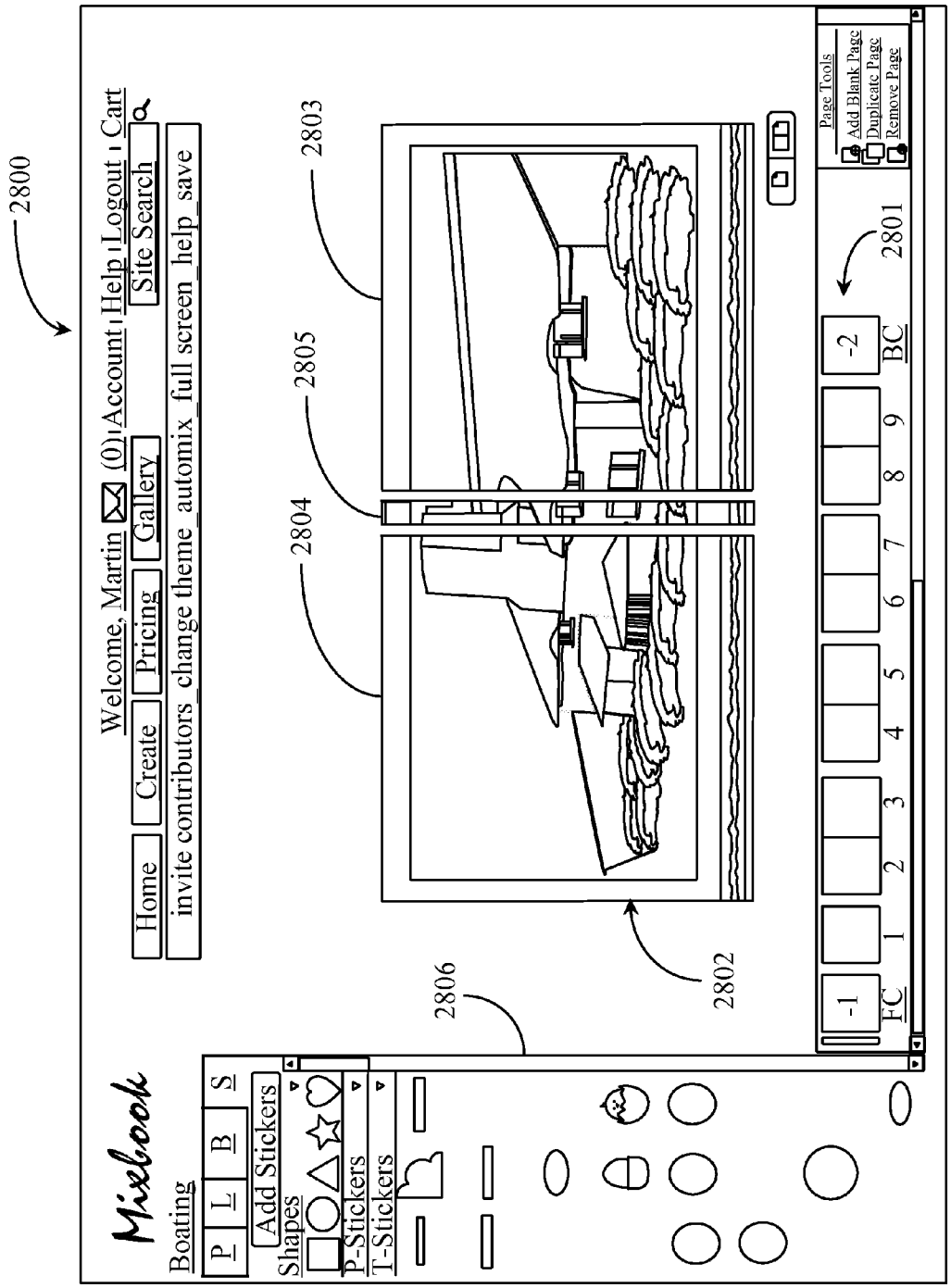
FIG. 28 is an exemplary screenshot of an editing interface displaying a photo spread across multiple pages (front cover, back cover, and spine) according to an embodiment of the present invention.

FIG. 28 is an exemplary screenshot of an editing interface 2800 displaying a photo-spread including a front cover, back cover, and spine according to an embodiment of the present invention. Editing interface 2800 is analogous to interface 800 described previously. Interface 2800 has a storyboard display 2801 that includes all of the pages of the photo book being created. The inventors provide a unique paradigm for relating items across multiple pages including special pages, in this case, the front cover 2803, the back cover 2804, and the spine of the book 2805. When a user edits a spread that contains more than one page, the photos, shapes and stickers can be "overflowed" from one page to other pages within the spread. When the items are overflowing, they are linked together such that when an item changes on one page, its linked item gets updated reflectively on the other page.

In this example the related item is a single landscape photo 2802 that is spread or wrapped around three special pages namely, front cover 2803, back cover 2804, and the spine 2805. In the case of photo 2802, it actively occupies all three designated special pages and editing of the photo from any of the special pages results in changes to the photo appearing on all three pages. For example, if a user pans photo 2802 the results of positional change are seen on all of the pages that the photo occupies. If each of the pages has one or more related items that appear on all of the pages for example, and editing performed on one of the related items may be propagated to all of the related items on other pages automatically.

Related items may also be moved over to one page completely, so that original item is not showing whatsoever on the other page. When this occurs, the item will be removed from the page it is no longer visible on. In one embodiment a user may take an item that exists on a last page, for example, and may "sweep" the item off of that page to automatically create a next page with the same layout and theme that is hosting the related item.

In one aspect of the present invention a pages position may be reflected using signed integers, which may also be used to model a special pattern. In this example, signed integers are used to describe positioning of the front cover 2803 (signed integer −1) and back cover 2804 (signed integer −2). Other special pages like foldable poster spreads (within a book) and inside cover jackets may also be positioned using signed integers. There may be a number of different position types to consider including number (any position value>0), special position, group position, pattern opposition, and function position.

It is duly noted herein that every product available to create at the service site like books, cards, calendars, and photo books, is a compilation of pages. A page is the fundamental canvas unit observed by the service although other unit definitions may be observed. A book is a collection of many pages. "Pages" is not just a reference to the insides of a book, but it can also refer to the cover pieces. The front cover, spine, and back cover are each pages which can be stitched together.

Many times in the process of creating a project, it makes sense to associate certain pages together. When a user edits a foldable card, for example, the user may want to be able to move an item from the bottom portion to the top part of the card. From the perspective of the back end data, the foldable card comprises two different canvas units pieced together.

Figure 29:
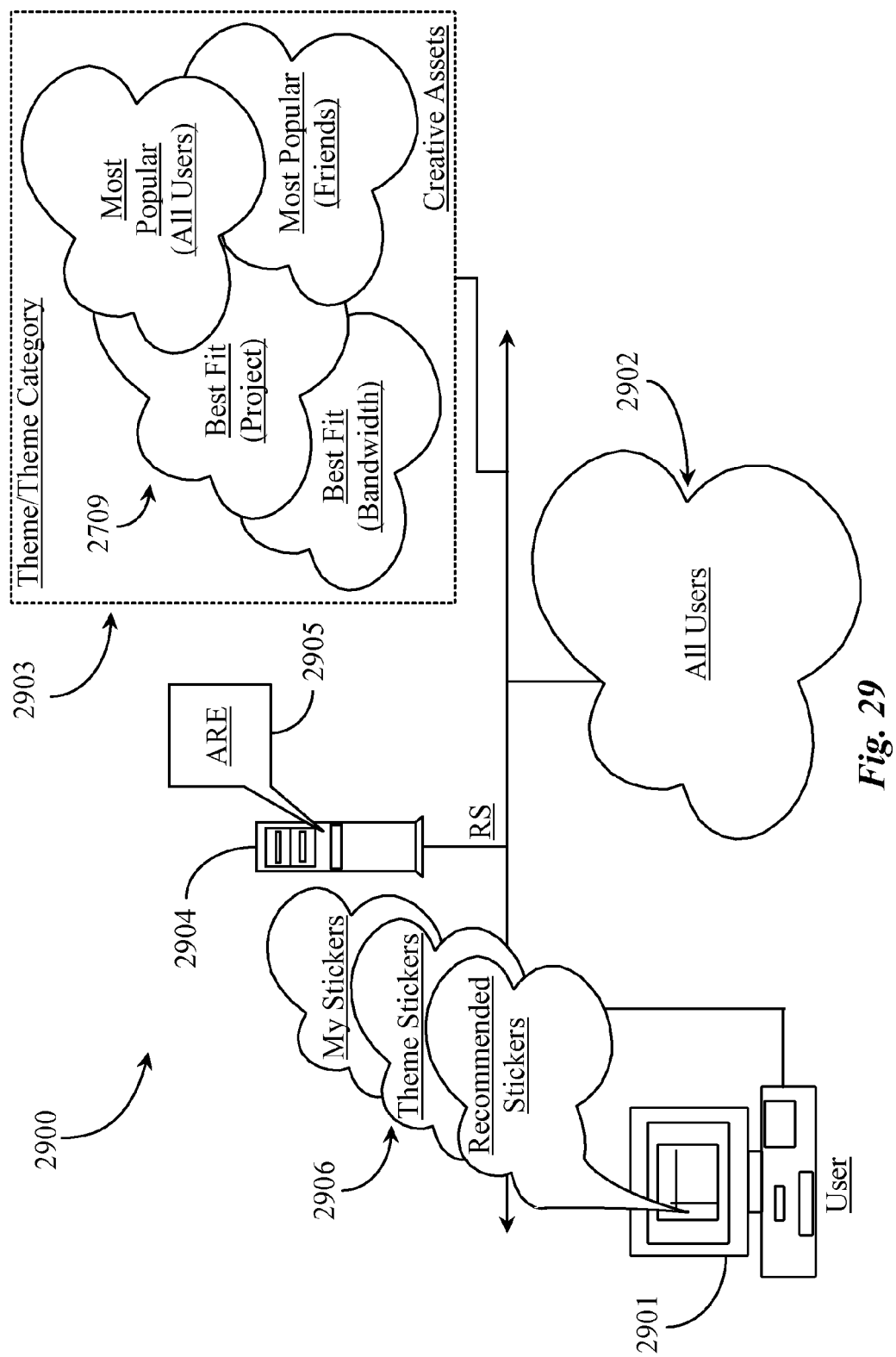
FIG. 29 is a block diagram illustrating an asset recommendation system according to an embodiment of the present invention.

FIG. 29 is a block diagram illustrating an asset recommendation system according to an embodiment of the present invention. In one embodiment of the present invention, asset recommendations are made to a user who is editing a current project using the Mixbook™ collage editor. System architecture 2900 includes a user 2901 that is currently online with runtime server 2904 running an asset recommendation engine (ARE) 2905. The system of the invention has access to all of the assets that have been designed by system designers, users whom may be registered as asset contributors, and any other user contributions to the system. Creative assets 2903 include all of the stickers, shapes, backgrounds, layouts, photos, and any other accessible imagery.

When a user edits a project, and selects a theme, theme-based assets become accessible to that user's Mixbook™ editor as illustrated previously in FIG. 8. In the canvas-editing interface (MBE), one can create a hierarchical recommendation system for presenting users with content to use in their current and future projects. By using themes as the building blocks for this hierarchal asset recommendation system, we can then link a theme to a project and utilize the creative content of the project as the basis for the theme.

In one embodiment, a project can be used by the system as a basis for theme creation in order to facilitate creation of more projects based on the theme. This theme creation process can be leveraged by bundling all forms of creative assets from a user-created project into a theme. If the creator of the project so chooses, all of the assets in the project can serve as the basis for a theme, which then serves as the creative basis for creating future projects. For example, if a user creates a "Mother's Day" project in the form of a photo book, they can use this project as the basis for a theme called "Mother's Day Theme." This "Mother's Day Theme" can then serve as the basis for users across the site to create their own "Mother's Day" projects. They will be able to utilize the canvas pages and all other creative assets that were added to the original "Mother's Day" project that was used to create the theme.

In one embodiment the assets are related to a specific theme a user has selected for a project. Creative assets like backgrounds stickers, layouts, and so on appear in the interface as thumbnails along with the user's photos, etc. In one embodiment asset recommendation engine 2905 is adapted to list recommendations by relativity. For example, if a user like user 2901 is working a project that is baby themed, then the stickers relating to that theme would appear in the user's editing interface. For example, hierarchical recommendation may take the form of sticker categories 2906. Categories 2906 include "My Stickers" as the top level of stickers (the first to appear in the interface). "My stickers" would include the stickers added directly to the project by contributors to the project. "Theme stickers" would next appear and would include the system-provided theme stickers that go with that particular theme. "Recommended Stickers" may include other theme stickers used in the projects from the themes that this project's theme shares a theme category with (Baby Themes).

Creative assets may be recommended on a contextual basis as well. For example, if a user is editing a specific page that has baby stickers on it and clicks the sticker tab other baby stickers will be shown to the user, including the ones used on that page. Other recommendation schemas may be practiced in accordance with the present invention without departing from the spirit and scope of the present invention.

A cloud labeled All Users 2902 may represent all of the users currently editing projects, or all of the users registered with the system. Assets may be recommended to user 2901 based on what all of the current users or based on what all of the users have determined to be the best or most used or most popular assets like theme-based stickers. In creative assets 2903 clouds 2709 represent possible recommendation genres. For example, if the asset is stickers, a recommendation might be the most popular stickers based on use count among all users. Another category might be the most popular stickers based on use count of only the friends of the user receiving the recommendation. Another category might be recommendation of the stickers that might best fit a specific project (contextual). Yet another category might be a recommendation of creative assets based on bandwidth considerations. There are many varied possibilities. Any type of creative asset might be considered for recommendation using contextual or hierarchical recommendation using ARE 2905. Recommendations may be made to users according to analyzed usage counts, friend relationships among the content creators, and content characteristics like width and heights or content meta-data such as photo data.

In one embodiment a single asset recommendation system analogous to ARE 2905 is provided for recommending creative assets stored by the system to users editing a project or a project page. Assets may include but are not limited to the categories of stickers, shapes, backgrounds, layouts, and frames. In a preferred embodiment the asset recommendation system is implemented in software and integrated with the GUI for recommending creative assets. In one embodiment the asset recommendation engine is a back-end data process that works in the background to rank creative assets and serve relevant assets according to ranking order. In this case each creative asset considered has a score card that may reflect a final score or value based on one or more conditions or "weightings".

The system is adapted to receive server calls relative to user GUI activity and to parse information about creative assets stored for use. A ranking function is provided that ranks creative assets based on filtered and/or or unfiltered statistical data known about usage and characteristics of the asset input against one or more pre-set rules for ranking the appeal of that asset. The system includes a server function for serving the recommended assets into the GUI. In this way the most relevant assets may appear in the interface closer to the top followed by the lower ranked assets and so on per asset category. The process is driven by algorithm and may fire each time the user clicks on an asset category to browse available creative assets stored by the system of the invention.

Both hierarchical and contextual recommendations can be made in concert to users operating the GUI. When a user clicks on an existing project to resume editing, the project's creative assets are loaded into the project pages as described further above. These creative assets are also listed in hierarchical order in the asset selection interface, typically the sidebar area of the editing GUI. In one aspect the hierarchy is My Stickers, followed by Theme Stickers, followed by Recommended Stickers. The ranking portion of the engine ranks My Stickers or "Project Stickers" as being most relevant to the project because they are already established in the project by the project contributors. Therefore, these already used stickers will be stickers that have the greatest probability of being re-used in the project.

The ranking engine ranks theme stickers as the next level of importance because these stickers are designed to be used in the theme that the user's project falls under. Now, the ranking engine looks at stickers that are stored that have been used in other user-created projects sharing the same theme or belonging to the same theme category but that have not yet been used in the instant project. The system ranks these stickers according to a weighting algorithm that calculates the appeal of each qualifying sticker according to one or a combination of parameter constraints.

In one example, the recommended stickers sent to a user for display in the recommended stickers window might be the highest ranking stickers based on a use statistic filtered by user type. For example, this user's friends, prefer the following recommended stickers based on the number of times they have been used in projects sharing the same theme or even the same theme category. On the other hand, the system may rank the stickers based on some other preset condition that is relevant to the situation at hand or may rank stickers based on likeness to stickers already selected for use in a project or on a project page.

In one embodiment the asset recommendation requirements are a receiving function for receiving server calls relative to user GUI activity being monitored, a weighting function for ranking creative assets based on input against one or more rules for ranking asset appeal, and a server function for serving the recommended assets into a GUI. In simple practice of the invention includes (a) receiving an indication of a user selection of a project or project page for edit at an asset recommendation engine; (b) calculating or updating current scores for the assets that qualify for service based on project, project page, and theme-based characteristics; and (c) serving the assets into the GUI asset browsing windows with the most relevant assets based on analyzed score served first followed by lesser relevant assets.

In one embodiment, the system of the present invention can select one or more photos from a user's project for recommendation in a new product. The system stores the in-depth page positioning information for all of the items placed in a user's project. The metadata about each of the user's photos, for example, is persisted along with the in-depth positioning information with each item stored for use in the project.

The system may therefore make intelligent recommendations regarding the importance and relevance of photos and other assets to a user. Through this analysis, the system can make automated suggestions of single or multiple photo products that the user may have an interest in purchasing.

By analyzing asset usage information and other data the system can access the items stored for a specific project that may contain, for example, hundreds of photos, and select one photo or a few photos that would qualify for application to single or multi-photo products like canvas prints, coffee mugs, mouse pads and so on.

Referring now back to FIG. 29, the system may use ARE 2905 to make an assessment of which image or photo assets in a product are good candidates for isolation for a single or multi-photo product. The term multi-photo refers to a product with two to several photos, for example, where the user had many photos in the project pool. A coffee mug may include a photo wrapped around the mug or several photos positioned about the mug. There are many different possibilities.

The ARE may first access the creator's project photos stored in the database. Then the system might weigh data associated with each photo used in the project against one or more business rules. After weighing the results, ARE 2905 may select one or more than one photo based on weighted score. In one aspect each item has a score card. The system may finally suggest or recommend one or more than one photo product as an up sell at such time the user wishes to make a purchase. A unique aspect of the recommendation is that the system may present one or more views of the suggested product already loaded with the creator's photos selected by the system.

ARE 2905 analyzes any tags attributed to photos and the descriptions of and captions associated with those photos. ARE 2905 might consider the actual size of images for certain product types like canvas prints, for example. If a photo is a background that spans two pages in a photo book, it may be a good candidate for a canvas print. ARE 2905 can consider the number of times a photo is used in the same project. The recommendation may be updated as a user edits a project such that when a user is ready to purchase the project in print form the system might also recommend that the user purchase another product that can be displayed to the user through the GUI with the recommended photos in place on the product. The system might offer an up sell option of one or more than one product exhibiting the selected photos.

Figure 30:
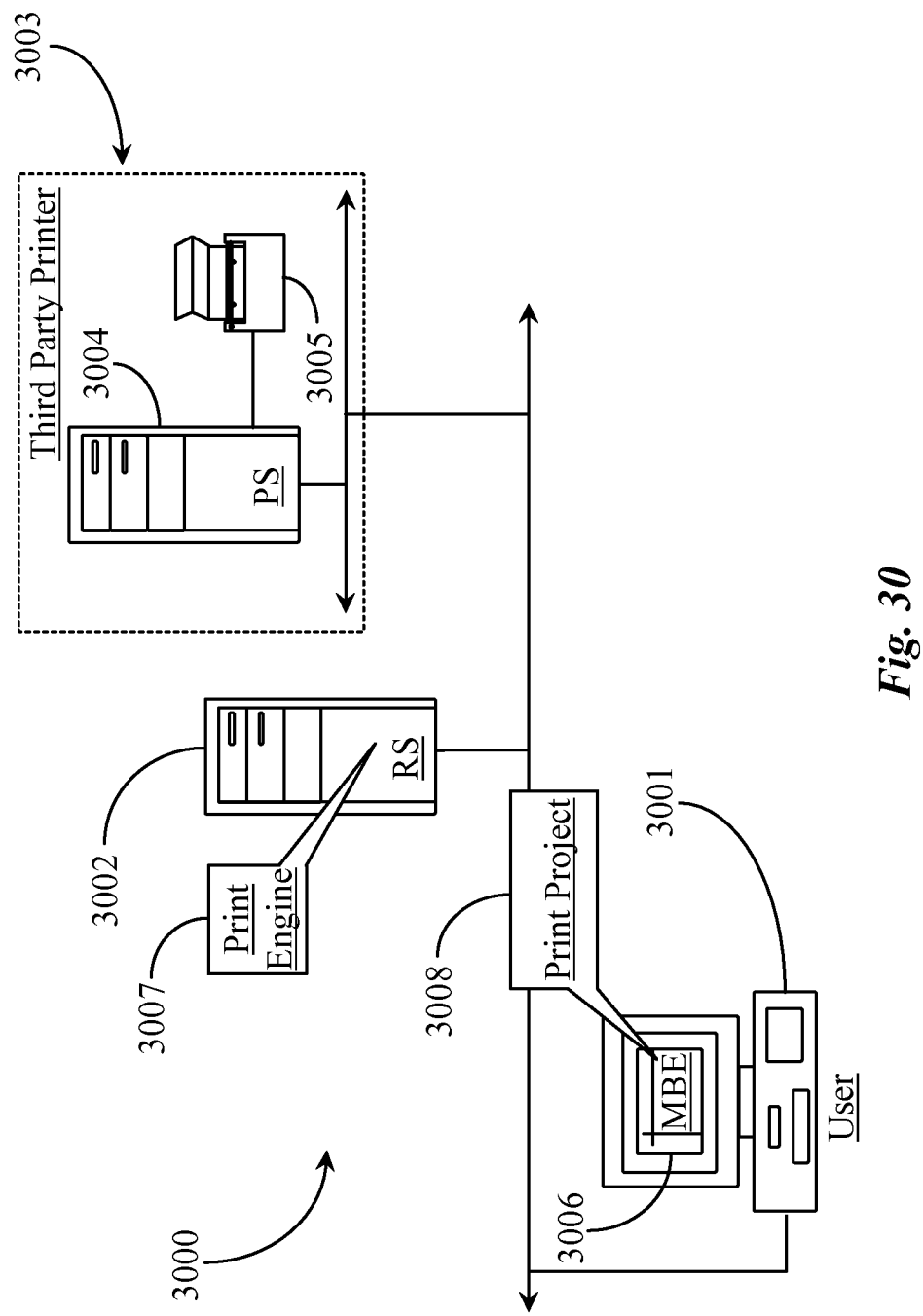
FIG. 30 is an architectural diagram illustrating a printing network according to an embodiment of the present invention.

FIG. 30 is an architectural diagram illustrating a printing network 3000 according to an embodiment of the present invention. Printing network 3000 includes a user 3001 connected online to a runtime server 3002. Runtime server 3002 is analogous to runtime servers previously described in this specification. Runtime server 3002 includes a digital medium coupled thereto and adapted to contain all of the SW and data required to enable server function.

When user 3001 is editing a project using a Mixbook™ editor (MBE) such as MBE 3006, for example, the user is connected in session with server 3002. As such, the user may decide to print a finished project such as a photo book by invoking a printing option such as print project option 3008 illustrated in exploded view. Such an action invokes a printing engine 3007 that is responsible for rendering the user's project in a ready state for printing according to a final end product selected by the user.

The printing engine sends output files for printing to a third-party printing service 3003. Printing service 3003 represents any online printing service. Third-party printer 3003 includes a printing server 3004 and a connected printer 3005 representing printing capability. Printing engine 3007 is a flash based print engine that is enhanced to produce high resolution output files to print. Print engine 3007 is a single print engine that is involved from the point of creating a project to the point of printing out the project.

A flash-based print engine has some drawbacks that need to be overcome in order to print larger high resolution files. Outputting large format prints for printing from a flash based editor is very difficult to do. The inventors provide enhancements that enable the system to take flash content and produce a near pixel-perfect reproduction of a user's work in the high resolution formats that professional printers normally require. Traditionally print systems take the back end data and then recreate the content for printing through a second engine such as a Java-based print engine or a C-application. Print engine 3007 is a point for point engine and can re-create content at any dots per inch (DPI) required by the printer.

In one embodiment gutter areas of printed products are optimized for view after print. In most situations a traditional printed book having a gutter area will have content sucked into the gutter area where it is hard to view, or there will be a color strip applied to the gutter area whereby the color strip appears somewhat unprofessional. Print engine 3007 functions to solve the above problems by optimizing the size of the gutter area and content displayed on a page before printing. In particular, the system of the invention implements a unique method of gutter size calculation and content display logic for printable products.

Based on other content optimization algorithmic results, a gutter calculation algorithm calculates the best size for the gutter based in part on the aspect ratio grouping. The gutter area is intelligently sized in order to minimize the amount of content that is not viewable on printed book products due to the glue that lies in the gutter between two pages on a given spread.

The gutter sizing algorithm works in conjunction with a content sizing algorithm to balance the two extremes, one being no gutter allowance, and the other being too much gutter allowance. No gutter allowance results in content hidden by the glued area in between pages. Too much allowance causes the area defined as gutter to be displayed visibly to the user.

Figure 31:
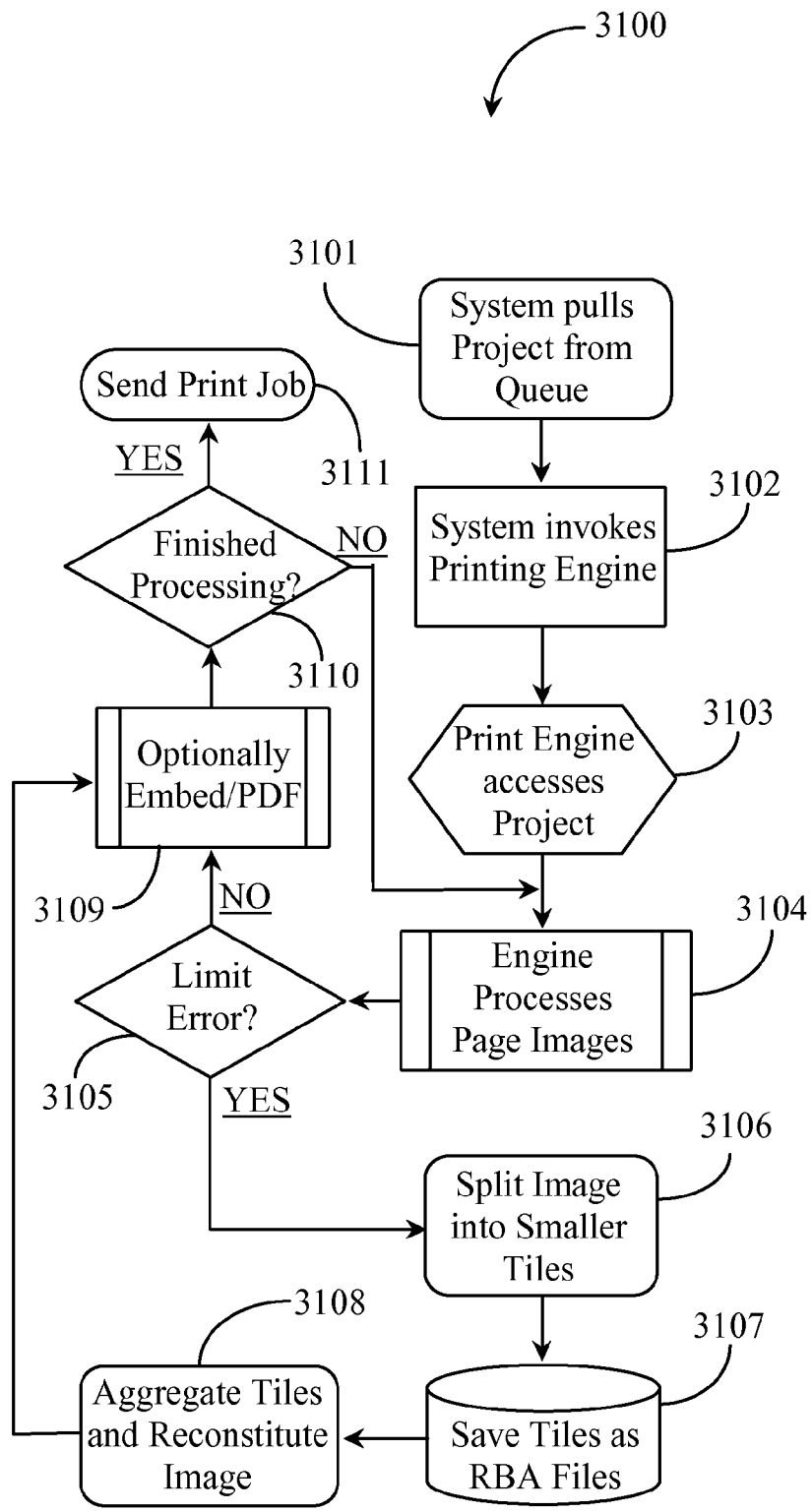
FIG. 31 is a process flow chart illustrating steps for printing large output images according to an embodiment of the present invention.

FIG. 31 is a process flow chart illustrating steps for printing large output images according to an embodiment of the present invention. At step 3101, the system pulls a project for print from a print queue. Users that order printed products are taken through an ordering process after which their print jobs are queued for servicing. A project for print may be a calendar, a wedding book, a baby book, or any photo-based product with one or more pages. At step 3102, the system invokes a printing engine analogous to Flash print engine 3007 described previously. At step 3103 the printing engine accesses or otherwise acquires the project for print. Pages of the project are the canvases that contain the photos, stickers, shapes, and text. A book spine is also considered a special page as described earlier in this specification.

At step 3104 the print engine processes the project pages and encodes the pages for printing. In this step the print engine reads the page and attempts to render the page as a snapshot encoded in some image format like a bitmap image, PNG image (Microsoft), or a jpeg image format. During processing of any of the project pages the system determines at step 3105 if there are any problems with the process so far like any limit errors regarding overall page size or weight. This step is required because there are specific limitations using a Flex/Flash-based printer that prevents snapshot taking of images at higher resolutions or if the snapshot is allowed it results in a huge drain on computing resources (low memory error). In most instances any content sizing or resolution issues with the individual photos in the project pages are resolved through a print warning system described further above that is part of the MBE. Therefore, any issues with any of the atomic elements within the project like content and print boundary conflicts should have been resolved before pre-processing for print begins.

Typically, in a generic process an output image would be rendered normally and then a snapshot of the image would be taken for print. However, quality would downgrade with larger images printed using a non-optimized printer and printing process. Likewise, scaling down the image or image content on a page would reduce print quality. For example, a 12×12 image for print at 300 DPI (desired resolution for quality in print) would require roughly 3600×3600 pixels. If at step 3105 the system determines that there are no errors the system may optionally embed the page images into a PDF document for printing from the PDF format at step 3109. The output image could be embedded into some other application like MS Word without departing from the spirit and scope of the present invention.

It is noted herein that the print engine prepares all of the pages in batch before releasing the materials for printing. The system then determines at step 3110 if the pre-printing process has been completed for that project. If the system determines that the page pre-processing is not complete for all of the pages of a project, then the process falls back to step 3104 until all of the pages are pre-processed including special pages like the front cover, back cover, spine, inside jackets, and any other 'special' pages within the project. When the system determines that all of the processing is complete for all of the project pages, then the print engine releases the project as a print job to be sent to the end printing system at step 3111.

If at step 3105 the system determines that there are one or more limit errors preventing the print engine from taking a single snapshot of the entire page, the offending page may be tiled into two or more image tiles of smaller size at step 3106. The print engine may be adapted to perform this task. In one embodiment this task may be passed on to another application for tiling and stitching photos. The smaller tiles (snapshots) created in step 3106 may be saved to memory by the print engine as uncompressed raw byte array (RBA) files for each page in a given project that was required to be split at step 3105. In one embodiment an image tiling module is provided and integrated with the print engine. The print engine may automatically sense if the pixel size of an image is greater than a pre-defined image size threshold for high resolution printing and if so tiles the image and saves the individual image tiles to memory for later reconstitution.

In a preferred embodiment, the print engine is adapted to detect images that require tiling by algorithm. In one embodiment, the algorithm calculates the threshold for any image submitted for printing by leveraging a mathematical formula that includes the size (width and height) of the print area of the image and the limit value for the print engine to take a single snapshot. In a preferred embodiment the print engine is a Flash print engine. In one embodiment the threshold is expressed in dots per inch (DPI). Using the algorithm, a 12×12 image would have a DPI threshold of about 340 DPI over which tiling would be required to maintain a good quality print. For a 14×11 inch page, the DPI threshold would be about 330 DPI. It will be understood by one with skill in the art of mathematics that there may be more than one mathematical approach that could be implemented to derive the threshold limit value for determining if an image for print needs to be tiled without departing from the spirit and scope of the present invention.

The smaller tiles created at step 3107 are reconstituted back into a single page image at step 3108 using an outside image stitching tool. Optionally, the process resolves back to step 3109 where the page image is embedded into a PDF file for print. In one embodiment PDF files are generated by the print engine with layers and vectors. The print engine is able to rasterize certain portions of a PDF file while generating other portions of the file in vector to retain the best print quality for page content. The process requires embedding of fonts.

At step 3110 the system determines if processing is finished for all of the pages in the project. If the system determines that processing is not complete at step 3110, then the process jumps back to step 3104. The process typically runs for a batch if there is more than one page image in a project.

With a normal effects filter like a shadow effect filter, flash will prevent the effect from appearing about the page image or other content on the page image like photos and shapes at higher resolution required for quality printing. For example, if a user has a large full-page photo with a drop shadow effect around it the effect would not be visible at all at higher resolutions required for printing. Other effects are treated similarly such as glow, reflection, and so on. Filter effects will not be visible if the filter area is greater than about 15,000,000 pixels. The system enabled by the print engine provides a smaller version of each ordered filter and renders those into bitmap images. This bitmap image (one per filter) is then scaled up to the filters perceived size.

In one embodiment the printing system may tile the background of a page image by mirroring it on all edges to create a buffer zone around a trimable area of a printed project. If book trimming ever invades this area the mirrored effect is considered more aesthetic than viewing a blank white strip around the edges. In one embodiment of the present invention users may configure a project to print using one or more dimensional ink printing techniques on certain content contained within their projects or on whole page images. In one embodiment certain dimensional ink printing effects may be preordered by the system by default.

In one embodiment the print configuration engine is implemented in software and is integrated with the Mixbook™ editor (GUI) and includes a communications link to a compatible print server and printer connected to the data network. In one embodiment tasks are deposited in a print queue. An effect filter size reduction module is provided for reducing the filter size. In this case, the print engine automatically senses via the effects filter size-reduction module if the area of a filter is greater than a pre-defined threshold and if so produces a smaller filter embedded into a bitmap image after which the bitmap image is scaled back up to the filters original size.

Figure 32:
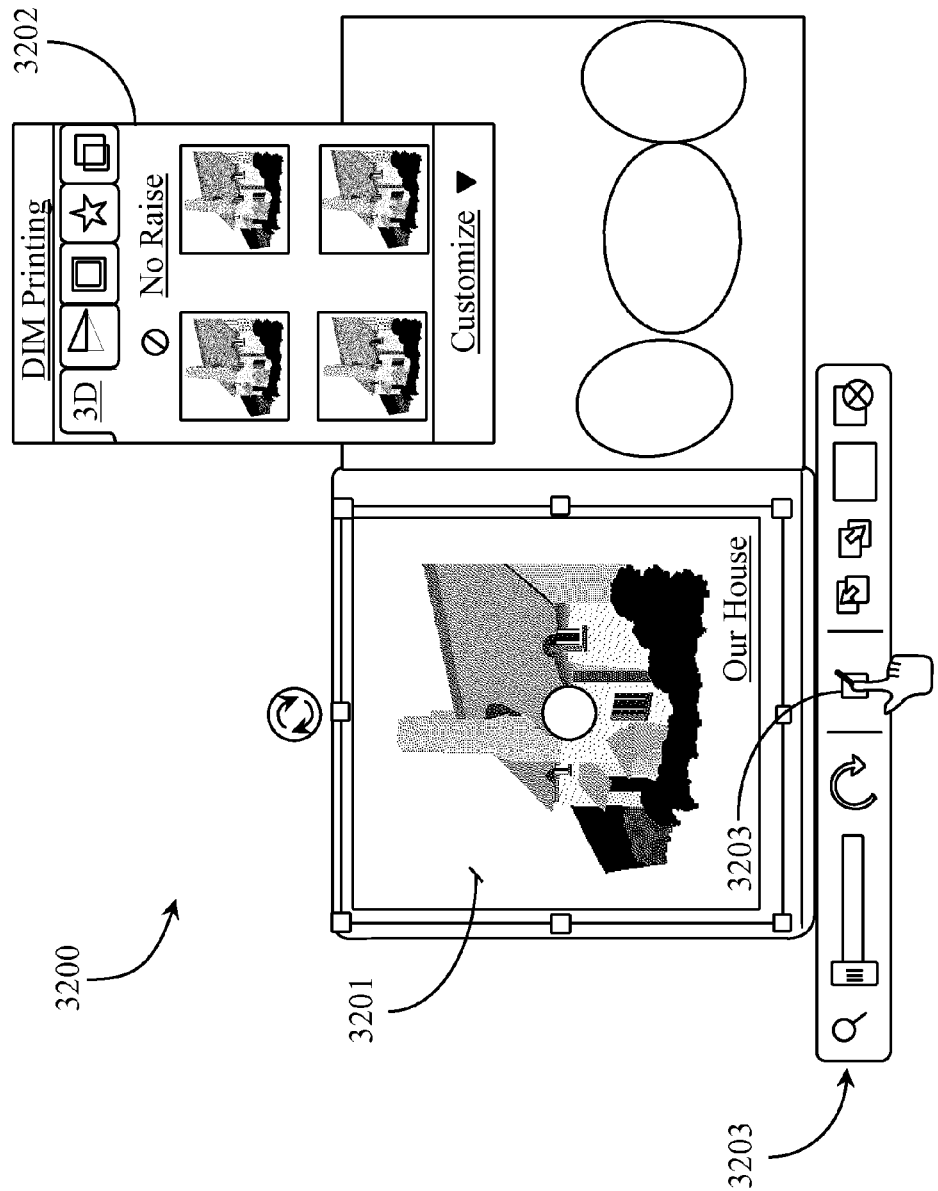
FIG. 32 is an elevation view of a photo book project undergoing editing for dimensional printing according to an embodiment of the present invention.

FIG. 32 is an elevation view of a photo book project 3200 undergoing editing for dimensional printing according to an embodiment of the present invention. Dimensional ink printing is a relatively new technology that enables three-dimensional effects to be produced in print relative to photos, shapes, stickers, borders, and text content within a project. More particularly, dimensional printing allows various areas on the printed canvas to have a "raised" or "3D" look to them. Dimensional printing today is generally accomplished by using a Kodak Nexpress™ printer, and providing a secondary map to the original image which instructs the printer on which areas to "rise" and by how much.

While the end printer is enabled for three dimensional printing, the print engine in conjunction with the Mixbook Editor™ creates the three dimensional print instructions or "maps", which are layered over the associated content to instruct the end printer what areas should be raised and by what depth to print the effects. In a preferred application all products are configured for print and then sent to a third-party printing service to be printed out.

Referring now to FIG. 32, project 3200 is assumed to be presented within the Mixbook Editor™ (MBE) of the present invention. Project 3200 is a photo book in this example, but could be any other type of project such as calendar or poster without departing from the spirit and scope of the present invention. Photo book 3200 includes a page containing one large photo 3201 placed in a photo slot as evidenced by the panning control circle in the center of the photo. As described further above, when a user clicks on photo 3201 editing toolbar 3203 immediately appears to allow a variety of edit options including calling up an additional styles interface 3202. Styles interface 3202 includes an option for pre-configuring photo 3201 to be printed using dimensional ink to produce a three-dimensional (3D) effect on the printed version.

In this example, styles editing interface 3202 includes various editing options including an option labeled 3D for dimensional printing. A user may invoke interface 3202 by clicking on an icon 3203 in the automatic editing toolbar 3202. In this example, a user clicks on 3D (DIM Printing) to invoke an algorithm that "reads" the photo color histogram and/or perhaps other photo data and creates several thumbnail images of photo 3201 for preview whereby each thumbnail exhibits a different stock dimensional print effect as it would look on photo 3201. In this embodiment the default raised levels may be previewed in styles editor 3202 visually in the preview panel. The user may select or mouse over any thumbnail in the auto-preview panel to see the effect on photo 3201.

It may be difficult to "see" the raised effect just by looking at a thumbnail. Therefore, in one embodiment color that is indicative of areas that will be raised by default in each preview thumbnail is applied to each of the thumbnails to point out in each case where the raised areas are. The intensity of such a color may indicate degree or depth of the 3D effect applied.

In one embodiment the algorithm changes every pixel in the "raised" area of photo 3201 to produce a shadow effect. In this case areas that are more raised will appear lighter in color and the areas that are less raised or not raised will appear darker. Areas with more height will cast shadows across the areas with less height using the shadow effect. Other methods to denote to a user that specific areas of an item have been raised are also possible.

A project may be configured simply by displaying in the editor, a page canvas for editing; selecting or highlighting an image or item on the page canvas, invoking a dimensional print effect configuration interface by selecting an interactive button on a toolbar displayed automatically, or by implementing keyboard shortcut to execute the interface, and selecting an option for applying one or more three dimensional effects from the interface. In one embodiment dimensional print settings include automatic generation of a three dimensional print effect whereby the automatic process is responsible for analyzing color data of the image, consulting one or more rules relative to the analysis of color data, and determining from the consultation which areas of the image should be raised and to what depth. A depth map is generated for the image, the depth map instructing a printer which portions of the image to raise and by what additional depth to achieve the three dimensional print effect.

In one embodiment, a method for configuring a project for three dimensional printing includes displaying in the editor, a page canvas for editing, selecting or highlighting an image or item on the page canvas, invoking a dimensional print effect configuration interface by selecting an interactive button on a toolbar displayed automatically as a result of the previous item selection or by implementing keyboard shortcut to execute the interface, and finally selecting an option for applying one or more three dimensional effects from the interface to the item. The effects may be automatically previewed in the editor.

In one embodiment a user may further click on customize to open a drop-down section that may contain a slider and one preview pane. In such a case, a user may be enabled to select pre-defined or mapped portions of a photo by mouse input and then operate the slider to intensify or detensify the effect (raise or lower) the depth level of dimensional printing associated with the specific area of the photo. The algorithms used to adjust content for dimensional printing rely on a series of pre-defined rules that govern what items may be dimensionally printed and how items are analyzed for "best fit" dimensional printing. In one embodiment, the subsystem parses a selected item and then suggests or recommends a style and depth of dimensional printing for an item like a photo for example.

When a user accepts a dimensional printing option for an item the algorithm creates a depth map for the image page or photo that is applied as a layer over the photo image. Depth map options might include having a higher raise at the edges, having a higher raise on one edge vs. another edge, raising certain areas of the image, etc. In one embodiment the system denotes to the user which areas of an item like photo 3201 will be raised by application of one of several possible interfacing methods like applying 3D shading to the item, a glowing effect, an icon next to the item, a highlight, outlines, and many more options. Project templates that include stock items like photos shapes, stickers, and text boxes could be created by designers to include default settings for dimensional printing applied to individual ones or all of the items available with the template.

In another embodiment an algorithm intelligently selects which areas of a page or item should be raised in print to produce an optimum 3D effect based on one or more pre-defined rules. When a user selects auto-raise for example, the algorithm may analyze all of the items on the page including shapes, stickers, photos, text frames, borders, and so on. Aspects subject to analysis include, but are not limited to, colors used, photos used, text entered, numbers of items on a page, color distribution patterns in the product layout, color distribution patterns in inserted photos, and so on. Analysis may also consider size or aspect ratio of an item; the depth of the item on its canvas in relation to other items; size or aspect ratio of surrounding items; and any effects currently applied to an item or surrounding items such as drop shadow and its associated properties; or otherwise comparing the item with surrounding items.

After a page is analyzed, potentially considering some or all of the analyzing points mentioned above, the algorithm chooses the best areas to raise and the best depths to raise the pixels in raised areas. The algorithm may then indicate to the user as described further above which areas will be raised in preview. The user may ultimately have the option of accepting the "system recommendation" or not. Various methods could be utilized to determine areas that should be raised over other areas of a photo, item, or page. The system might determine the most common color on a page and may raise all of the pixels exhibiting that color to a specified depth. The system stores the "height" of various items on a per-pixel basis. A dimensional attribute is added to the normal pixel data so instead of red, green, blue, and alpha (opacity/transparency ratio) (RGBA) the pixel is defined as RGBA and pixel depth (D). Every item having raised pixels on a page will have its own depth map that will document the data so that it may be transmitted to an end printer operated by a print partner for end fulfillment. The depth D may be different for pixels in separate raised items and for pixels within a same item.

Rules for auto-raising elements of a project might include raising lighter areas of a texture over darker areas. All text of a specific font type might be raised. Rules may be pre-configured for each type of item, for example sticker rules might be different than shape rules. Areas within stickers might be raised based on color distribution within the sticker. Frames and borders may be raised by default. The auto-dimensional print configuration algorithm will rely on the rules to generate depth maps for any items containing raised pixels. In one embodiment user experience may be fed back into the system to help designers create new default applications for dimensional print configurations.

In addition to enabling efficient utilization of assets available within the system, designers pre-build projects from starting projects. When a user starts a project, the system saves the starting version of the book to the database. Many copies of the project are then prebuilt for users. When a user begins a project, we start them off with a book that looks exactly like the project that the designers created (minus the photos). The resulting project is prebuilt so all the system has to do is update the foreign keys to reference the projects new owner, making the process very efficient to the end user. Another unique optimization is encouragement of copying projects.

The system allows users to create a copy of a project and allow the "copier" to modify all the contents of that project and (optionally) use all the photos in the new project. Remixing a project means to take a current project and create another digital copy of it on the system. In this way new users can quickly and efficiently make an existing project their own. The publishing interface portion of the Mixbook Editor™ has controls that allow users to gauge the level of collaboration, viewing access, and "copy" rights of their projects. The system enables "open" projects where any other members can view contribute and copy.

It will be apparent to one with skill in the art that the network-based, photo-based project creation and editing system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system for creating and editing media-based projects for printing products, comprising:

a computerized server connected to a data network, the server having access to a memory storing instructions for providing an executable graphical user interface (GUI) accessible by a computer browser and adapted for creating, displaying, editing, publishing, and printing one or more media-based products;

at least one data repository residing on the network, the data repository accessible to the server, and storing individual project pages and page assets including at least images and project-related graphics;

a print configuration engine executable from the memory, the print configuration engine adapted for rendering media-based projects for printing products; and at least one bi-directional communication channel established between a computing appliance executing a version of the GUI while connected to the network and a server managing the data repository, wherein the GUI enables logical selection, grouping, and sizing of the individual project pages and the page assets, and automatic page population of page assets based on determining a core aspect ratio for the projects based on metadata particular to each page asset including at least size, shape, and orientation, wherein the core aspect ratio comprises two or more output sizes corresponding to a given orientation of the individual project pages, wherein any individual project page having said given orientation does not require any editing of page content before printing in said corresponding two or more output sizes, wherein the core aspect ratio is calculated so as to result in minimal loss of page content during printing of said individual project pages, and wherein the GUI is capable of displaying the project in the two or more output sizes, and wherein the GUI enables an automated process whereby new project pages are dynamically created for printing a new product requiring second page size aspect ratios based on the core aspect ratio of the project, and the size, shape, orientation, and metadata particular to individual page content assets.

2. The system of claim 1 wherein the data network is the Internet network.

3. The system of claim 1, wherein the media-based products are selected from the group consisting of a photo-book, a photo-calendar, and a photo-card.

4. The system of claim 1 wherein the project-related graphics include shapes, stickers, frames, text boxes, photo-slots, and backgrounds.

5. The system of claim 1, wherein two or more users may access the same GUI version and edit the media-based project at the same time.

6. The system of claim 1 wherein the data repository is managed by a third-party network storage provider.

7. The system of claim 1 wherein the bi-directional data channel is an action script message format (AMF) channel.

8. The system of claim 1, wherein the GUI includes an application for messaging, and an application for creating an interactive list of friends of an instant user operating the GUI.

9. The system of claim 1, wherein the GUI includes a message board interface allowing users to post viewable comments about the media-based project.

10. The system of claim 1, wherein individual media-based projects are displayed at the core aspect ratio relative to width and height derived for a grouping of product sizes, each having different aspect ratios.

11. The system of claim 1, wherein the media-based projects may be translated from presentation at one core aspect ratio relative to one pre defined grouping of products having similar aspect ratios to another core aspect ratio relative to a different pre-defined grouping of products having similar aspect ratios.

12. The system of claim 1, wherein individual pages of the media-based project are scaled using relative integers beginning from absolute center of the page.

13. The system of claim 1, wherein individual pages of the media-based project are auto-populated with theme-related shapes, stickers, text boxes, and photo-slots.

14. The system of claim 6 wherein the server uses multiple open socket connections to monitor two or more users collaborating on the same project and to push activity data to all of the collaborators giving the a real-time view of the changes.

15. The system of claim 1, wherein the system is accessible through a secure Website.

16. In a system for creating and editing media-based projects for printing products, the system including a networked server and a data repository, the server having access to a digital medium with an executable graphical user interface (GUI), a method for creating the media-based project comprising:

accessing the GUI;

creating and selecting basic project attributes including individual project pages and page assets of specific size, shape, orientation, and groupings;

determining page size aspect ratios for each page in the project and a core aspect ratio for the project from the page size aspect ratios of the individual pages and content assets, wherein the core aspect ratio comprises two or more output sizes corresponding to a given orientation of the individual project pages, wherein any individual project page having said given orientation does not require any editing of page content before printing in said corresponding two or more output sizes, wherein the core aspect ratio is calculated so as to result in minimal loss of page content during printing of said individual project pages, and wherein the GUI is capable of displaying the project in the two or more output sizes;

invoking an editor to assemble and display the project; and adding, removing, and editing project content;

wherein the GUI enables logical selection, grouping, and sizing of individual project pages and the page assets, and automatic page population of assets based on metadata particular to each asset, and wherein new project pages are dynamically created for printing a new product requiring second page size aspect ratios based on the core aspect ratio of the project, and the size, shape, orientation, and metadata particular to individual page assets.

17. The method of claim 16, wherein access is through a Web site.

18. The method of claim 16, wherein project attributes include a project title, a project description, one or more custom tags, a theme category, indication of who may view the project over the network, and any named collaborators who will contribute to the project over the network.

19. The method of claim 16, wherein the project is displayed at the core aspect ratio relative to the individual aspect ratios of a grouping of product sizes with similar aspect ratios.

20. The method of claim 16, wherein the project is automatically populated with a background, shapes, stickers, text boxes, and photo slots.

* * * * *